United States Patent
Sakamoto et al.

[11] Patent Number: 5,924,042
[45] Date of Patent: Jul. 13, 1999

[54] MOBILE COMMUNICATION SYSTEM

[75] Inventors: Takafumi Sakamoto, Yokohama; Eiji Kamagata, Kawasaki, both of Japan

[73] Assignee: Kabushiki Kaisha Toshiba, Kawasaki, Japan

[21] Appl. No.: 08/614,648

[22] Filed: Mar. 13, 1996

[30] Foreign Application Priority Data

| Mar. 15, 1995 | [JP] | Japan | 7-056362 |
| Jun. 6, 1995 | [JP] | Japan | 7-139479 |
| Sep. 12, 1995 | [JP] | Japan | 7-259287 |

[51] Int. Cl.⁶ .................................. H04M 11/00
[52] U.S. Cl. .............. 455/458; 455/31.2; 455/31.3; 455/444; 455/443; 455/435; 455/445
[58] Field of Search ................ 455/458, 435, 455/422, 525, 450, 426, 443, 449, 444, 445, 446, 448, 31.2, 31.3; 340/825.44, 825.47

[56] References Cited

U.S. PATENT DOCUMENTS

| 5,289,527 | 2/1994 | Tiedemann, Jr. et al. | 455/435 |
| 5,361,396 | 11/1994 | Onoe et al. | 455/435 |
| 5,369,681 | 11/1994 | Boudreau et al. | 455/458 |
| 5,485,633 | 1/1996 | Burke et al. | 455/524 |
| 5,561,845 | 10/1996 | Bendixen et al. | 455/443 |
| 5,566,358 | 10/1996 | Obayashi | 455/435 |
| 5,570,411 | 10/1996 | Sicher | 455/450 |
| 5,594,776 | 1/1997 | Dent | 455/458 |
| 5,642,398 | 6/1997 | Tiedemann, Jr. et al. | 455/435 |

*Primary Examiner*—Wellington Chin
*Assistant Examiner*—Keith Ferguson
*Attorney, Agent, or Firm*—Oblon, Spivak, McClelland, Maier & Neustadt, P.C.

[57] ABSTRACT

In a mobile communication system having plural cells for presenting plural types of communication service to plural mobile stations, information of allowance of delay of call connection is attached to a call to the mobile station, and when delay of call connection is not allowed as seen from this information of allowance, the mobile station is paged simultaneously through all cells in the location registration area, and when delay of call connection is allowed, the mobile station is paged sequentially in the unit of certain cells in the location registration area. Accordingly, the control traffic required for location registration and paging can be decreased.

42 Claims, 23 Drawing Sheets

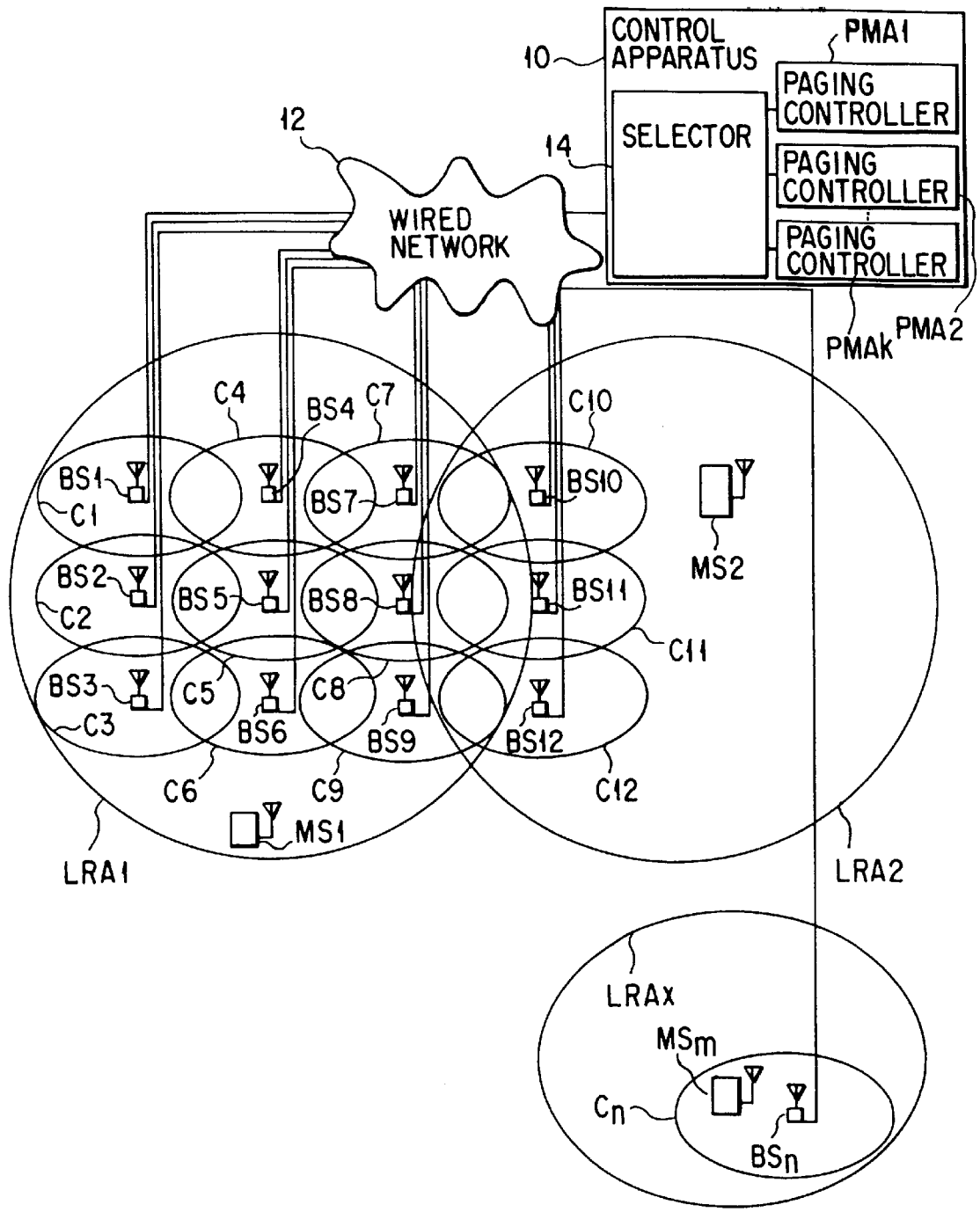
F I G. 3

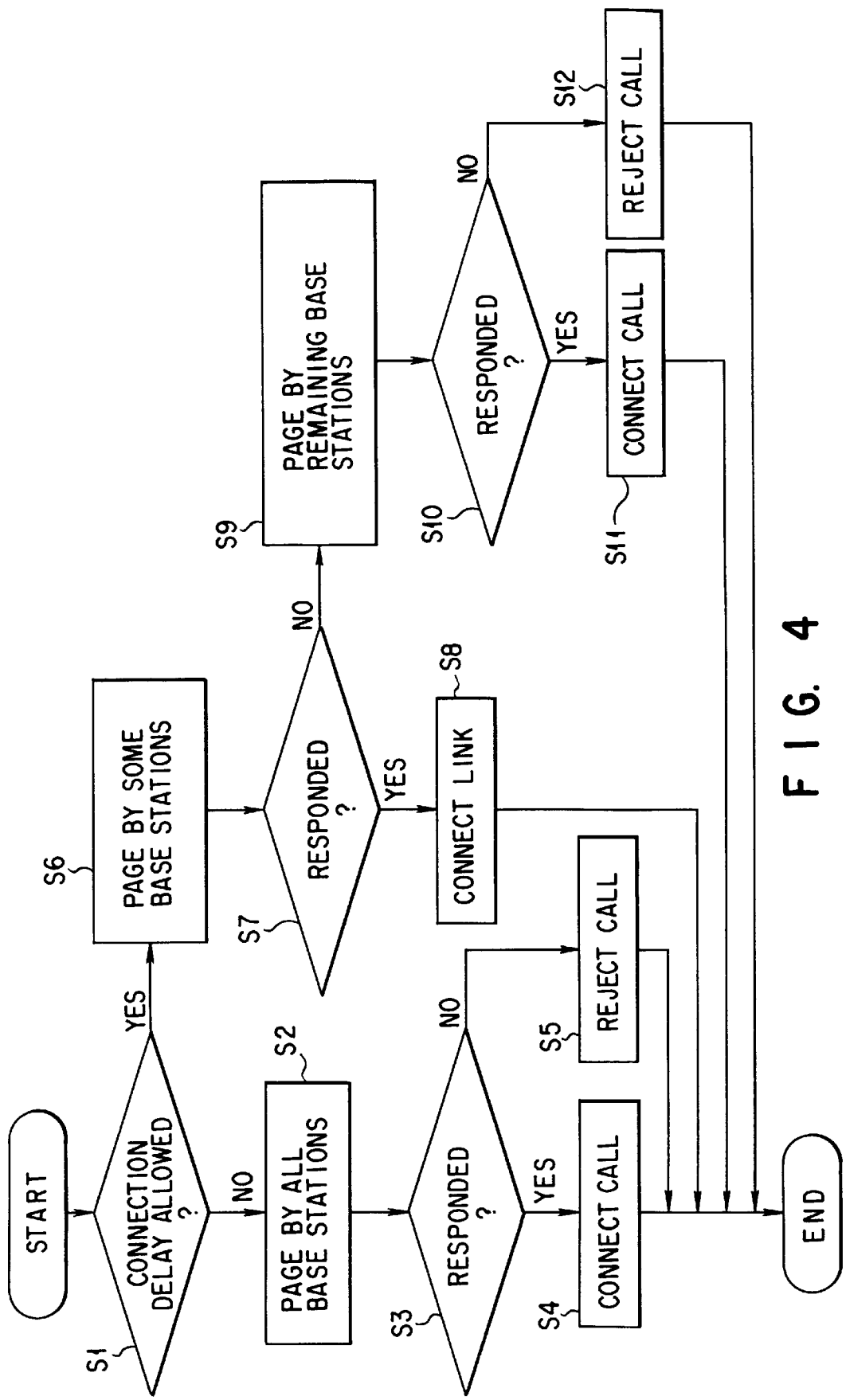
F I G. 4

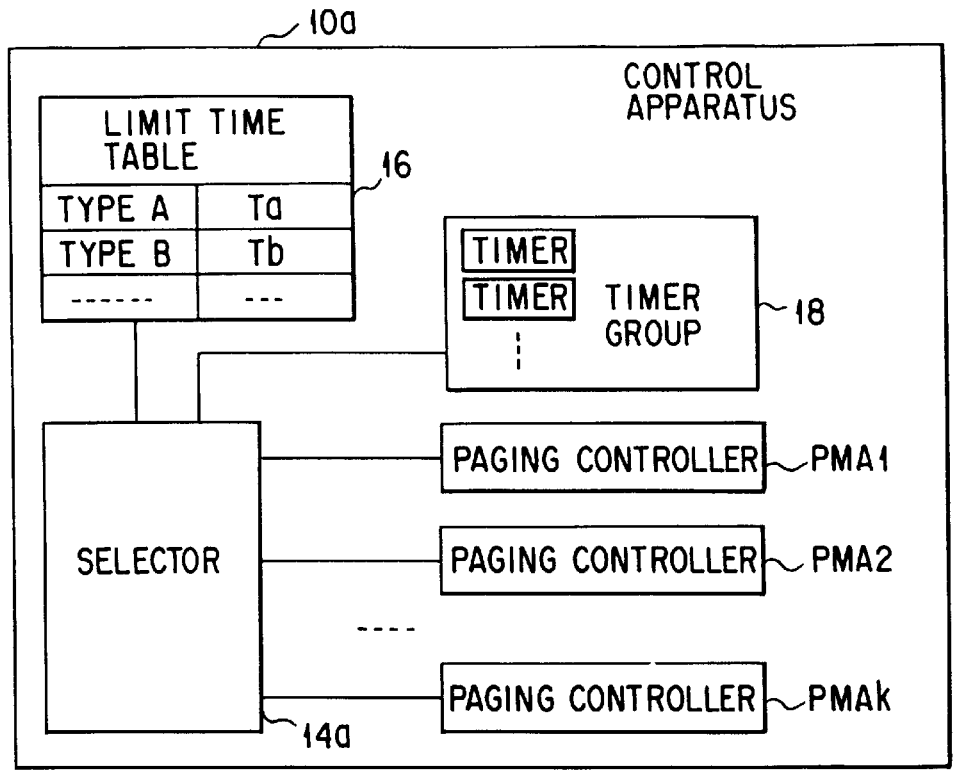
F I G. 5
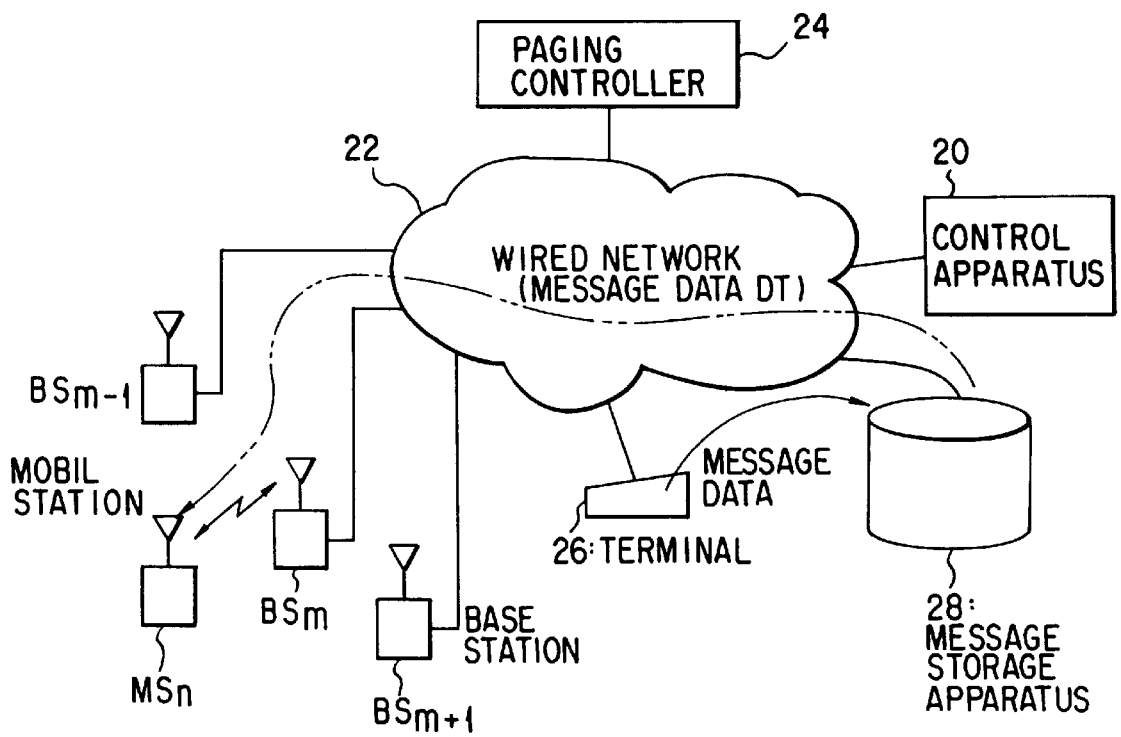
F I G. 6

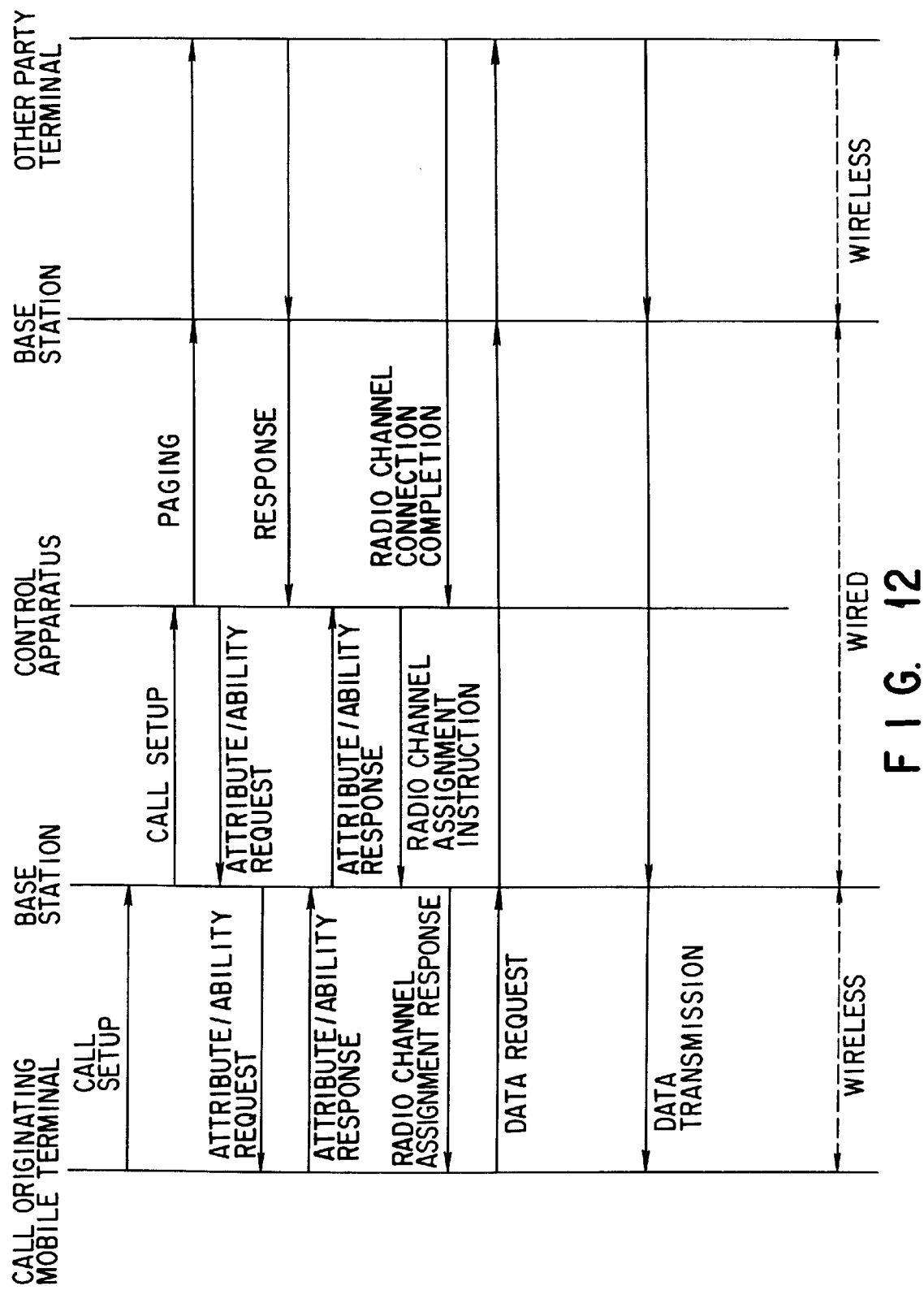
F I G. 12

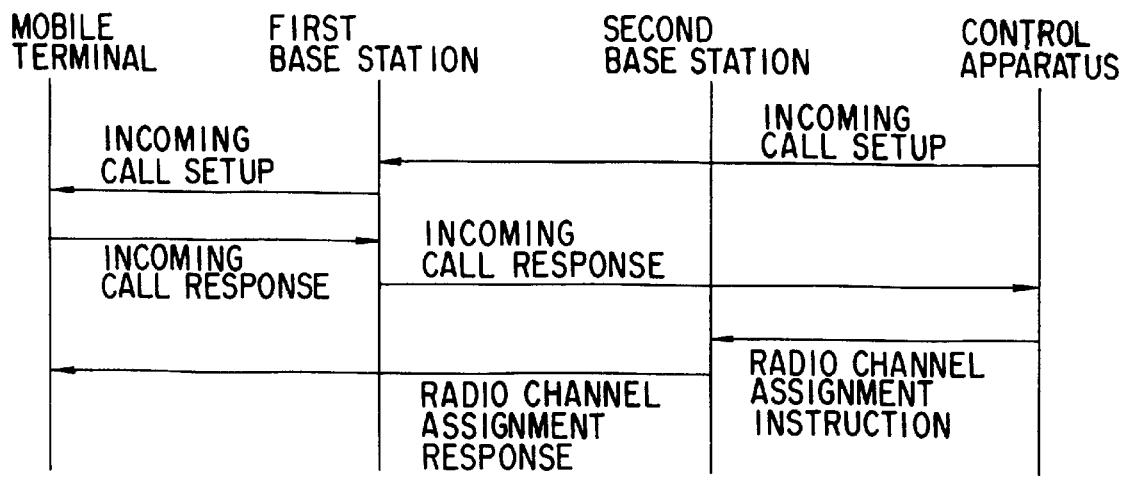
F I G. 15
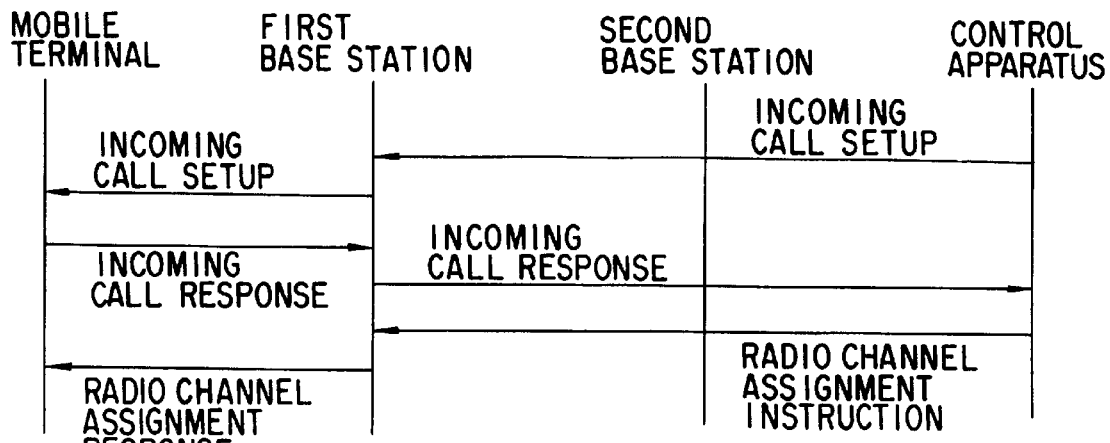
F I G. 16
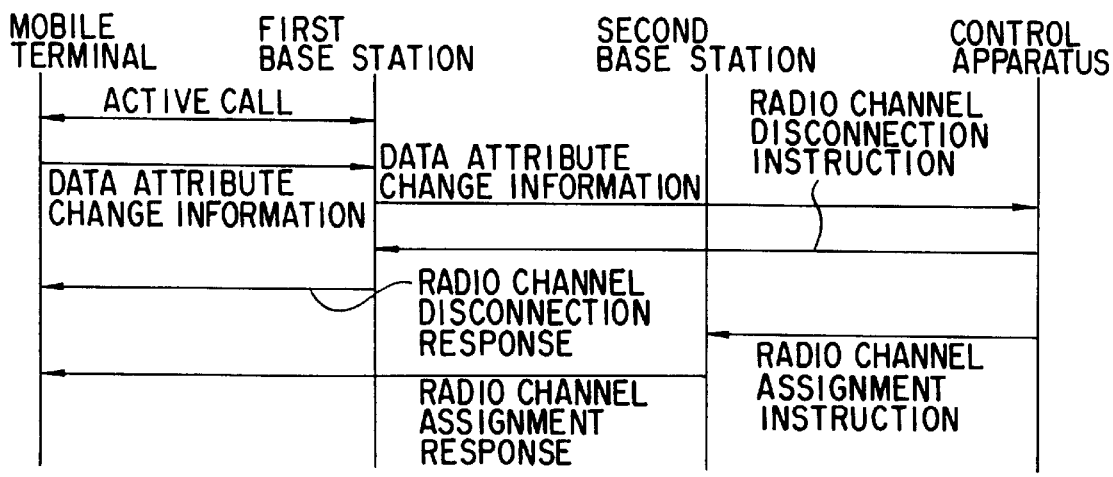
F I G. 17

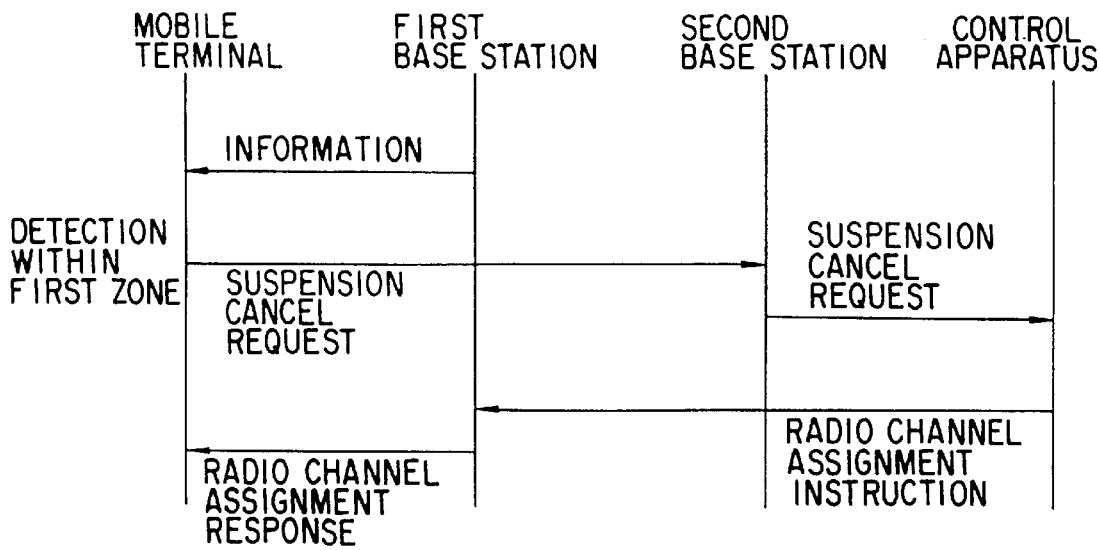
F I G. 36
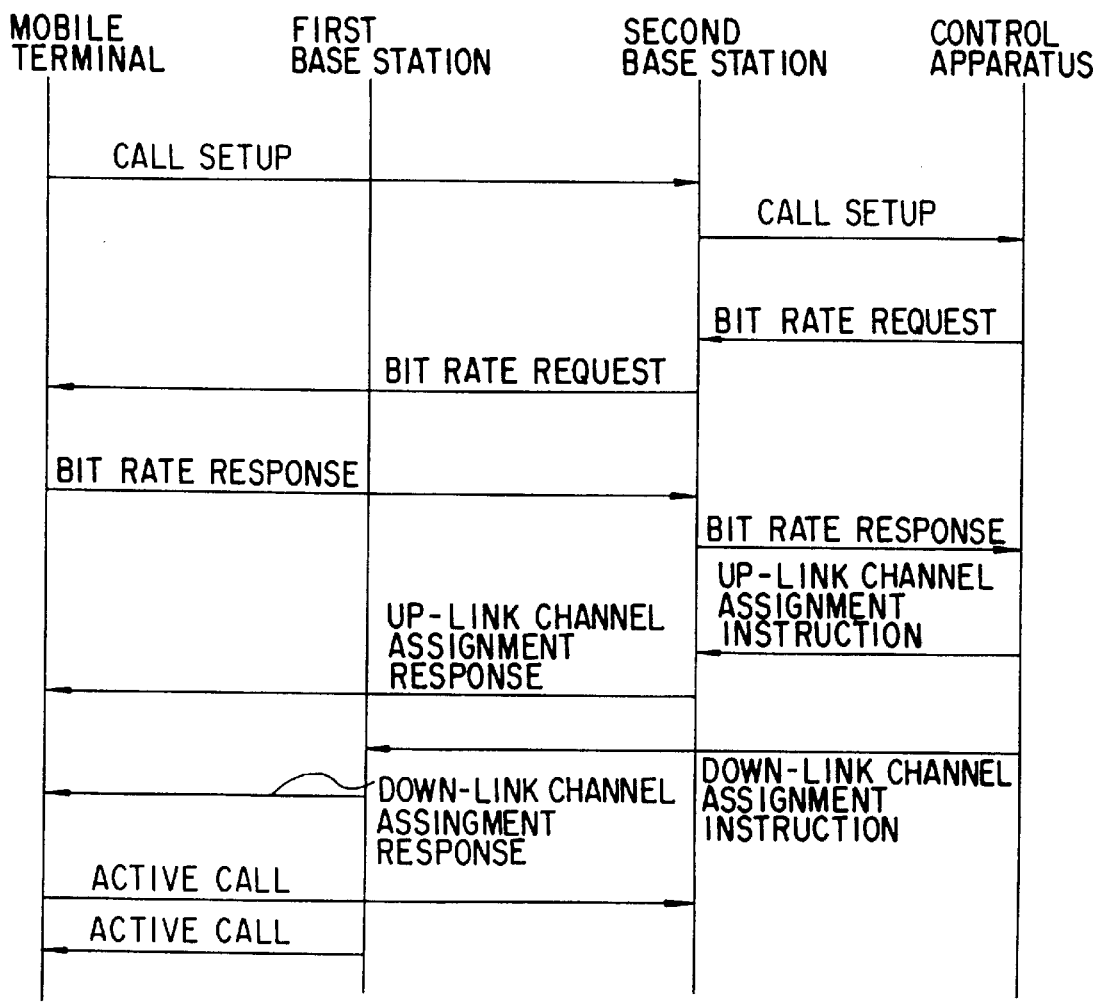
F I G. 37

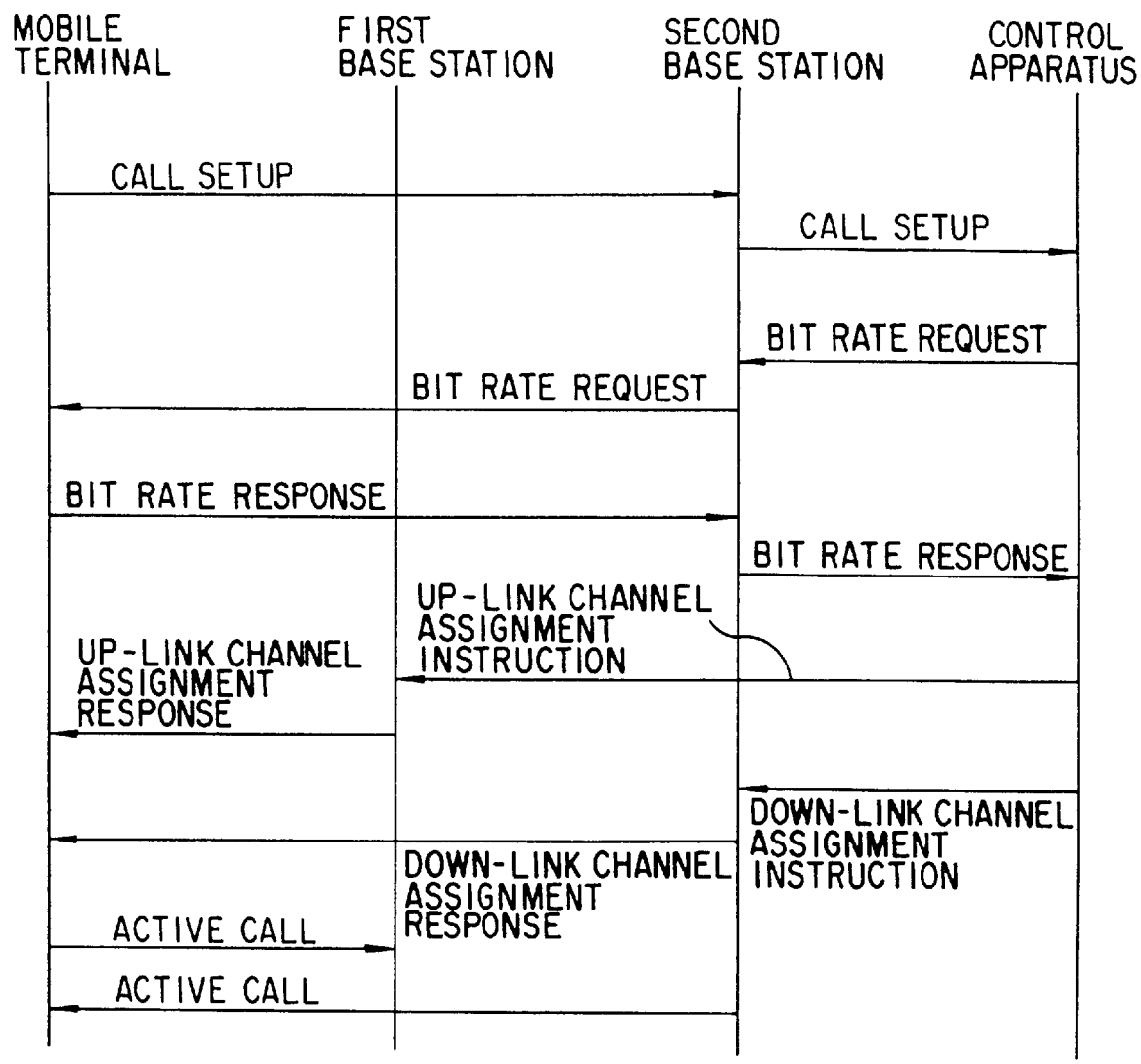
F I G. 38

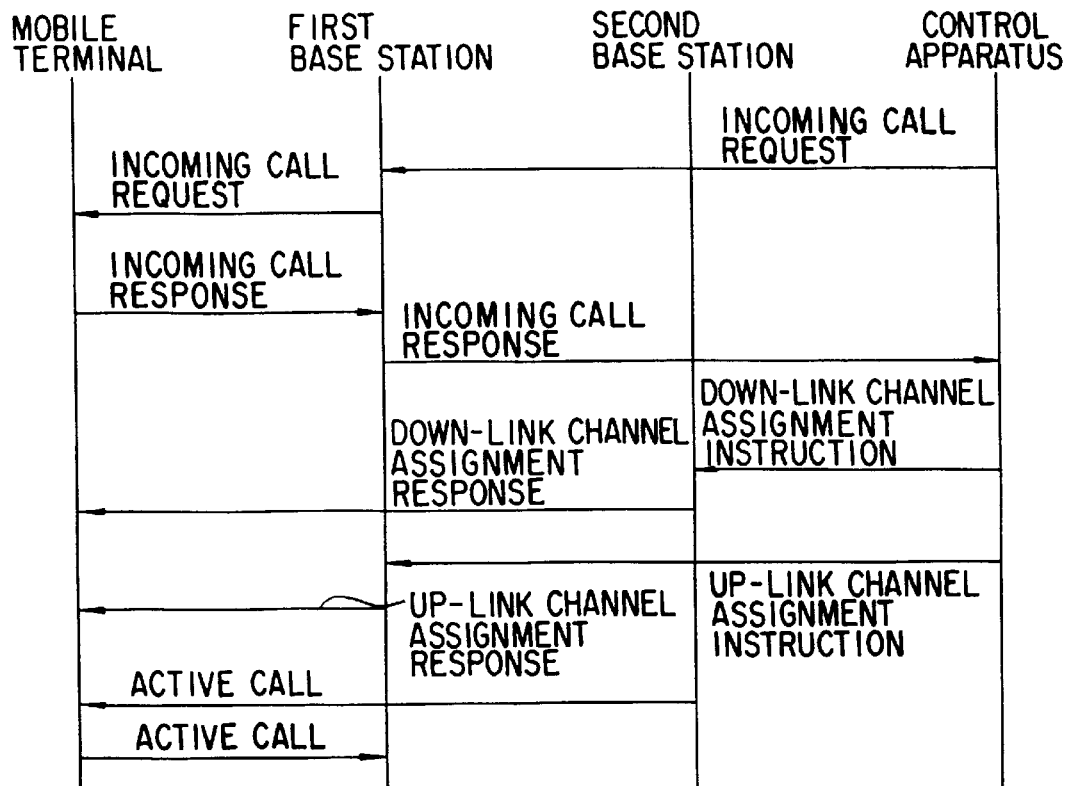
F I G. 39
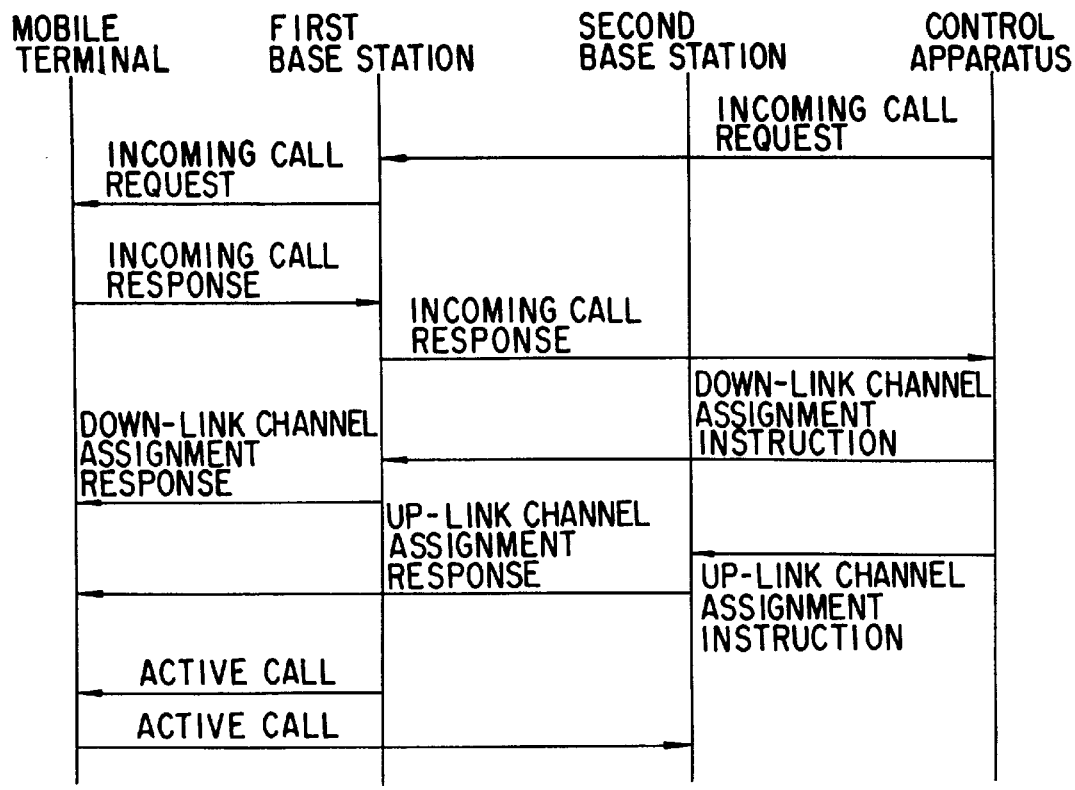
F I G. 40

MOBILE COMMUNICATION SYSTEM

BACKGROUND OF THE INVENTION

1. Field of the Invention

The present invention relates to a mobile communication system, such as automobile telephone system, portable telephone system, cordless telephone system, and radio LAN system.

2. Description of the Related Art

Mobile communication systems including automobile telephones and portable telephones are widely employed, and recently to cope with the increasing number of subscribers of such mobile communication systems, it has been attempted to dispose plural base stations in a service area, and use a same frequency between base stations at the shortest distance capable of repeatedly using the same frequency. That is, in the mobile communication systems such as automobile telephones and portable telephones, the location registration area is set in a wide area unit covering an entire state or a region of a state. In this area, plural base stations are disposed discretely, and which location registration area a specific mobile station is present can be registered at the system side. When a certain mobile station is called, the called mobile station is called at once from all base stations in that location registration area, and the communication channel between the caller and the mobile terminal is maintained through the base station receiving the reply from the called mobile station, so that the communication is established. When the caller is a mobile terminal, call origination is noticed to the system side through the base station receiving the call origination from this mobile station. At the system side, from the location registration information of the mobile station at the called mobile station, the called station is called at once from all base stations in the area where the terminal location is registered, and the communication channel between the caller and the called terminal is maintained through the base station receiving the reply from the called mobile station, thereby establishing the communication. Thus, communication of the mobile station is enabled.

In such mobile communication system, by reducing the size of cell covered by one base station, the radio frequency band can be used more efficiently, so that more subscribers can be enrolled.

FIG. 1 is a block diagram showing a constitution of a conventional mobile communication system. In the diagram, $MS_1$ to $MS_m$ are mobile stations, $C_1$ to $C_n$ are cells, $BS_1$ to $BS_n$ are base stations, $LRA_1$ to $LRA_x$ are location registration areas, 1 is a mobile communication control apparatus, and 2 is a mobile communication wired network. More specifically, mobile stations $MS_1$ to $MS_m$ are movable terminals which can receive presentation of communication services by this mobile communication system.

Base stations $BS_1$ to $BS_n$ are stations for radio communication discretely disposed in the coverage area of service of the mobile communication system, and cells $C_1$ to $C_n$ are zones accessible by radio communication from any corresponding base station of the base stations $BS_1$ to $BS_n$. Herein, the region capable of receiving the radio wave from the base station $BS_1$ is the cell $C_1$, the region capable of receiving the radio wave from the base station $BS_2$ is the cell $C_2$, the region capable of receiving the radio wave from the base station $BS_3$ is the cell $C_3$, and so forth as shown correspondingly in the diagram.

The location registration areas $LRA_1$ to $LRA_x$ are areas for management and control for calling a corresponding mobile station when the mobile station is called by registering the locations of the mobile stations in plural cells.

The mobile communication control apparatus 1 registers locations of mobile stations in every one of the location registration areas $LRA_1$ to $LRA_x$, pages a mobile station when the mobile station is called, changes over the communication route so that the communication of the mobile station may be continued through the base station to cover the cell at the moving destination according to the move of the mobile station across cells after the call is set up, and provides other controls. The mobile communication control apparatus 1 also includes a paging controller PMB responsible for paging control of the mobile station when a mobile station is called.

The operation of such conventional mobile communication system is described below.

Each base station periodically informs the mobile stations of location registration data. When the mobile station receives this information and detects that it is within a new location registration area, the mobile station transmits its own ID (identification code) corresponding thereto. When the base station receives the ID, it transmits it to the control apparatus 1. At the control apparatus 1, on the basis of the ID, the location registration area to which the received base station belongs is registered in every mobile station to be ready for call to the mobile stations.

Or, when the power source of each mobile station is turned on, when the mobile station is moved to another cell, or when the mobile station is come into the service area from the outside of the service area of the radio communication, each mobile station transmits own ID (identification code) together with the location registration request. The base station receives it and sends the information to the control apparatus 1. At the control apparatus 1, on the basis of the received information, the location registration area to which the received base station belongs is registered in each mobile station, to be ready for call to the mobile stations.

Thus, for call connection, the location of the mobile stations is registered, and when a mobile station is called, the control apparatus 1 controls to page within all cells in the location registration area in which the called mobile terminal is registered by the paging controller PMB.

As a result, the objective mobile station is called from all base stations in the location registration area in which the called mobile station is registered. When the called mobile station responds, it is received by a base station, which returns to the response to the control apparatus 1, and the control apparatus 1 keeps the communication route between the called mobile station and the caller's terminal through the receiving base station, so that the communication between the two parties is enabled.

In such a conventional mobile communication system, when a certain mobile station is called, a paging signal is transmitted at once from all base stations in all cells belonging to the location registration area in which the called mobile station is registered.

However, the called mobile station is located only in a specific cell in the location registration area, and can communicate only with the base station responsible for communication service of that cell, but cannot communicate with base stations in other cells. What's more, the location registration area is vast, and there are many base stations in the location registration area, and it is an utter waste to send paging signals by base stations in the cells in which the called mobile terminal is not present.

Every time the mobile station is called, such paging signal is transmitted from all base stations in the cells belonging to the location registration area in which the specific mobile station is registered, which is a mere increase traffic by useless call in other base stations.

To save such traffic in each base station and utilize the radio channel efficiently, it seems enough to narrow the location registration area, but when the location registration area is narrowed, in turn, it is highly possible that the mobile station soon moves to other location registration area, and the location must be registered frequently, and thus although the paging traffic is decreased, the location registration traffic increases.

Thus, relating to the size of the location registration area, a trade-off occurs between the location registration traffic and paging traffic. It has been hence considered to set the location registration area on the basis of the mobility of each mobile station and the incoming call rate.

Anyway, in such location registration method and paging method, the future multimedia possibility of mobile communication is not taken into consideration, and wasteful control traffic may occur when communications by various media have come to be used in the mobile communication system.

It is therefore demanded to develop a technology capable of reducing such wasteful control traffic at the time of call connection control.

Moreover, as described above, in the mobile communication systems such as automobile telephones and portable telephones employing the system of disposing plural base stations in a service area, and using the same frequency between base stations at the shortest distance capable of repeatedly using the frequency, to cope with the increasing number of subscribers, it has been attempted to utilize the radio frequency band more efficiently, by reducing the size of the cells formed by one base station, and shortening the distance allowing to use the same frequency repeatedly. As a result, more subscribers can be enrolled.

However, when the size of cell is smaller, it causes to increase the number of times of hand-off for changing over the cells during communication as the mobile station moves during communication. At the time of hand-off, the communication is interrupted for a moment, and as the coverage area of the cell becomes narrower, it causes to increase the control for hand-off.

To solve such problem, there is proposed a mobile communication system of hierarchical cell organization by disposing cells of different sizes in the service area. Such a mobile communication system is described below by referring to a block diagram in FIG. 2.

In the service area, plural first cells $CS_1$ to $CS_n$ covering a geographically narrow range, and plural second cells $CL_1$ to $CL_m$ covering a wider range geographically than the first cells are disposed. The first cells $CS_1$ to $CS_n$ are composed of first base stations $BSS_1$ to $BSS_n$, and the second cells $CL_1$ to $CL_m$ are composed of second base stations $BSL_1$ to $BSL_m$. A communication control apparatus 3 in the mobile communication system includes a movement detector 4 for controlling the mobile communication system depending on the moving speed of the mobile station. The mobile communication system presents communication service by the second cells of wider range to the mobile station moving at high speed, and presents communication service by the first cells of narrower range to the mobile station moving at low speed. In such mobile communication system, as compared with the mobile communication system covering the entire service area by plural cells of same coverage range, the number of times of hand-off can be decreased without sacrificing the utility efficiency of the radio frequency band.

However, as the mobile communication system for selecting the cells for presenting service to mobile stations, only the above mobile communication system operating on the basis of the moving speed of mobile station has been proposed so far, and nothing has been proposed about the mobile communication system capable of selecting the cells for presenting service to the mobile station on the basis of other parameters than the moving speed.

On the other hand, as the modern communication is in the trend of multimedia and personal use, it gives rise to need of transmitting in a system suited to individual types of information, in consideration of the types of information to be transmitted, particularly in the case of transmission of multimedia information. In the conventional mobile communication systems mentioned so far, however, no consideration is given to transmission of multimedia information, and it seems to cause various problems, including worsening of utility efficiency of radio channels, increase of control quantity of the radio network, and lowering of service quality.

SUMMARY OF THE INVENTION

It is hence an object of the present invention to solve the problems of the mobile communication systems mentioned above, and provide a mobile communication system capable of decreasing the control traffic required for location registration and paging.

It is another object of the present invention to solve the problems of the mobile communication systems mentioned above, and provide a mobile communication system capable of decreasing the control quantity of mobile communication system and enhancing the utility efficiency of radio frequency band.

It is a further object of the present invention to provide a mobile communication system suited to transmission of multimedia information.

To achieve the objects, the present invention is constituted as follows. In a mobile communication system composed by disposing plural cells in every location registration area, capable of presenting plural types of communication service to mobile stations; in a first aspect, information of allowance of delay of call connection is added to the call to a mobile station, when call setup delay is not permitted as judged from the information of this allowance, the called mobile station is paged by all cells in the location registration area at once, and when the call setup delay is permitted, the called mobile station is paged sequentially in the unit of certain cells in the location registration area.

In a second aspect, the allowable limit time for paging upon occurrence of call to a mobile station is specified in each type of call, a timer function for monitoring the paging time is provided, information of allowance of delay of call connection is added to the call to a mobile station, when call setup delay is not permitted as judged from the information of this allowance, the called mobile station is paged by all cells in the location registration area at once, and when the call setup delay is permitted, the called mobile station is paged sequentially in the unit of certain cells in the location registration area, while each paging is addressed at once to all cells in the location registration area by the upper limit of the allowable limit time corresponding to each type of call.

In a third aspect, the location of each mobile station is held as the call termination cell location information in each cell at the time of call termination of the mobile station; and when the mobile station is called, a first paging is effected in the cell corresponding to the call termination cell location information, on the basis of the call termination cell location information of the called mobile station of that call, and when not responded from the called mobile station, it is paged at once by all other cells in the location registration area in which the pertinent mobile station is registered of location.

In a fourth aspect, the location of each mobile station is held as the call termination cell location information in each cell at the time of call termination of the mobile station; information of allowance of delay of call connection is added to the call to a mobile station, and when call setup delay is not permitted as judged from the information of this allowance, first paging is effected in the cell corresponding to the call termination cell location information, on the basis of the call termination cell location information of the mobile station of the called terminal corresponding to the call; and when the call is allowed to have call setup delay, on the basis of the call termination cell location information of the mobile station of cell designation corresponding to the call, first paging is effected in the cell corresponding to the call termination cell location information, or in certain cells in the location registration area including this cell, and if not responded from the called mobile station, it is paged sequentially to the called mobile station of the call in the unit of other certain cells in the location registration area in which the pertinent mobile station is registered of location.

Also to achieve the objects, the mobile communication system of the present invention is a mobile communication system capable of presenting communication service to plural mobile stations in first and second cells, by setting plural first cells capable of offering communication service, and plural second cells capable of offering communication service in a wider geographical range than the first cells, and geographically overlapping with the first cells, in a service area of a specific vastness, which comprises a cell selector for selecting at least either cells of first cells and second cells, and using the selected cells as the cells for presenting communication service to the mobile station, on the basis of the information attribute possessed by the information communicated with the mobile station and the information ability possessed by the information.

According to the present invention, information of allowance of delay of call connection is added to the call to a mobile station, when call setup delay is not permitted as judged from the information of this allowance, the called mobile station is paged by all cells in the location registration area at once, and when the call setup delay is permitted, the called mobile station is paged sequentially in the unit of certain cells in the location registration area.

In the present invention, when the call setup delay is permitted, since the called mobile station is paged sequentially in the unit of certain cells in the location registration area, the traffic for paging to the call is decreased in the individual cells, so that the traffic reducing effect may be expected.

The allowable limit time for paging upon occurrence of call to a mobile station is specified in each type of call, a timer function for monitoring the paging time is provided, and therefore the paging time can be limited to the upper limit of the allowable time limit. Moreover, information of allowance of delay of call connection is added to the call to a mobile station, when call setup delay is not permitted as judged from the information of this allowance, the called mobile station is paged to all cells in the location registration area at once, and when the call setup delay is permitted, the called mobile station is paged sequentially in the unit of certain cells in the location registration area, and further each paging is stopped by the upper limit of the allowable limit time corresponding to each type of call.

When the call setup delay is permitted, the called mobile station is paged sequentially in the unit of certain cells in the location registration area, and therefore, in the individual cells, the traffic for paging to call is decreased, and the traffic reducing effect is expected, and moreover since paging is stopped by the upper limit of the allowable limit time corresponding to each type of call, paging is not continued wastefully, so that a lowering of service due to an increase of the traffic for call connection may be prevented.

The position of each mobile station is held as the position information of the cell at call termination in each cell at call termination of the mobile station, and when a specific mobile station is called, first paging is done in the cell corresponding to the location information of the cell at call termination, on the basis of the location information of the cell at call termination of the called mobile station corresponding to the call, and when not responded from the called mobile station, paging is effected simultaneously from all other cells in the location registration area in which the mobile station is registered.

Since paging for the call to a mobile station is first effected from the cell at call termination of the mobile station, the probability of response from the called mobile station is high, and it is not necessary to page from other cells wastefully, so that the traffic reducing effect is expected. When call setup delay is allowed, paging is done sequentially to the called mobile station corresponding to the call in the unit of several cells in the location registration area, so that the traffic for paging to the call is decreased in the individual cell, so that a greater traffic reducing effect may be expected.

The location of each mobile station is held as the call termination cell location information in each cell in use at the time of call termination of a specific mobile station, and information of allowance of delay of call connection is added to the call to a mobile station, and when call setup delay is not permitted as judged from the information of this allowance, first paging is effected in the cell corresponding to the call termination cell location information, on the basis of the call termination cell location information of the mobile station of cell designation corresponding to the call, and when the call is allowed to have call setup delay, on the basis of the call termination cell location information of the mobile station of cell designation corresponding to the call, first paging is effected in the cell corresponding to the call termination cell location information, or in certain cells in the location registration area including this cell, and if not responded from the called mobile station, it is paged sequentially to the called mobile station of the call in the unit of other certain cells in the location registration area in which the pertinent mobile station is registered of location.

Since paging for the call to a mobile station is first effected to the cell in use at the time of call termination of that mobile station, the probability of response of the called mobile station is high, and useless paging to other cells is avoided, and hence the traffic reducing effect is expected. When the call setup delay is permitted, the called mobile station is sequentially paged in the unit of certain cells in the location registration area, and therefore the traffic for paging to the call is decreased in other cells, so that a further traffic reducing effect may be expected.

According to the present invention, different from the conventional mobile communication system intended to enhance the state of communication only by the moving speed of mobile station, it is intended to control to improve the communication quality, on the basis of the information attribute and information ability most closely related with the communication quality, and therefore as compared with the mobile communication system for selecting the cell for presenting service to the mobile station from the cells of plural sizes depending only on the moving speed of the station, it is possible to build up the mobile communication system capable of presenting communication service that can satisfy the required quality of information communicated through mobile stations.

At the same time, it is also possible to decrease the number of times of hand-off done during communication of mobile station, and the control quantity of mobile communication system can be decreased.

Moreover, the radio channel can be utilized efficiently, and the accommodation capacity of mobile stations of the mobile communication system can be increased.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 3 is a block diagram showing a constitution of a first embodiment of mobile communication system of the present invention;

FIG. 4 is a flowchart for explaining an example of operation of the first embodiment;

FIG. 5 is a block diagram showing a constitution of a fifth embodiment of mobile communication system of the present invention;

FIG. 6 is a block diagram showing a constitution of a sixth embodiment of mobile communication system of the present invention;

FIG. 12 is a diagram showing the operation of the ninth embodiment;

FIG. 15 is a diagram showing an example of operation when a mobile station is called in the tenth embodiment;

FIG. 16 is a diagram showing other example of operation when a mobile station is called in the tenth embodiment;

FIG. 17 is a diagram showing an example of operation when a mobile station sets up a call and the request to communication is changed at the call calling station in the tenth embodiment;

FIG. 36 is a diagram showing other example of operation of the seventeenth embodiment;

FIG. 37 is a diagram showing an example of operation of an eighteenth embodiment of mobile communication system of the present invention;

FIG. 38 is a diagram showing other example of operation of the eighteenth embodiment;

FIG. 39 is a diagram showing other example of operation of the eighteenth embodiment; and FIG. 40 is a diagram showing other example of operation of the eighteenth embodiment.

DETAILED DESCRIPTION OF THE PREFERRED EMBODIMENTS

Figure 1:
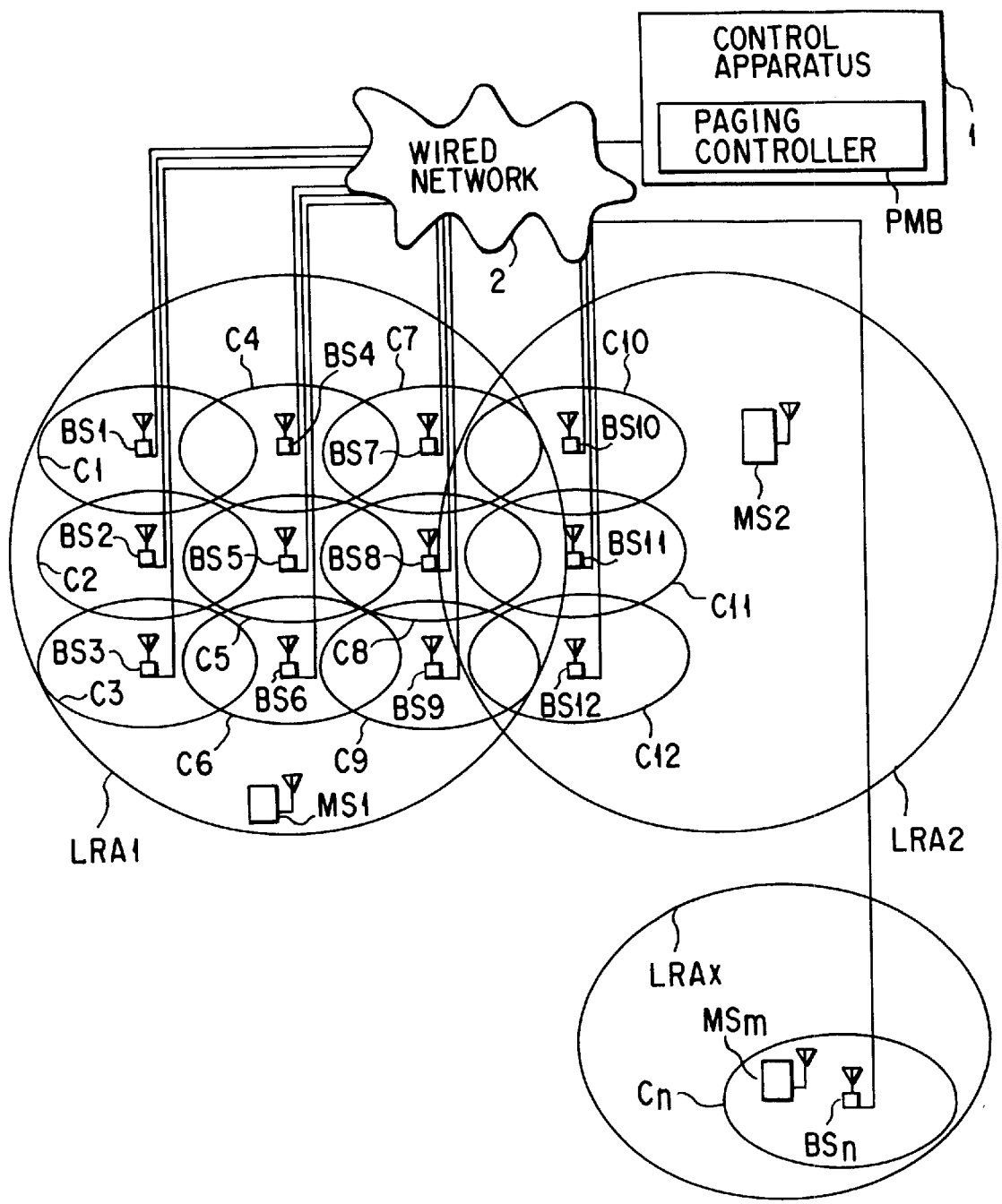
FIG. 1 is a block diagram showing a constitution of a first prior art of mobile communication system.
Figure 2:
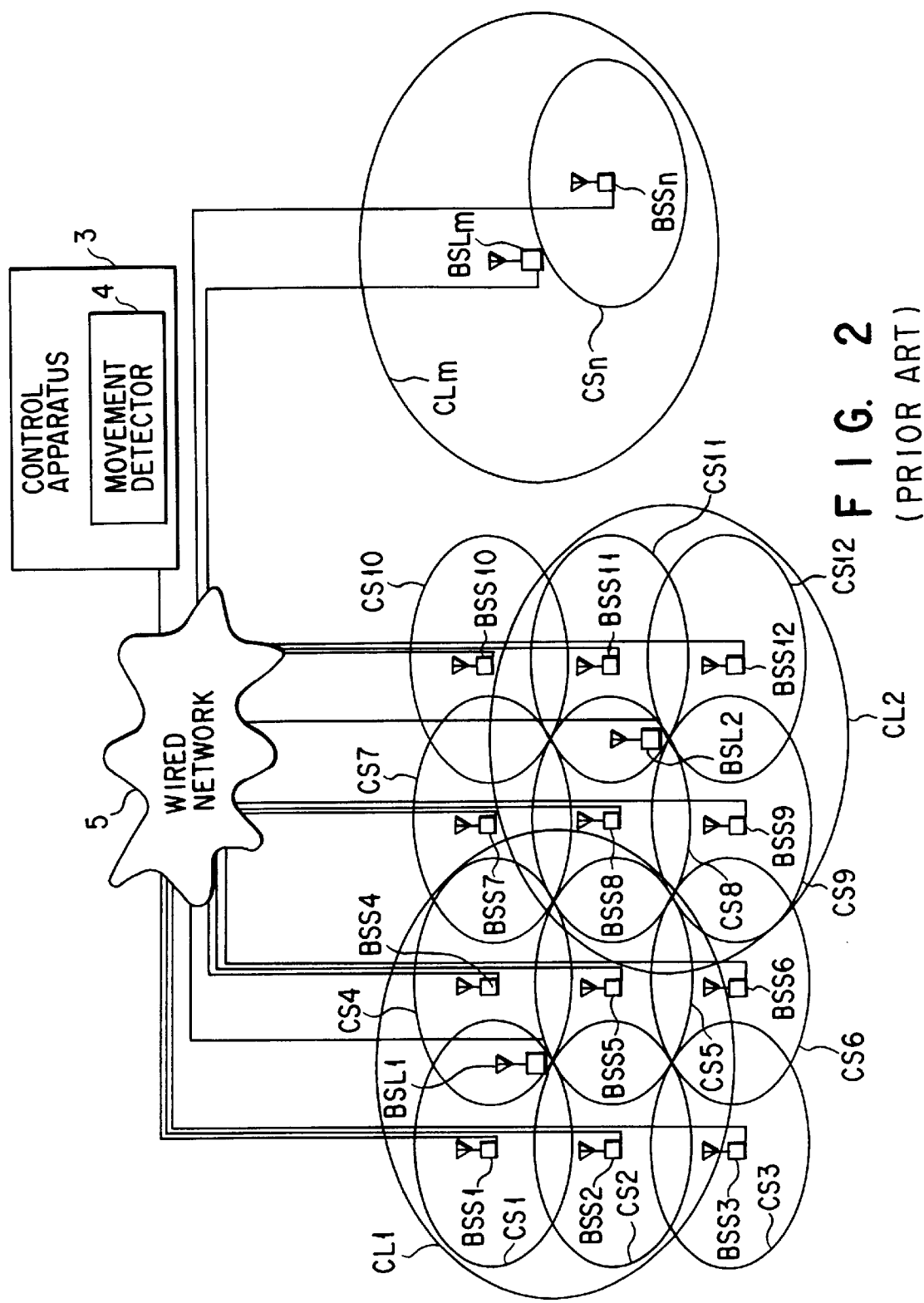
FIG. 2 is a block diagram showing a constitution of a second prior art of mobile communication system.

A preferred embodiment of a mobile communication system according to the present invention will now be described with reference to the accompanying drawings.
(First Embodiment)

FIG. 3 is a block diagram showing a constitution of a first embodiment.

The mobile communication system of the present invention comprises plural mobile stations $MS_1$ to $MS_m$ for receiving presentation of communication service from the mobile communication system, plural cells $C_1$ to $C_n$, plural base stations $BS_1$ to $BS_n$ for forming the plural cells $C_1$ to $C_n$, location registration areas $LRA_1$ to $LRA_x$ constituted by including the plural cells $C_1$ to $C_n$, at least one or more mobile communication control apparatus 10 for controlling the mobile communication system, and a mobile communication wired network 12 for connecting the base stations $BS_1$ to $BS_n$ and mobile communication control apparatus 10.

The control apparatus 10 is intended to control connection between a caller and callee when a call occurs, and controls to page the called mobile station when a call occurs.

The control apparatus 10 comprises at least one or more paging controllers $PMA_1$ to $PMA_k$, and a paging procedure selector 14 for selecting a desired paging controller, depending on the type of communication, out of these paging controllers $PMA_1$ to $PMA_k$. The paging controllers $PMA_1$ to $PMA_k$ are to store the procedure for paging a mobile station, and control the paging according to the procedure, and these paging controllers $PMA_1$ to $PMA_k$ are dependent on the allowance of call setup delay which may occur at the time of call connection when the mobile station is called.

That is, in this system, by giving the allowance of call setup delay depending on the type of information to be communicated, it is intended to page according to the permitted level of delay of call connection depending on this allowance and the traffic of the radio circuit.

It is the paging controllers $PMA_1$ to $PMA_k$ that control to page according to the permitted level of delay, and, for example, the paging controller $PMA_1$ permits the shortest level 1 of delay time, the paging controller $PMA_2$ permits a slightly longer level 2 of delay time, the paging controller PMA3 permits a further longer level 3 of delay time, . . . , and the paging controller $PMA_k$ permits the longest level k of delay time, so that the paging controllers $PMA_1$ to $PMA_k$ may be selected depending on the tolerance (delay time).

The paging controller $PMA_1$ of level 1 controls so as to page through all base stations in the pertinent location registration area in which the called mobile station is registered of location. The paging controller $PMA_2$ of level 2 makes a first paging through certain base stations in the pertinent location registration area in which the called mobile station is registered of location, and when not responded, it controls to make a second paging through all other base stations than the base stations used in the first paging, out of the base stations in the pertinent location registration area in which the called mobile station is registered of location. The paging controller PMA3 of level 3 makes a first paging through certain base stations in the pertinent location registration area in which the called mobile station is registered of location, and when not responded, it makes a second paging through some of all other base stations than the base stations used in the first paging, out of the base stations in the pertinent location registration area in which the called mobile station is registered of location, and when not responded, it controls to make a third paging through all other base stations than the base stations used in the first and second paging, out of the base stations in the pertinent location registration area in which the called mobile station is registered of location. The paging controller $PMA_k$ of level k judges the traffic quantity, and waits, if the traffic is heavy, until the traffic is lessened, and makes a first paging through certain base stations in the pertinent location registration area in which the called mobile station is registered of location, and if not responded, it makes a second paging through all other base stations than the base stations used in the first paging, out of the base stations in the pertinent location registration area in which the called mobile station is registered of location, and thus it is designed to control paging by repeating this action k times. It is possible to modify the other paging controllers $PMA_1$ to $PMA_{k-1}$ that the traffic quantity is monitored.

The allowance of call setup delay is specified at the caller station to originate a call, and the paging procedure selector 14 is designed to select an optimum one of the paging controllers $PMA_1$ to $PMA_k$ by referring to the information of allowance of call setup delay sent from the caller station at the time of call.

The allowance of call setup delay is determined by such a guideline that level 1 for voice communication and emergency data, level 2 or level 3 for data of less urgent message or memo, and level k-1 or level k for data with time allowance until transmission.

Incidentally, functions of controlling for location registration in the unit of location registration area in which the mobile station is present, and holding the location registration information obtained as a result thereof are realized by the location information memory device responsible for location information registration control function initially provided in the existing mobile communication system, and the control apparatus 10 refers to the information of the function as required.

The operation of the embodiment of thus constituted mobile communication system is described below.

The following is an example of operation in which a certain mobile station is called, and a paging controller is selected for paging the mobile station on the basis of the allowance of the call setup delay occurring at the time of call connection. In FIG. 3, meanwhile, there are k paging controllers from $PMA_1$ to $PMA_k$, but for the simplicity of explanation, it is supposed that there are only two, that is, paging controller $PMA_1$ corresponding to level 1, and paging controller $PMA_2$ corresponding to level 2. Therefore it is the paging controller $PMA_1$ of level 1 that is used when the allowance of call setup delay is small, and it is the paging controller $PMA_2$ of level 2 that is used when the allowance of call setup delay is large.

FIG. 4 is a flowchart showing the operation of the control apparatus 10 when the mobile terminal is called in the mobile communication system relating to the first embodiment. The following explanation is given according to this flowchart.

The station of the caller side wishing to communicate with a mobile station notifies the control apparatus 10 of the allowance about the call setup delay of communication when originating a call. Receiving it, the control apparatus 10 controls so that, at step $S_1$, the paging procedure selector 14 may select an optimum one of the paging controllers $PMA_1$ to $PMA_k$ (in this case, up to $PMA_2$), on the basis of the information of allowance about call setup delay. Alternatively, the allowance about call setup delay may be specified by the callee.

For example, when the allowance about the call setup delay is small and the allowable call setup delay time is short, the paging procedure selector 14 select the paging controller $PMA_1$. As a result, the paging controller $PMA_1$ controls to page the called mobile station through all base stations in the location registration area in which the called mobile station is registered, and according to this control output, therefore, the control apparatus 10 controls to page the base stations in the location registration area in which the called mobile station is registered of location. As a result, the called mobile station is paged (step S2).

At step S3, it is judged if responded from the called mobile station or not, and when responded, at step S4, the caller station and the called mobile station are allowed to communicate by call connection. If not responded from the called mobile station, at step S5, the call is rejected, and paging is stopped, and failure of call connection is noticed to the caller station.

In this way, when the allowance about the call setup delay is small and the allowable call setup delay time is short, it is controlled to page the called mobile station through all base stations in the location registration area in which the called mobile station is registered. As a result, for example, if the mobile station $MS_1$ registered in the location registration area $LRA_1$ is called, all cells included in the location registration area $LRA_1$ will page. Unless the power source of the called mobile station has been turned off or it is located under the ground or other poor radio receiving and transmitting condition, it can be promptly paged without call setup delay, and the called mobile station can be connected for call.

On the other hand, when the allowance about the call setup delay received from the caller side is large, an incoming call of a long allowable call setup delay time is received at the called mobile station. In this case, the paging procedure selector 14 of the control apparatus 10 selects the paging controller $PMA_2$.

An example of operation of the paging controller $PMA_2$ is described below.

When the paging controller $PMA_2$ is selected, this paging controller $PMA_2$ makes a first paging of the called mobile station at step S6 through certain base stations in the location registration area in which the called mobile station is registered. At step S7, it is judged if the first paging is responded from the called mobile station or not. If responded, at step S8, the caller station and the called mobile station are connected for communication through the base station that has received the response.

On the other hand, if the first paging is not responded from the called mobile station, at step S9, second paging is attempted by all other base stations than those used in the first paging in the location registration area.

At step S10, it is judged if the second paging is responded by the called mobile station. If responded, at step S11, the calling station and the called mobile station are connected for communication through the base station that has received the response.

If, however, the second paging is not responded from the called mobile station, the call is rejected at step S12, and paging is stopped, and failure of connection is reported to the calling station.

In the divisional paging action by partial base stations mentioned above, it is also possible to repeat three or more times by using three or more paging controllers.

As described above, according to the present embodiment, when the allowance about the call setup delay is large, instead of paging simultaneously from all base stations in the location registration area, all cells in the location registration area are divided into plural groups, and by paging sequentially in each group and controlling to cause call setup delay aggressively, it is possible to decrease the paging traffic at individual base stations. By increasing the number of times of paging, it is highly possible that a large call setup delay may occur, but, to the contrary, the paging traffic can be further decreased.

Other embodiment of the present invention is described. In the following description, the parts corresponding to the first embodiment are identified with same reference numerals and detailed description is omitted.

(Second Embodiment)

As a second embodiment it is described how to select part of base stations in the location registration area for paging when the allowance about the call setup delay is large. That is, as a method of selecting cells for first paging and cells for second paging, the second embodiment employs a method of making first paging to the cell in which the mobile station was present when the last call was terminated at the called mobile station, or to that cell and at least one or more adjacent cells.

When the last call of the called mobile station was terminated, the mobile communication system knows in which cell the mobile station was present at that time. The mobile station may move wherever depending on the behavior of the user, but the moving range is not so wide in most cases, and by making use of trend characteristics, the first paging is effected to the cell in which the mobile station was present at the latest call termination, or this cell and at least one or more adjacent cells. This operation is further described below.

In this case, suppose the mobile station has received an incoming call which is large in the allowance about call setup delay and long in the allowable call setup delay time. Herein, all cells in the location registration area in which the called mobile station is registered of location are divided into a first cell group which is a group of high possibility of existence of the called mobile station, and a second cell group which is a group of low possibility of existence of the called mobile station. On the basis of the past history of movements of the mobile station, a zone of high possibility of existence of the mobile station can be predicted to a certain extent, but on the moment of occurrence of call origination, first paging is effected to the first cell group of high possibility of existence of the called mobile station, and when the first paging is not responded from the called mobile station, second paging is effected to the second cell group of high possibility of existence of the called mobile station.

It is also possible herein to divide the cells in the location registration area into three or more groups, and page three or more times.

According to the second embodiment, when the allowance about call setup delay is large, in the case of controlling by dividing the cells into plural groups, and paging sequentially in each group to cause call setup delay aggressively, by making first paging to the cell in which the called mobile station was present at the termination of call termination or its adjacent cell including it, the probability of capturing the called mobile station is high, and it is highly possible to connect the called mobile station in a short time by minimizing the occurrence of lost call. If failing to capture the called mobile station by the cells of first paging, it is controlled to attempt a second paging in the second paging cells, and although the number of times of paging increases and the possibility of occurrence of large call setup delay increases, to the contrary, the paging traffic in the individual base stations can be further decreased.

In the second embodiment thus described, all cells in the location registration area are divided into first group of high possibility of existence of the called mobile station and second group of low possibility of existence, and when a call is originated, first paging is effected to the first group cells of high possibility of existence of the called mobile station, and if the first paging is not responded from the called mobile station, second paging is effected to the second group cells of low possibility of existence of the called mobile station, thereby paging effectively.

(Third Embodiment)

Other paging control is described in a third embodiment.

Herein, first and second cell groups are not divided by the possibility of existence of the called mobile station, but the cell (only one cell) in which the station was present at the termination of the last call of the called mobile station is defined as the first cell group, and all other cells are included in the second cell group.

First paging is effected to the first cell group only, and if the first paging is not responded from the called mobile station, the second cell group is paged.

That is, when the called mobile station is called of large allowance about call setup delay and long allowable call setup delay time, first paging is attempted only in the cell in which the called mobile station was present at the termination of the last call in the registered location registration area. If the first paging is not responded from the called mobile station, second paging is made in the remaining plural cells not contributing to the first paging, in the cells included in the location registration area.

The first cell group may be, same as in the second embodiment, composed of plural cells including the cell existing at the termination of the last call and its neighboring plural cells. The number of divisions of paging is not limited to two, but second paging may be made in plural cells near the cell of the first paging, and third paging may be made in other cells not paged first and second time, among the cells included in the location registration area. Similarly, the number of divisions of paging may be also four or more.

Also in the third embodiment, when the allowance about call setup delay is large, by deliberately causing the call setup delay, the paging traffic can be decreased. Besides, by increasing the number of times of paging, possibility of occurrence of large call setup delay may be increased, but, to the contrary, the paging traffic can be further decreased.

(Fourth Embodiment)

A fourth embodiment is described. Herein, if a mobile station is called, in the case of an incoming call of a long allowable call setup delay time, it is not paged immediately, but paged after the cell in which the called mobile station is present is confirmed by the call origination operation of the called mobile station, or by the call incoming operation of a call of small delay allowance. Hence, wasteful paging traffic can be eliminated. This embodiment is effective when transmitting less urgent messages.

This is specifically described below. When a mobile terminal is called of large allowance about call setup delay is large and long allowable call setup delay time, the control apparatus 10 does not page the called mobile station until it is confirmed that the called station is present in the cell by detecting a call origination or a incoming call reception by the called station, first paging is attempted in the cell in which the called mobile station is present.

If the first paging is not responded from the called mobile station, in the cells included in the location registration area in which the location of the called mobile station is registered, second paging is attempted in plural cells not paged the first time. Herein, paging may be divided into three or more times.

In this operation, as seen from the caller side, the call setup delay is significantly large, but it is effective for reducing the traffic in the case of communication of very low degree of emergency. In most cases, since call connection is possible by first paging, and by paging only the cell in which the called partner is present after locating the callee's place securely, the paging traffic can be substantially decreased at the base stations.

(Fifth Embodiment)

In any one of the four foregoing embodiments, the connection time limit is predetermined depending on the allowance about the call setup delay, and when the cell in which the mobile station is present is detected before reaching the time limit, paging is done in the procedure described above, but when exceeding the time limit, paging is terminated by processing as rejected call. This prevents from paging continuously to no avail, and the paging traffic in each base station can be notably curtailed while improving, if slightly, the connection delay. On the other hand, in each embodiment, cells in the location registration area are divided into plural groups according to priority order, and paging is effected in order of priority. If, however, divided into multiple cell groups, paging must be repeated may times depending on the location of the called station, and the call setup delay is elongated unnecessarily. Accordingly, in a fifth embodiment, when reaching the time limit, it is controlled to page in all remaining cells in the location registration area immediately. Hence, the upper limit of call setup delay can be definitely determined. The time limit of connection is determined at an optimum value, for example, by each type of call beforehand.

FIG. 5 shows a constitution of a mobile communication control apparatus 10a of the fifth embodiment. The control apparatus 10a comprises a selector 14a, a table memory 16, and a timer group 18, and the memory 16 stores the connection delay allowable upper limit of each type of call. The type of call includes an emergency mail, telephone, or non-emergency mail. The timer group 18 comprises plural timers for measuring the paging time (connection delay) for every call, and it is designed to manage the paging time in each call.

The selector 14a controls paging by selecting a paging controller corresponding to the paging control procedure corresponding to the allowance of delay, in each incoming call, out of paging controllers $PMA_1$ to $PMA_k$, and obtains the time limit value of each type of call from the call type information, and command the time limit control by the time limit value to the timer group 18. By this command, the timer group 18 executes management of paging time corresponding to an incoming call, and when the time expires (over the time limit value), such information is sent to the selector 14a. Receiving the time over information, the selector 14a selects the paging controller $PMA_1$, and controls the management to change over to simultaneous paging control from all base stations.

According to the fifth embodiment, the control apparatus 10a comprises the memory 16 for storing the connection delay time limit table specifying the time limit value corresponding to the type of each call, and the timer group 18 for managing the paging time in every call. When receiving a call from a station, the type of call is judged, and the timer is set according to the type, and if not responded from the called station after the time limit, paging is effected from all other base stations not used so far in paging, belonging to the location registration area in which the location of the called mobile station is registered. As a result, the incoming call may be noticed easily to the called station.

The upper time limit of connection delay is preliminarily stored in the table, but, instead, various modifications may be possible. For example, when receiving a call, it is also possible to request connection time limit from the calling station. In this case, between the control apparatus 10a and the station, it is necessary to send and receive the request for time limit of connection and its reply through a base station and wired network 12, but the benefit is that the connection time limit can be set flexibly in each call.

Incidentally, when receiving a call of high delay allowance, that is, when a mobile station is called large in allowance about call setup delay and long in allowable call setup delay time, the control apparatus 10a can page the called mobile station firstly immediately after the location registration by the cell in which the called mobile station is registered of location, or in plural cells adjacent to this cell.

As a result, the call setup delay is increased, but, to the contrary, the paging traffic can be decreased significantly. In this case, too, by determining the connection time delay as mentioned above, when the cell in which the mobile station is present is identified as the location is registered before reaching the time limit, it is paged in the same procedure as mentioned above, but if reaching the time limit, it may be controlled to page immediately in all cells in the location registration area.

(Sixth Embodiment)

The foregoing embodiments relate to examples of direct communications between the calling station and called station by connecting the both, but there is other form of communication in which the calling and called stations are not directly connected, but the information sent from the calling side may reach the called side indirectly. A sixth embodiment ideal for such communication is described below.

Referring to FIG. 6, the sixth embodiment is described, which is suited to such communication that the allowance of connection delay is large, and that the channel for direct communication is not required between the station of the caller side and the mobile station of the callee side, for example, message communication for once storing the transmission information somewhere and distributing later, such as mail and message.

This system is composed of mobile communication control apparatus 20, mobile communication wired network 22, paging controller 24, terminal 26, message storage apparatus 28, base stations $BS_{m-1}$, $BS_m$, $BS_{m+1}$, and mobile station $MS_n$. The constituent elements included in this system constitution but not included in the foregoing embodiments are the paging controller 24, terminal 26, and message storage apparatus 28.

The terminal 26 is a terminal capable of communicating data with a personal computer or the like, for preparing a message to be transmitted and sending it together with information of the callee. The message storage apparatus 28 is a read/write enable large-capacity memory device for storing the message sent from the terminal 26 capable of communicating data, together with the information of callee.

The paging controller 24 is a device for receiving the information about which location registration area the mobile station is present upon call connection request to the mobile station, from a position information memory device (not shown) which collects, controls and holds the location registration information in the unit of location registration area, and paging the mobile station, and instructing the channel connection to the control apparatus 20. This is to support the call control of paging led by the control apparatus 20.

The paging controller 24 also has a function of originating a call from the distribution information of the message storage apparatus 28 for distribution of message from the message storage apparatus 28, transferring to the control apparatus 20, and causing the control apparatus 20 to page the called party.

Moreover, when receiving a transmission request of message or the like from the terminal 26 of a personal computer or the like, the paging controller 24 controls to store the message by connecting the terminal 26 to the message storage apparatus 28, and also controls to originate a call according to the callee information when the traffic is not heavy by monitoring the traffic, when distributing the stored message by originating a call according to the callee information, and transfer to the control apparatus 20, thereby causing the control apparatus 20 to page the callee.

In such constitution, first of all, when the paging controller 24 which has received an origination call from the caller side terminal 26 recognizes that the call is a call requesting message communication, and instructs the terminal to transfer the message data to the message storage apparatus 28 connected to the wired network 22. The message data transmitted from the terminal is stored in the message storage apparatus 28, and the paging controller 24 instructs the control apparatus 20 to page the called mobile station.

The control apparatus 20 executes paging of the called mobile station in the procedure corresponding to the call large in the allowance of connection delay mentioned in any one of the foregoing embodiments. When the response from the called mobile station returns to the control apparatus 20, the control apparatus 20 requests the paging controller 24 to connect the channel between the message storage apparatus 28 through the base station receiving that response and the called mobile station, and so that the message data can be transferred to the mobile station through the established channel.

In this method, if the caller side station and callee side mobile station do not access the mobile communication system simultaneously, the message is sent to the desired mobile terminal, and therefore the traffic is averaged, and averaging of utility rate of radio circuits can be promoted.

(Seventh Embodiment)

In the foregoing first to sixth embodiments, by controlling to page simultaneously from all base stations or to page selectively from certain base stations sequentially, depending on the allowance of delay of call connection, it is intended to reduce the traffic for paging from base stations by controlling to allow delay deliberately in the case of large allowance of delay of call connection.

However, in the case of small allowance of delay of call connection, it is designed to page simultaneously from all base stations, and if multiple calls of such small allowance occur, the traffic reducing effect is lowered. Accordingly, going one step forward, a seventh embodiment is proposed to expect the traffic reducing effect if calls of small allowance occur frequently.

Figure 7:
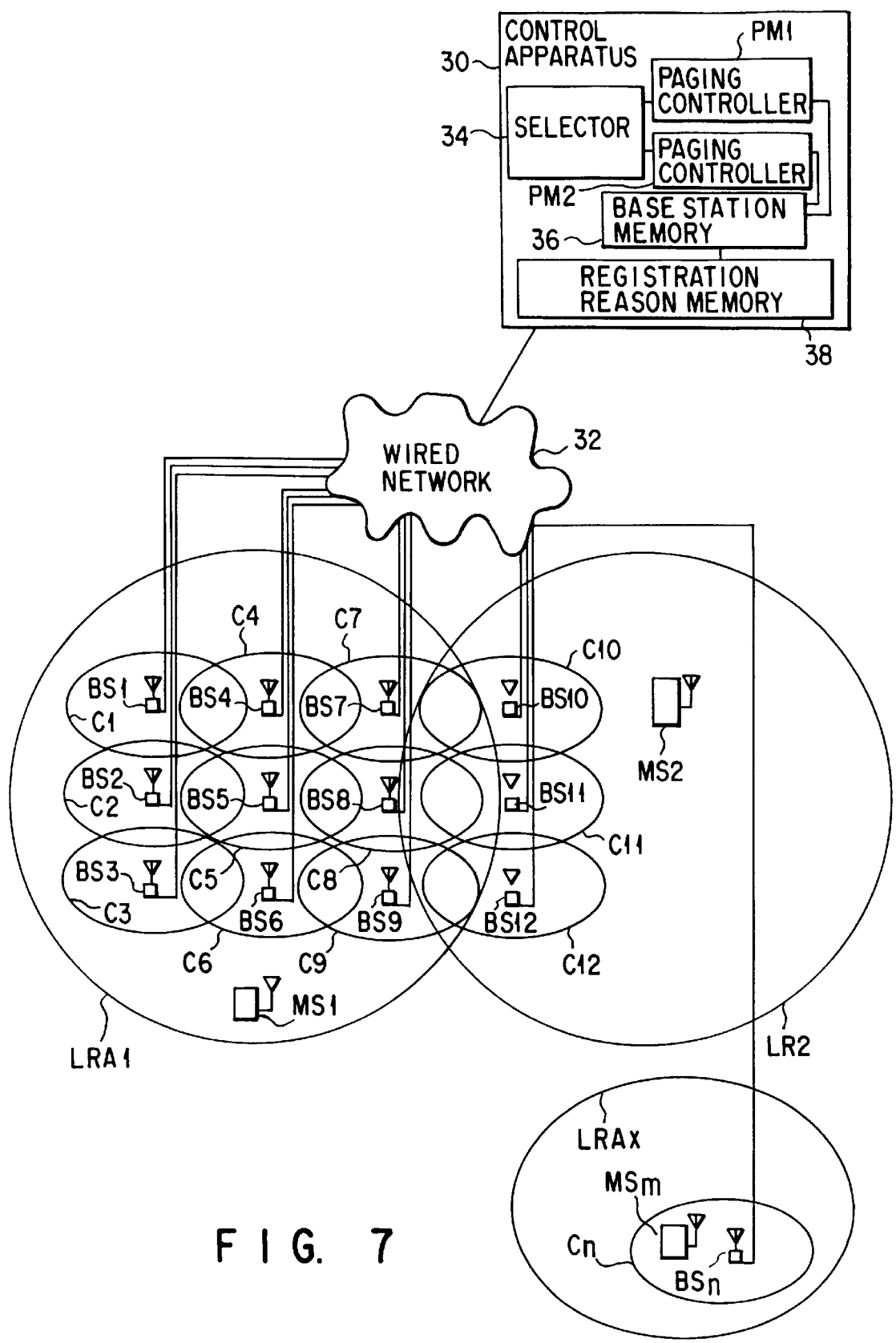
FIG. 7 is a block diagram showing a constitution of a seventh embodiment of mobile communication system of the present invention.

FIG. 7 is a block diagram showing a constitution of a mobile communication system of the seventh embodiment of the present invention. As shown in the diagram, the mobile communication system of the embodiment comprises plural mobile stations $MS_1$ to $MS_m$ receiving presentation of communication service through the mobile communication system, plural cells $C_1$ to $C_n$, plural base stations $BS_1$ to $BS_n$ for forming the plural cells $C_1$ to $C_n$, location registration areas $LRA_1$ to $LRA_x$ containing some of the plural cells $C_1$ to $C_n$, at least one or more mobile communication control apparatus 30 for controlling the mobile communication system, and a mobile communication wired network 32 for connecting the base stations $BS_1$ to $BS_n$ and mobile communication control apparatus 30.

The control apparatus 30 is intended to control call connection between the caller and callee in the event of a call origination, and also control paging to the called mobile station when a call occurs, and it has also functions of controlling for local position registration in the unit of cell in which the mobile station is present (registration of location in the unit of cell in which the mobile station is present), and holding the local position registration information obtained as a result thereof.

Meanwhile, the functions of controlling for location registration in the unit of location registration area in which the mobile station is present, and holding the location registration information obtained as a result thereof are effected by the location information registration memory device responsible for location information registration control function originally provided in the existing mobile communication system, and hence the control apparatus 30 refers to the information of such functions as required.

The control apparatus 30 also comprises a paging controller $PM_1$ used when the allowance about call setup delay is small, and a paging controller $PM_2$ used when the allowance about call connection is large. They have the paging procedure control functions nearly same as employed in the foregoing embodiments although functions are partly different as specified below. That is, the paging controller $PM_1$ may have a basic function of level 1, and the paging controller $PM_2$ may be similar to the one with basic function of level 2 used in the first embodiment, or either one of level 3 or more or level $k_{-1}$ or level k used in the first embodiment. Of course, the number of paging controllers is not limited to two type, but all of k types may be provided as employed in the first embodiment, and a proper one may be selected therefrom.

Moreover, the control apparatus 30 is constituted by including a paging procedure selector 34 for selecting a proper one of the paging controllers $PM_1$ and $PM_2$ depending on the allowance about call setup delay (if there are three or more paging controllers, the most appropriate one is selected), a base station memory 36, and a registration reason memory 38.

The base station memory 36 has two location registration regions for storing the location registration information of the station existing cell each in every mobile station. In the first location registration region is stored the information of base stations for serving the cell in which each mobile station was present at the time of the call termination (hereinafter called cell at call termination), and in the second location registration region is stored the information of base stations for serving the cell after moving when the mobile station has moved from the cell at call termination to other cell after the own call termination. When information is stored in the second location registration region, the location registration information of the station existing cell stored in the first location registration region is erased.

The registration reason memory 38 is to store the reason when the location registration information of the station existing cell is stored in the base station memory 36. The reason is whether the location registration information of the station existing cell of each mobile station stored in the base station memory 36 shows the location registration information of the station existing cell corresponding to the cell at call termination which is the cell existing at the time of last call of the mobile station, or the location registration information of the station existing cell corresponding to the cell newly moved if moving afterwards. Therefore, the reason may be merely flag information.

When the reason is thus held, it means that the mobile station is not moved in cell if the location registration information of the station existing cell is same as the one at call termination, and in this case it is highly probable that the called mobile station remains in the cell indicated by the location registration information of the station existing cell, and it is highly possible that the call is connected in the shortest time to the mobile station by controlling paging through the base station serving this cell. On the other hand, as the mobile station has moved from one cell to other, when the location registration information of the present station existing cell is updated and held, it is highly possible that the mobile station is in the process of moving, and it is possible that it is not captured by paging control only through the base station for serving the cell indicated by the location registration information of the present station existing cell, and hence it is controlled to page simultaneously from all base stations in the location registration area including the cell indicated by the location registration information of the present station existing cell, or to page sequentially by using certain base stations each in the same location registration area.

In this embodiment, each one of the mobile stations $MS_1$ to $MS_m$ have a function of noticing, if moving to other cell, by radio to the control apparatus 30. This is because the monitoring function of the intensity of electric field is provided in the mobile station as standard equipment. In the system in which the operating frequency band differs between adjacent cells, the move of the cell can be detected if the electric field intensity of the frequency in the present cell becomes weak and the electric field intensity of frequency in other cell is heightened. By making use of this detected information, when moving from one cell to other, the procedure for location registration of the station existing cell is executed from the mobile station side. Receiving this information, the base station informs the control apparatus 30 of the information for location registration of the station existing cell of the mobile station, and therefore in the control apparatus 30, in relation to the information of the base station, the cell at the moving destination is checked, and the location registration information of the station existing zone is registered newly in the base station memory 36, while the reason can be registered in the registration reason memory 38.

In other words, when the mobile station in the station existing cell is registered, the control apparatus 30 recognizes this information is received from which base station, and in each informing mobile station, the base station memory 36 stores the information of the corresponding base station in the second location registration region as the location registration information of the station existing cell, while the information of the first location registration region can be deleted. Each one of the mobile stations $MS_1$ to $MS_m$ transmits the own ID when communicating with the base station, and the control apparatus 30 can identify by this ID.

Of the functions of the paging controllers $PM_1$ and $PM_2$ of the embodiment, different points from the first embodiment are mentioned below. In this embodiment, since the information of the registration reason memory 38 and base station memory 36 can be utilized, the procedure is changed depending on the reason.

For example, when the storing reason of the registration reason memory 38 is the location registration of the station existing cell at the call termination, first paging control is executed by using only the base station serving the cell indicated by the location registration information of the station existing cell, and when not responded, the paging controllers $PM_1$ and $PM_2$ are constituted so as to execute the same paging control as in the first embodiment. Therefore, the paging controllers $PM_1$ and $PM_2$ are designed to detect the station existing cell position from the information of the base station memory 36 by referring to the storing reason of the registration reason memory 38.

Hitherto, in the mobile communication system, mobile station paging is controlled by simultaneous operation of the base stations in the unit of location registration area, and although the priority rank if use is low, this function is naturally inherited also in this invention, and therefore in the paging controller of level 1, when the storing reason of the registration reason memory 38 is the cell move, and when the first paging is not responded in the absence of cell movement, it is controlled to page the mobile station by simultaneous operation of all base stations in this unit of location registration area.

In other paging controller than the one of level 1, when the storing reason of the registration reason memory 38 is no move in cell, first, it is attempted to page only from the base station corresponding to the location registration information of the station existing cell at call termination, and when not responded, paging control as in the procedure in the first embodiment is executed. When the storing reason of the registration reason memory 38 is move in cell, the paging control in the procedure of the first embodiment is executed.

An example of operation of the seventh embodiment is described below.

When each mobile station terminates its call in the cell included in the registered location registration area, the base station memory 36 stores the base station information composing the cell as the location registration information of station existing cell, and the registration reason memory 38 stores that the reason of storing the base station in the base station memory 36 is the call termination.

Or, while waiting for call, when the mobile station moves and goes out of the cell at call termination, the mobile station reports the moving from the cell at call termination to the new cell, and the base station memory 36 stores the base station for composing the new cell as the location registration information of the station existing cell, and the base station memory 36 stores that the reason of storing the base station is the move from the call termination.

Herein, when the mobile station is registered, the base station of the mobile station is reset, and nothing is stored in the base station memory 36. After location registration of the mobile station, the base station memory 36 may store the base station in which the mobile station is registered, and the registration reason memory 38 may store that the reason of memory of base station is the registration of location.

Figure 8:
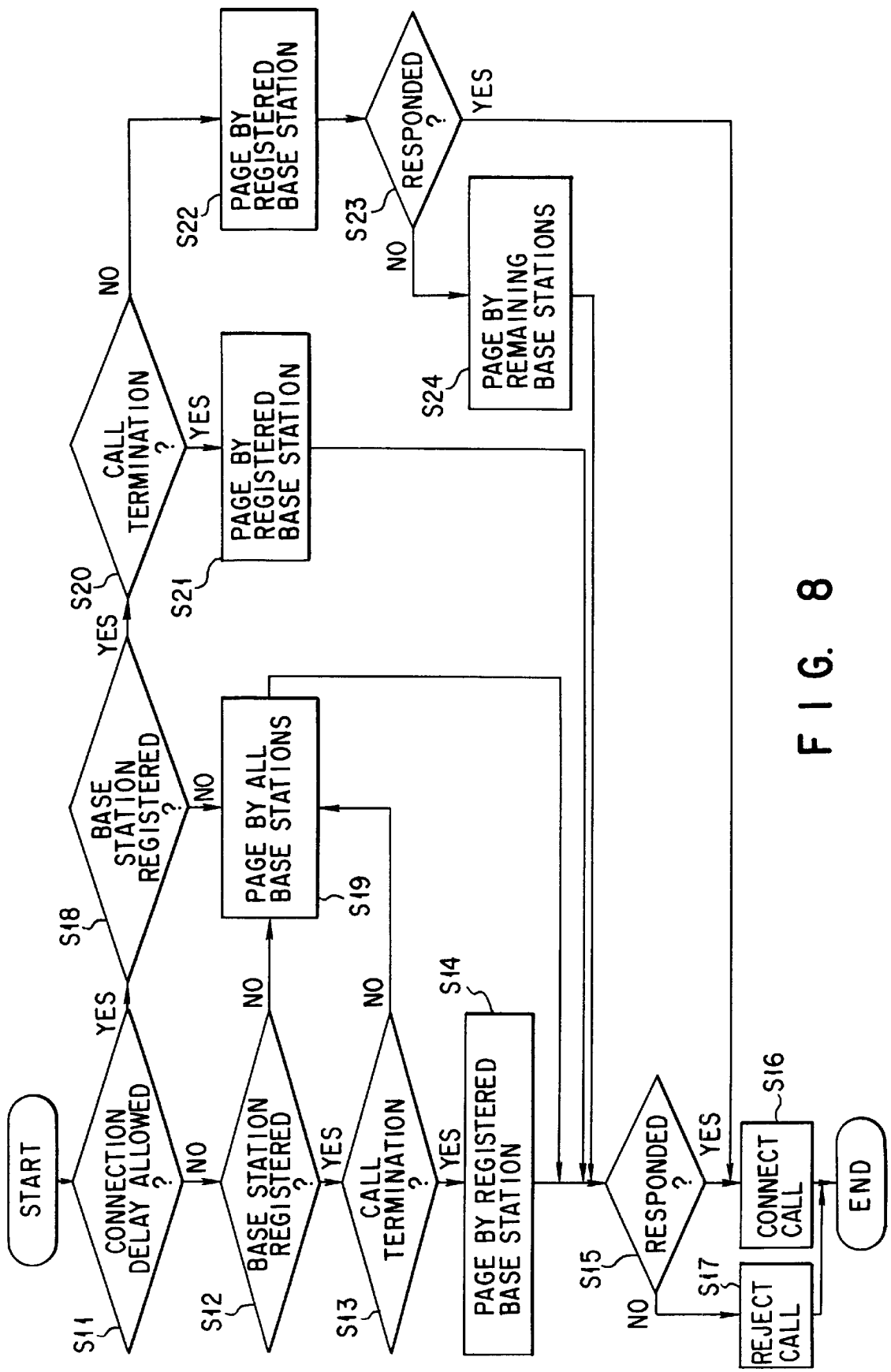
FIG. 8 is a flowchart for explaining an example of operation of the seventh embodiment.

When a mobile station is called, the operation of selecting the paging controller for paging the mobile station on the basis of the allowance of call setup delay occurring at the time of call connection is explained below with reference to FIG. 8.

The caller side station wishing to communicate with a mobile station reports, when originating a call, the allowance about call setup delay of communication to the control apparatus 30. On the basis of this report, the control apparatus 30 judges the allowance about call setup delay at step S11.

In the case the allowance about call setup delay is small and the allowable call setup delay time is short, the paging procedure selector 34 selects the paging controller $PM_1$. The paging controller $PM_1$ judges whether the information of base station is stored or not as shown in step S12.

The paging controller $PM_1$ accesses to the base station memory 36 and registration region memory 38, and when base station is not stored for the mobile station, or when the registration region is not call termination although the base station is registered (judged at step S13), all cells included in the location registration area in which the mobile station is registered are paged at step S19.

At step S13, when the base station is stored and the registration reason is judged to be call termination, at step S14, the mobile station is paged through the stored base station. When responded from the called mobile station (step S15), the call is connected between the caller station and called mobile station, and communication is enabled. At step S15, if not responded from the called mobile station, it is processed as reject call at step S17, and paging is stopped, and failure of connection is noticed to the originator station.

Incidentally, in a modified control form, for example, if not responded at step S15, as a result of process at step S14 for paging the mobile station through the registered base station, the operation goes to step S19 (simultaneous paging in the location registration area), and when responded from the called mobile station, the call is connected between the originator station and the called mobile station to enable communication (S15, S16), and if not responded from the called mobile station within a limit time, it is treated as reject call (S15, S17), and paging is stopped, and failure of connection is noticed to the originator station.

In these operations, when the allowance about call setup delay is small, it is possible to page efficiently, and without causing call setup delay, the paging traffic can be decreased, and the call can be connected to the called mobile station.

On the other hand, when the mobile station is called large in allowance about call setup delay and long in allowable call setup delay time, the paging procedure selector 34 selects the paging controller $PM_2$ for paging the mobile station.

The paging controller $PM_2$ executes the process after step S18. The paging controller $PM_2$ accesses to the base station memory 36 and registration reason memory 38, and judges if the base station is stored for the mobile station or not (step S18). If the base station is not stored, at step S19, it causes to page all cells included in the location registration area in which the mobile station is registered. Consequently, the procedure of S15, S16, S17 is executed.

When the base station is stored, the registration reason is judged at step S20. When the registration reason is not call termination, at step S22, first paging of the mobile station is attempted through the registered base station.

Alternatively, first paging of the mobile station may be effected through plural base stations near the base station including the registered base station.

When the first paging is responded by the mobile station (step S23), the call is connected between the caller station and the responding called mobile station, and communication between the two parties is enabled (step S16). When the first paging is not responded from the mobile station, at step S24, second paging is addressed to all remaining cells not addressed by the first paging, in the location registration area in which the mobile station is registered. Herein, paging may be divided into three times. Then the procure of steps S15, S16, and S17 is executed.

On the other hand, at steps S18, S20, when the base station is registered and the registration is reason is judged to be call termination, at step S21, the mobile station is paged through the registered base station. Then the procedure of steps S15, S16, and S17 is executed.

By these operations, a slight call setup delay occurs, but, to the contrary, the paging traffic can be decreased significantly, and the call can be connected to the called mobile station.

As the incoming call rate increases, the effect of decreasing the paging traffic is greater, and the effect will be particularly outstanding in the future mobile communication system when the incoming call rate is expected to increase. Besides, as the rest time of the mobile station becomes longer, the paging traffic decreases, and the effect is particularly large in the place where such circumstance is likely to occur.

(Eighth Embodiment)

Figure 9:
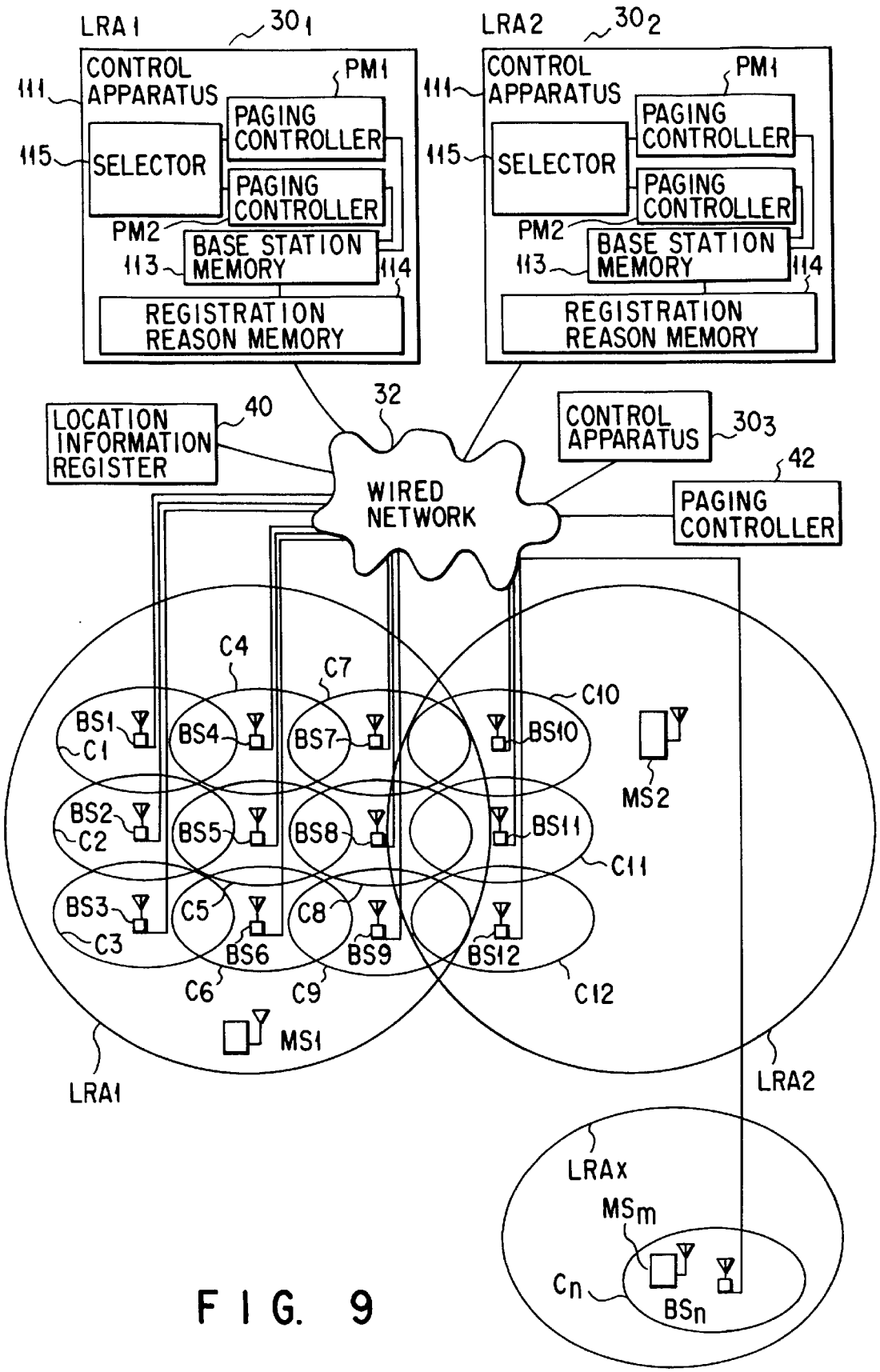
FIG. 9 is a block diagram showing a constitution of an eighth embodiment of mobile communication system of the present invention.

Referring next to FIG. 9, an eighth embodiment relating to location registration and connection control is described below. In the eighth embodiment, connection to the called mobile station is controlled by using plural mobile communication control apparatuses $30_1$, $30_2$, . . . of individual location registration areas $LRA_1$, $LRA_2$, . . . for controlling the location information of mobile station existing in each location registration area, and a location information register 40 for controlling the location information of every mobile station.

The location information register 40 stores the location registration information in each mobile station in the unit of location registration area in which each mobile station is present obtained from the location information registration control function originally provided in the existing mobile communication system.

A paging controller 42 is a device for receiving the information showing in which location registration area the mobile station is present when a call connection is requested to a mobile station, from the location information register 40 storing the location registration information in the unit of location registration area, and instructing paging of mobile station and channel connection to the control apparatuses $30_1$, $30_2$, . . . thereby supporting to call control by paging as led by the control apparatuses $30_1$, $30_2$, . . . .

In such constitution, when call connection is requested to a mobile station, the paging controller 42 obtains the information in which location registration area the mobile station is present, from the location information register 40.

The paging controller 42 instructs paging of mobile station and connection of channel to the control apparatuses $30_1$, $30_2$, . . . for controlling the location registration area. The control apparatus 111 pages the mobile station in any one of the procedures described above, and when receiving response from the mobile station, the channel is connected through the base station.

The procedure of recording the information in which location registration area the mobile station is present into the location information register 40 is same as in the location registration method utilized in the conventional portable telephone and the like. That is, when the power source of the mobile station is turned on or when the station moves into another cell, or when the mobile station receives the notice signal transmitted periodically from the base station for location confirmation, and transmits the own ID signal in response, the location registration area is recognized from the received information of the base station receiving it.

When the mobile station moves to a different location registration area, the location registration is requested to the location information register 40 from the cell in the new location registration area. As a result, the location information register 40 registers the location of the mobile station on the basis of the information of the receiving base station. At this time, the control apparatuses $30_1$, $30_2$, . . . store into the second location registration region in the own base station memory 36 on the basis of the information of the receiving base station, and the reason of storing the location registration information of the station existing cell is stored in the base station memory 36.

The procedure of storing in which cell the mobile station is present into the base station memory 36 provided in the control apparatuses $30_1$, $30_2$, . . . is known in several methods depending on the state of the mobile station.

First, at the time of registration of location or originating a call from a mobile station as mentioned above, or during communication, information from the mobile station is transmitted, and the used base station can be stored in the base station memory 36. If the mobile station is not in such state, the mobile station periodically receives a notice signal from the base station, and it can be confirmed it is present in the cell served by which base station, and when moving to a different cell is detected, a cell change request is transmitted to the control apparatuses $30_1$, $30_2$, . . . .

In this method, if the mobile station frequently changes from one cell to another, the control traffic about cell change request increases.

To prevent this, for example, the mobile station registered of location or the mobile station requesting a cell change periodically receives a notice signal from the base station, and when the cell is changed again within a predetermined time, information announcing the move from a new cell is transmitted, and cell change request is not transmitted thereafter for a specific time. When the cell is not changed for a specific time, a cell change request is transmitted again to the control apparatuses $30_1$, $30_2$, . . . .

By employing such location registration method, the paging traffic can be reduced without notably changing from the system used in the conventional portable telephone or without significantly increasing the traffic for location registration.

As described so far, according to the first to eighth embodiments, it is possible to page adequately depending on the type of communication. For example, while satisfying the request of the user about call setup delay, the paging traffic can be reduced. It hence provides great merits in both control efficiency and service quality in the mobile communication system presenting multimedia communication service, and it is possible to incorporate more mobile stations in the mobile communication system, and communication service suited to requests of users can be presented.

Described below are embodiments suited to transmission of multimedia information, capable of decreasing the control quantity of mobile communication system having a hierarchical cell organization, and enhancing the utility efficiency of radio frequency. The following embodiments relate to a mobile communication system capable of presenting communication service to plural mobile stations movable in first and second cells by setting, in a service area of specific space, plural first cells capable of offering communication service, and plural second cells capable of offering communication service in a wider geographical range than the first cells and geographically overlapping with the first cells, which comprises a selector for selecting at least either first cells or second cells on the basis of the type of information communicated with the mobile station, and using the selected cells as the cells for presenting communication service.

(Ninth Embodiment)

In a ninth embodiment, the allowance of error rate of information is used as the type of information. On the basis of this allowance of error rate, at least either first cells or second cells are selected, and communication is presented to the mobile station through the selected cells.

According to the mobile communication system of the present invention using such means, unlike the conventional communication control system which was intended to improve the communication state only by the moving speed of the mobile station, it is controlled to enhance the communication quality on the basis of the information attribute and information ability most closely related with the communication quality, and therefore as compared with the mobile communication system selecting the cells for presenting service to the mobile station out of cells of plural sizes depending only on the moving speed of the station, it is possible to build up the mobile communication system capable of presenting communication service satisfying the required quality of communication by means of mobile stations.

It is also possible to decrease the number of times of hand-off of mobile station during communication, and the control quantity of mobile communication system can be decreased.

It is further possible to utilize the radio channel efficiently, and the accommodation capacity of mobile stations in the mobile communication system can be increased.

Thus is briefed the outline of the embodiment, and the embodiment is more specifically described below while referring to the drawing.

Figure 10:
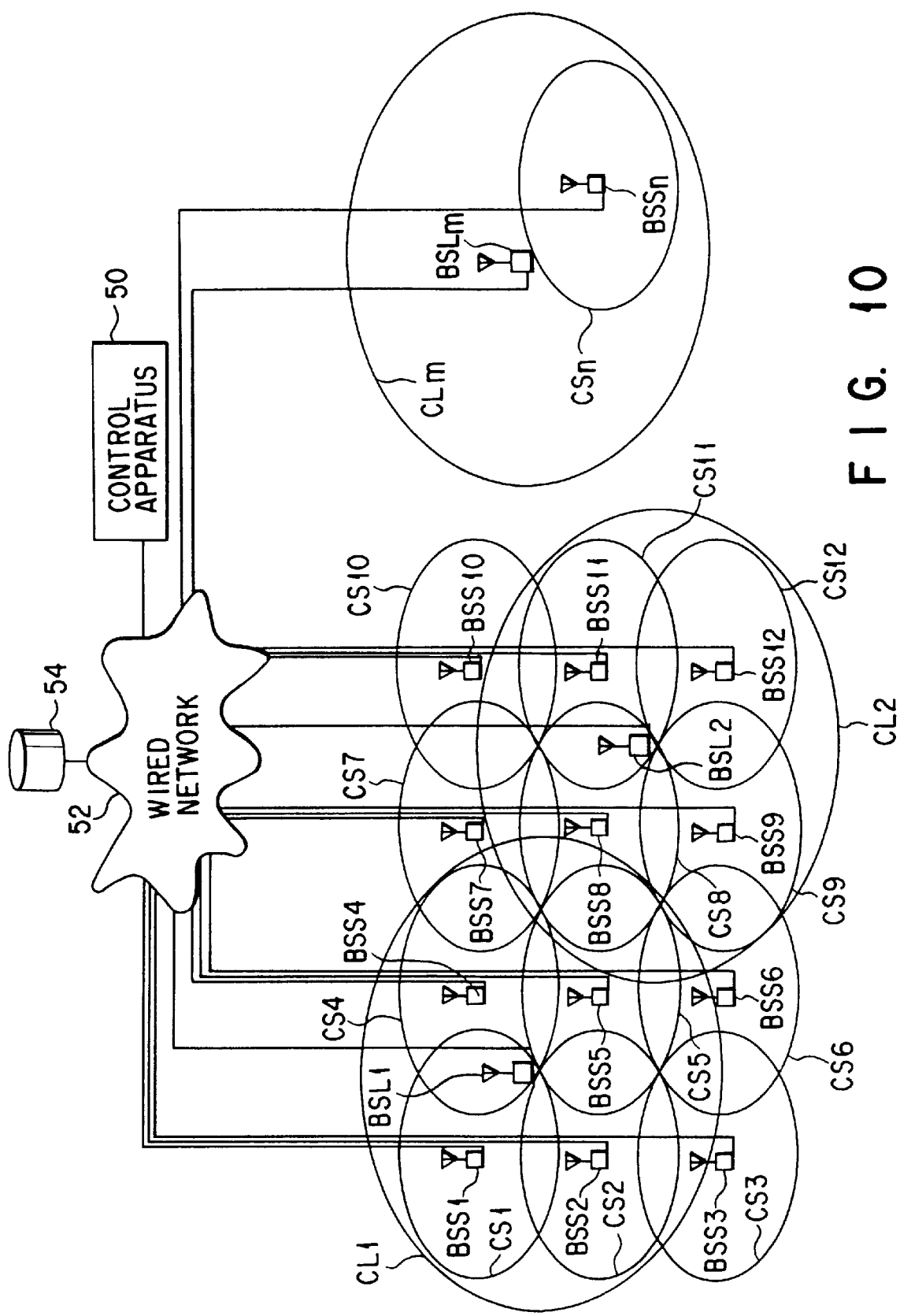
FIG. 10 is a block diagram showing a constitution of a ninth embodiment of mobile communication system of the present invention.

FIG. 10 is a block diagram showing a constitution of a mobile communication system according to the ninth embodiment. The mobile communication system of the ninth embodiment comprises plural first cells $CS_1$ to $CS_n$ capable of offering communication service in a geographically narrow range, plural second cells $CL_1$ to $CL_m$ capable of offering communication service in a wider geographical range than the first cells $CS_1$ to $CS_n$, a mobile communication control apparatus 50 for controlling this mobile communication system, first base stations $BSS_1$ to $BSS_n$ for forming the first cells $CS_1$ to $CS_n$, second base stations $BSL_1$ to $BSL_m$ for forming the second cells $CL_1$ to $CL_m$, and a mobile communication wired network 52 for connecting the base stations $BSS_1$ to $BSS_n$ and $BSL_1$ to $BSL_m$ and the mobile communication control apparatus 50. The wired network 52 is provided between the control apparatus 50 and first base stations $BSS_1$ to $BSS_n$, between the control apparatus 50 and second base stations $BSL_1$ to $BSL_m$, and between the control apparatus 50 and a terminal (not shown), and also between the first base stations $BSS_1$ to $BSS_n$ and second base stations $BSL_1$ to $BSL_m$, between the first base stations $BSS_1$ to $BSS_n$ and a terminal (not shown), and the second base stations $BSL_1$ to $BSL_m$ and a terminal (not shown).

The ninth embodiment specifies two types of cells differing in the geographical range for presenting communication service, but three or more types of cells having different communication ranges may be also provided as required. Reference numeral 54 denotes a database for presenting desired data for the owner of mobile station.

Figure 11:
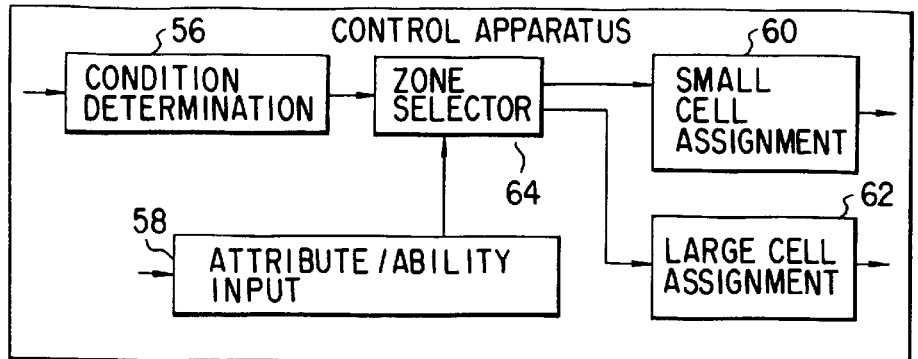
FIG. 11 is a block diagram showing a constitution of mobile communication control apparatus which is an essential part of the ninth embodiment.

The control apparatus 50 comprises, as shown in FIG. 11, communication condition judging part 56 for controlling the vacancy of radio channels in each cell, an information attribute/communication serviceability accepting part 58 for accepting information attributes such as information quality of the communicated information, allowance of error rate and information quantity, and communication serviceability such as a transmission speed between the mobile station and the base station and communication time, a selector 64 for selecting either a narrow range cell radio channel assigning section 60 or a wide range cell radio channel assigning section 62 on the basis of the attribute or ability accepted by this input section 58 and information about control of communication condition determining section 56, the narrow range cell radio channel assigning section 60 for establishing radio communication in narrow cells with first base station $BSS_n$, and the wide range cell radio channel assigning section 62 for establishing radio communication in wide cells with second base station $BSL_n$.

A general operation of thus constituted mobile communication system is described below while referring to FIG. 12. The mobile station (caller's terminal) can communicate with the database, wired terminal, mobile station, and others, and FIG. 12 shows an example of data communication with a mobile station, in which the communication channel between the both terminals comprises a wired network provided between the first or second base station and the callee's base station, and a radio channel provided between the mobile station and the first or second base station, and between the callee's terminal and the callee side base station. A general operation is described below by referring to FIG. 12. Herein, the base station closest to the caller's mobile station is supposed to be the first base station $BSS_2$ having a relatively narrow cell.

First, the mobile station transmits a call setup request to the nearest first base station $BSS_2$. The base station $BSS_2$ transmits the call setup request to the control apparatus 50. The control apparatus 50, when receiving the call setup request, transmits the information attribute and ability request to the first base station $BSS_2$ in order to accept the information attribute of the information to be communicated by the mobile station and/or communication serviceability required by the information. The first base station $BSS_2$, when receiving the information attribute and ability request, transmits the information attribute and ability request to the mobile station.

On the other hand, the control apparatus 50 sends a paging request to the base station closest to the callee's terminal in order to transmit a call to the mobile station at the callee's terminal. The callee's terminal transmits a paging response to the callee's base station in order to connect the call. The callee's base station, when receiving the paging response, transmits the paging response to the control apparatus 50.

The caller's mobile station, when receiving the information attribute and ability request, transmits the information attributes such as information quality of the information to be communicated, allowance of error rate and information quantity, and communication serviceability such as transmission speed and communication time, to the first base station $BSS_2$ by information attribute and ability response. The first base station $BSS_2$, when receiving the information attribute and ability response, transmits the information attribute and ability response to the control apparatus 50.

Incidentally, when the nearest base station from the caller's mobile station is the second base station $BSL_1$, instead of the first base station $BSS_2$, the second base station $BSL_1$ can communicate with the mobile station and control apparatus.

In the above explanation, the mobile station has transmitted the information attribute or communication serviceability depending on the request from the control apparatus, but the information attribute and communication serviceability may be added to the call setup request when the mobile station attempts to communicate, and in this case the above procedure is not required, and the setting time for call may be shorter.

The control apparatus 50 selects the cell to be assigned for communication of mobile station, on the basis of the information controlled by the communication condition judging part 56 shown in FIG. 11, and the information attributes such as information quality, allowance of error rate and information quantity, and communication serviceability such as transmission speed and communication time responded by the mobile station.

When it is judged appropriate to use the first cell $CS_2$ for communication of mobile station, the control apparatus 50 transmits a radio channel assignment instruction for assigning a radio channel for communication of mobile station, to the first base station $BSS_2$, and assigns the communication resource of the mobile communication wired network between the first base station $BSS_2$ and callee's base station for communication of mobile station. The first base station $BSS_2$, when receiving the radio channel assignment instruction, transmits the radio channel assignment response to the mobile station, and notices that the first cell $CS_2$ formed by the first base station $BSS_2$ has been assigned.

Alternatively, when it is judged appropriate to use the second cell $CL_1$ for communication of mobile station, the control apparatus 50 transmits a radio channel assignment instruction for assigning a radio channel for communication of mobile station, to the second base station $BSL_1$, and assigns the communication resource of the mobile communication wired network between the second base station $BSL_1$ and callee's base station for communication of mobile station. The second base station $BSL_1$, when receiving the radio channel assignment instruction, transmits the radio channel assignment response to the mobile station, and notices that the second cell $CL_1$ formed by the second base station $BSL_1$ has been assigned.

The control apparatus 50 transmits a radio channel assignment instruction for assigning a radio channel similarly to the cell to be used in communication of callee's terminal. The callee's base station, when receiving the radio channel assignment instruction, transmits a radio channel assignment response to the callee's terminal, and notices that the cell formed by the callee's base station has been assigned.

In this procedure, when assignment of radio channel and wired network between the caller's mobile station and the callee's terminal is completed, communication is started between the mobile station and callee's terminal.

(Tenth Embodiment)

A tenth embodiment is characterized by selecting the cell depending on whether connection-oriented communication for communicating after keeping the channel (band) for communication such as telephone, or connection-less communication for keeping the band only when information occurs, as the information attribute/communication serviceability.

(i) Upon Call Setup

First is explained a case in which the caller's terminal requests to transmit information by connection-oriented communication or connection-less communication. Supposing the nearest first base station from the originating mobile station to be $BSS_2$ and the second base station to be $BSL_1$, the operation is described below while referring to FIG. 13 and FIG. 14.

First, the mobile station transmits the call setup request to the nearest first base station $BSS_2$. The base station $BSS_2$ transmits the call setup request to the control apparatus 50. The control apparatus 50, when receiving the call setup request, transmits the data attribute request to the first base station $BSS_2$ to declare to the mobile station whether the information to be transmitted by the mobile station requests connection-oriented communication or connection-less communication.

The first base station $BSS_2$, when receiving the data attribute request, transmits the data attribute request to the mobile station. The mobile station, when receiving the data attribute request, transmits the request of connection-oriented communication or connection-less communication of the information to be transmitted, to the first base station $BSS_2$ by the data attribute response. The first base station $BSS_2$, when receiving the data attribute response, transmits the data attribute response to the control apparatus 50. In this communication procedure, meanwhile, instead of the first base station $BSS_2$, the second base station $BSL_1$ can also communicate between the mobile station and control apparatus.

Figure 13:
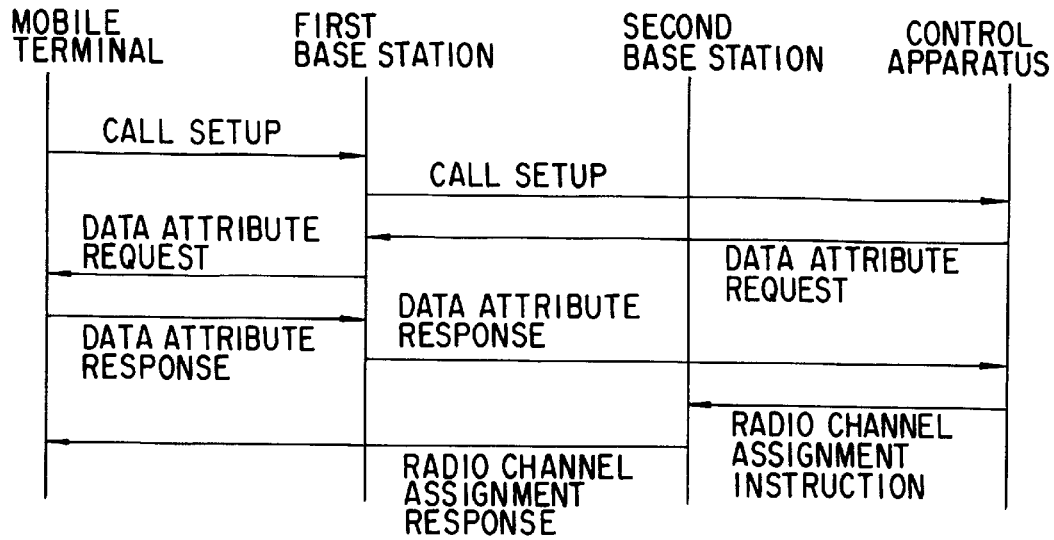
FIG. 13 is a diagram showing an example of operation when a mobile station sets up a call in a tenth embodiment of mobile communication system of the present invention.

When the mobile station requests connection-oriented communication by the data attribute response, as shown in FIG. 13, the control apparatus 50 transmits the radio channel assignment instruction for assigning a radio channel for communication of the mobile station, to the second base station $BSL_1$. The second base station $BSL_1$, when receiving the radio channel assignment instruction, transmits the radio channel assignment response to the mobile station, and notices that the second cell $CL_1$ formed by the second base station $BSL_1$ has been assigned.

Figure 14:
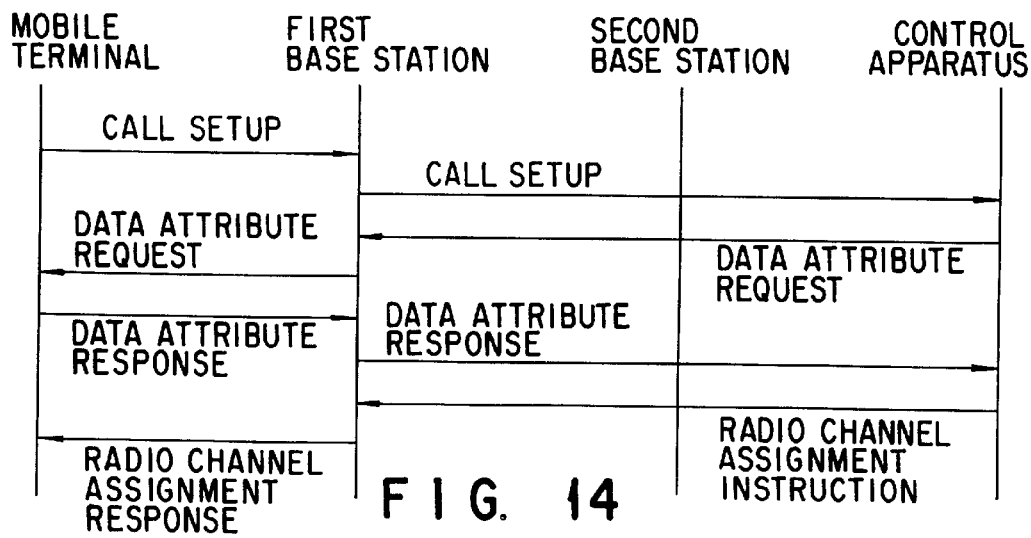
FIG. 14 is a diagram showing other example of operation when a mobile station sets up a call in the tenth embodiment.

When the mobile station requests connection-less communication by the data attribute response, as shown in FIG. 14, the control apparatus 50 transmits the radio channel assignment instruction to the first base station $BSS_2$. The first base station $BSS_2$, when receiving the radio channel assignment instruction, transmits the radio channel assignment response to the mobile station, and notices that the first cell $CS_2$ formed by the first base station $BSS_2$ has been assigned.

(ii) Upon Called

When a mobile station is called, supposing the nearest first base station from the originating terminal to be $BSS_2$ and the second base station to be $BSL_1$, the operation is described below while referring to FIG. 15 and FIG. 16.

First, the caller's terminal calling the mobile station declares to the control apparatus 50 when originating the call, concerning request of connection-oriented communication or connection-less communication, about the information to be communicated. The control apparatus 50 transmits the incoming call request to the mobile station to the first base station $BSS_2$, on the basis of the call setup request from the originating terminal.

The first base station $BSS_2$, receiving the incoming call request, transmits the incoming call request to the mobile station. The mobile station, when receiving the incoming call request, transmits an incoming call response to the first base station $BSS_2$. The first base station $BSS_2$, when receiving the incoming call request, transmits the incoming call response to the control apparatus 50. Meanwhile, instead of the first base station $BSS_2$ during communication, the second base station $BSL_1$ can also communicate between the mobile station and control apparatus.

When the calling terminal requests connection-oriented communication, as shown in FIG. 15, the control apparatus 50 transmits the radio channel assignment instruction for assigning a radio channel for communication of mobile station, to the second base station $BSL_1$. The second base station $BSL_1$, when receiving the radio channel assignment instruction, transmits a radio channel assignment response to the mobile station, and notices that the second cell $CL_1$ formed by the second base station $BSL_1$ has been assigned.

When the calling terminal requests connection-less communication, as shown in FIG. 16, the control apparatus 50 transmits the radio channel assignment instruction to the first base station $BSS_2$. The first base station $BSS_2$, when receiving the radio channel assignment instruction, transmits a radio channel assignment response to the mobile station, and notices that the first cell $CS_2$ formed by the first base station $BSS_2$ has been assigned.

(iii) Request Change During Active Call Originated by Mobile Station

While the mobile station (calling terminal) is communicating, when the request about the information to be communicated is changed, the operation is as follows.

(iii-a) First, supposing the nearest first base station from the mobile station to be $BSS_2$ and the second base station to be $BSL_1$, when the request is changed to connection-oriented communication while the mobile station is making connection-less communication through the first cell $CS_2$, the operation is described below while referring to FIG. 17.

First, the calling mobile station transmits the data attribute change information to the first base station $BSS_2$ which is presently being presented with service, and tells that the request is changed from connection-less communication to connection-oriented communication. The first base station $BSS_2$ transmits the data attribute change information to the control apparatus 50.

The control apparatus 50, when receiving the data attribute change information, transmits radio channel disconnection instruction to cut off the radio channel for communication of mobile station, to the first base station $BSS_2$ active in service to the mobile station, and the first base station $BSS_2$ receiving the radio channel disconnection instruction transmits a radio channel disconnection response to the mobile station, and the radio channel by the first cell $CS_2$ is cut off. Meanwhile, the operation after transmission of radio channel disconnection instruction by the control apparatus 50 may be done at the time of hand-off of the mobile station.

Next, the control apparatus 50 transmits a radio channel assignment instruction for assigning a radio channel for communication of mobile station, to the second base station $BSL_1$ nearest from the mobile station. The second base station $BSL_1$, when receiving the radio channel assignment instruction, transmits a radio channel assignment response to the mobile station, and notices that the second cell $CL_1$ formed by the second base station $BSL_1$ has been assigned, thereby changing over the radio channel. In this embodiment, incidentally, after receiving the data attribute change information, the control apparatus 50 is operating in the sequence of radio channel disconnection and radio channel assignment, but it is also possible to operate in the sequence of radio channel assignment and radio channel disconnection.

Figure 18:
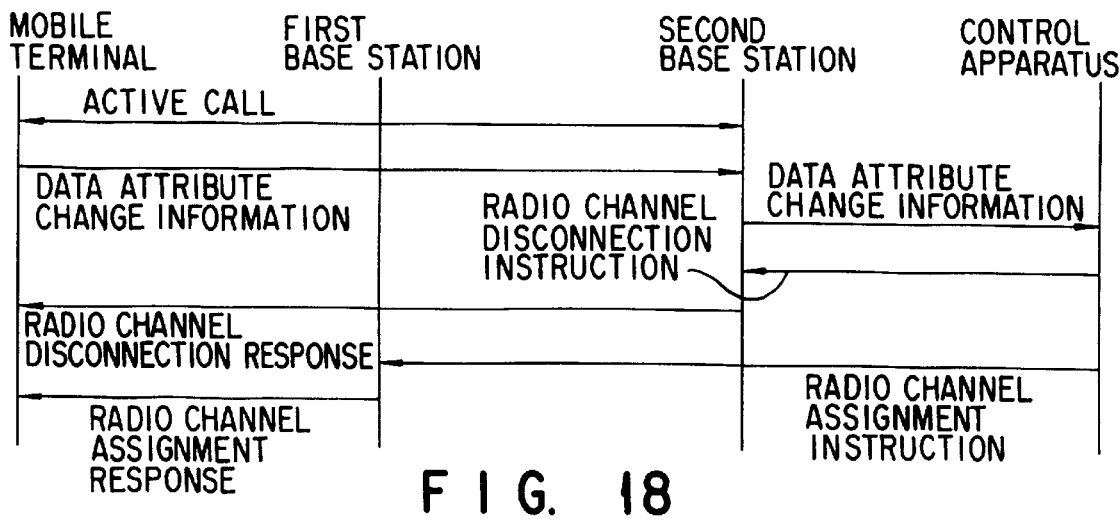
FIG. 18 is a diagram showing other example of operation when a mobile station sets up a call and the request to communication is changed at the call calling station in the tenth embodiment.

(iii-b) Next, supposing the nearest first base station from the mobile station to be $BSS_2$ and the second base station to be $BSL_1$, when the request is changed to connection-less communication while the mobile station is making connection-oriented communication through the second cell $CL_1$, the operation is described below while referring to FIG. 18.

First, the calling mobile station transmits the data attribute change information to the second base station $BSL_1$ which is presently being presented with service, and tells that the request is changed from connection-oriented communication to connection-less communication. The second base station $BSL_1$ transmits the data attribute change information to the control apparatus 50.

The control apparatus 50, when receiving the data attribute change information, transmits radio channel disconnection instruction to cut off the radio channel for communication of mobile station, to the second base station $BSL_1$ active in service to the mobile station, and the second base station $BSL_1$ receiving the radio channel disconnection instruction transmits a radio channel disconnection response to the mobile station, and the radio channel by the second cell $CL_1$ is cut off. Meanwhile, the operation after transmission of radio channel disconnection instruction by the control apparatus 50 may be done at the time of hand-off of the mobile station.

Next, the control apparatus 50 transmits a radio channel assignment instruction for assigning a radio channel for communication of mobile station, to the first base station $BSS_2$ nearest from the mobile station. The first base station $BSS_2$, when receiving the radio channel assignment instruction, transmits a radio channel assignment response to the mobile station, and notices that the first cell $CS_2$ formed by the first base station $BSS_2$ has been assigned, thereby changing over the radio channel. In this embodiment, incidentally, after receiving the data attribute change information, the control apparatus 50 is operating in the sequence of radio channel disconnection and radio channel assignment, but it is also possible to operate in the sequence of radio channel assignment and radio channel disconnection.

(iv) Request Change During Active Call Received by Mobile Station

During active call of mobile station (called terminal), when request to information to be communicated is changed, the operation is as follows.

Figure 19:
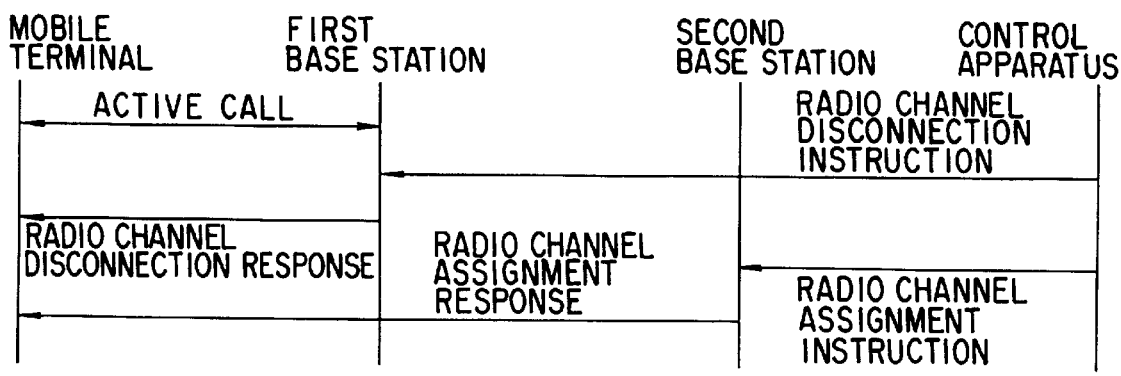
FIG. 19 is a diagram showing an example of operation when a mobile station is called and the request to communication is changed at the call calling station in the tenth embodiment.

(iv-a) First, supposing the nearest first base station from the mobile station to be $BSS_2$ and the second base station to be $BSL_1$, when the request is changed to connection-oriented communication, at the called terminal of mobile station, while the mobile station is making connection-less communication through the first cell $CS_2$, an example of the operation of the mobile communication system is described below while referring to FIG. 19.

First, the caller transmits the data attribute change information to the control apparatus 50, and tells that the request is changed from connection-less communication to connection-oriented communication. The control apparatus 50, when receiving data attribute change information, transmits radio channel disconnection instruction to cut off the radio channel for communication of mobile station, to the first base station $BSS_2$ active in service to the called mobile station, and the first base station $BSS_2$ receiving the radio channel disconnection instruction transmits a radio channel disconnection response to the mobile station, and the radio channel by the first cell $CS_2$ is cut off. Meanwhile, the operation after transmission of radio channel disconnection instruction by the control apparatus 50 may be done at the time of hand-off of the mobile station.

Next, the control apparatus 50 transmits a radio channel assignment instruction for assigning a radio channel for communication of mobile station, to the second base station $BSL_1$ nearest from the mobile station.

The second base station $BSL_1$, when receiving the radio channel assignment instruction, transmits a radio channel assignment response to the mobile station, and notices that the second cell $CL_1$ formed by the second base station $BSL_1$ has been assigned, thereby changing over the radio channel. In this embodiment, incidentally, after receiving the data attribute change information, the control apparatus 50 is operating in the sequence of radio channel disconnection and radio channel assignment, but it is also possible to operate in the sequence of radio channel assignment and radio channel disconnection.

Figure 20:
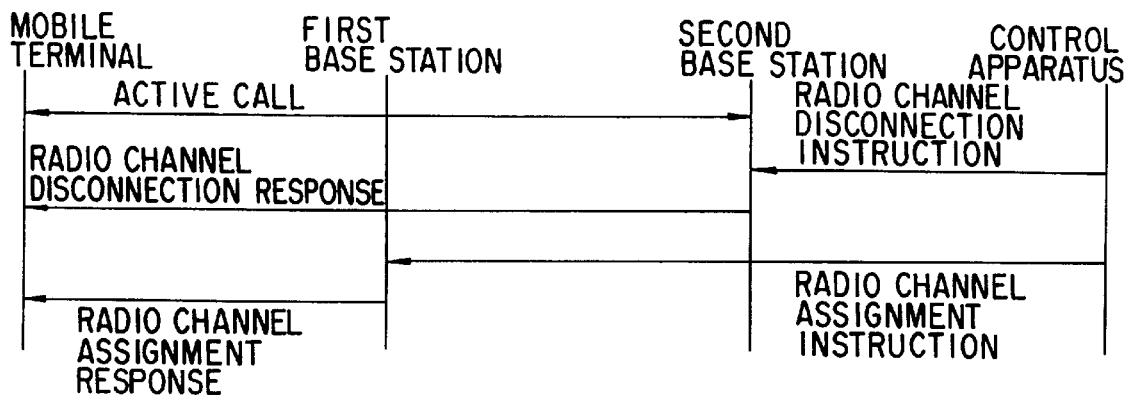
FIG. 20 is a diagram showing other example of operation when a mobile station is called and the request to communication is changed at the call calling station in the tenth embodiment.

(iv-b) Next, supposing the nearest first base station from the mobile station to be $BSS_2$ and the second base station to be $BSL_1$, when the originator changes the request of communication to connection-less communication while the mobile station is making connection-oriented communication through the first cell $CS_2$, the operation is described below while referring to FIG. 20.

First, the caller transmits the data attribute change information to the control apparatus 50, and tells that the request is changed from connection-oriented communication to connection-less communication. The control apparatus 50, when receiving the data attribute change information, transmits radio channel disconnection instruction to cut off the radio channel for communication of mobile station, to the second base station $BSL_1$ active in service to the called mobile station, and the second base station $BSL_1$ receiving the radio channel disconnection instruction transmits a radio channel disconnection response to the mobile station, and the radio channel by the second cell $CL_1$ is cut off. Meanwhile, the operation after transmission of radio channel disconnection instruction by the control apparatus 50 may be done at the time of hand-off of the mobile station.

Next, the control apparatus 50 transmits a radio channel assignment instruction for assigning a radio channel for communication of mobile station, to the first base station $BSS_2$ nearest from the mobile station. The first base station $BSS_2$, when receiving the radio channel assignment instruction, transmits a radio channel assignment response to the mobile station, and notices that the first cell $CS_2$ formed by the first base station $BSS_2$ has been assigned, thereby changing over the radio channel. In this embodiment, incidentally, after receiving the data attribute change information, the control apparatus 50 is operating in the sequence of radio channel disconnection and radio channel assignment, but it is also possible to operate in the sequence of radio channel assignment and radio channel disconnection.

Thus, according to the tenth embodiment, as for the mobile station making connection-oriented communication, the second cell covering a geographically wider range than the first cell is assigned, and the number of times of hand-off by the move of mobile station is decreased from the case of being assigned with the first cell. As a result, the control quantity for hand-off decreases, and the number of times of momentary interruption at the time of hand-off decreases, and communication service of higher quality can be presented. As for the mobile station making connection-less communication, the first cell covering a geographically narrower range than the second cell is assigned, and in connection-less communication, unlike the connection-oriented communication, the time required for communication is often shorter, and the increase in the number of times of hand-off due to assignment of first cell does not matter much. Also in the connection-less communication, different from the connection-oriented communication, the communication channel is not established continuously, and no communication is made at the time of hand-off, so that increase of control quantity of hand-off can be suppressed. Hence, also in connection-less communication, deterioration of communication quality at the time of hand-off can be suppressed. Therefore, by the mobile communication system of the embodiment, the hand-off control quantity is decreased and the communication quality is improved in communication of the mobile station.

(Eleventh Embodiment)

A basic constitution of mobile communication system of an eleventh embodiment is same as the block diagram showing the constitution of the mobile communication system of the ninth embodiment shown in FIG. 10.

This embodiment is characterized by selecting the cell for presenting service to the mobile station, on the basis of the allowable delay time at the time of hand-off relating to the information to be communicated by the mobile station.

(i) Upon Call Setup

When a mobile station sets up a call, supposing the first base station nearest from the mobile station to be $BSS_2$ and the second base station to be $BSL_1$, the operation of the mobile communication system is explained below by reference to FIG. 13 and FIG. 14 relating to the tenth embodiment.

The mobile station, by the data attribute response, transmits the allowable delay time about the information to be communicated by the mobile station, to the control apparatus 50 through the first base station $BSS_2$. In the case the allowable delay time declared by the mobile station by the data attribute response is smaller than a predetermined threshold, as shown in FIG. 13, the control apparatus 50 transmits a radio channel assignment instruction for assigning a radio channel for communication of mobile station, to the second base station $BSL_1$. The second base station $BSL_1$, when receiving the radio channel assignment instruction, transmits a radio channel assignment response to the mobile station, and notices that the second cell $CL_1$ formed by the second base station $BSL_1$ has been assigned.

On the other hand, in the case the allowable delay time declared by the mobile station by the data attribute response is greater than the threshold, as shown in FIG. 14, the control apparatus 50 transmits a radio channel assignment instruction for assigning a radio channel for communication of mobile station, to the first base station $BSS_2$. The first base station $BSS_2$, when receiving the radio channel assignment instruction, transmits a radio channel assignment response to the mobile station, and notices that the first cell $CS_2$ formed by the first base station $BSS_2$ has been assigned.

(ii) Upon Called

When a mobile station is called, supposing the nearest first base station from the calling terminal to be $BSS_2$ and the second base station to be $BSL_1$, an example of the operation of the mobile communication system is described below while referring to FIG. 15 and FIG. 16 relating to the tenth embodiment.

First, the calling terminal calling the mobile station declares the allowable delay time relating to the information to be communicated to the control apparatus 50 when originating the call. The control apparatus 50 transmits, as shown in FIG. 15, a radio channel assignment instruction for assigning a radio channel for communication of mobile station, to the second base station $BSL_1$ in the case the allowable delay time declared by the calling terminal is smaller than the threshold. The second base station $BSL_1$, when receiving the radio channel assignment instruction, transmits a radio channel assignment response to the mobile station, and notices that the second cell $CL_1$ formed by the second base station $BSL_1$ has been assigned.

On the other hand, in the case the allowable delay time declared by the calling terminal is greater than the threshold, as shown in FIG. 16, the control apparatus 50 transmits the radio channel assignment instruction for assigning a radio channel for communication of mobile station, to the first base station $BSS_2$. The first base station $BSS_2$, when receiving the radio channel assignment instruction, transmits a radio channel assignment response to the mobile station, and notices that the first cell $CS_2$ formed by the first base station $BSS_2$ has been assigned.

(iii) Request Change During Active Call Originated by Mobile Station

While the mobile station (calling terminal) is communicating, when the allowable delay time is changed, the operation is as follows.

(iii-a) First, supposing the nearest first base station from the mobile station to be $BSS_2$ and the second base station to be $BSL_1$, when the allowable delay time of the mobile station is changed to a smaller value while the mobile station is making communication through the first cell $CS_2$, an example of the operation of the mobile communication system is described below while referring to FIG. 17.

The mobile station transmits the data attribute change information to the first base station $BSS_2$ which is presently being presented with service, and tells the new allowable delay time. The first base station $BSS_2$ transmits the data attribute change information to the control apparatus 50. The control apparatus 50, when receiving the data attribute change information, compares the allowable delay time with the threshold, and when the allowable delay time is smaller than the threshold, as shown in FIG. 17, the radio channel is changed over from the service by the first cell $CS_2$ to the service by the second cell $CL_1$. When the allowable delay time is greater than the threshold, the radio channel is not changed over.

(iii-b) Next, supposing the nearest first base station from the mobile station to be $BSS_2$ and the second base station to be $BSL_1$, when the allowable delay time of the mobile station is changed to a larger value while the mobile station is making communication through the second cell $CL_1$, an example of the operation of the mobile communication system is described below while referring to FIG. 18.

The mobile station transmits the data attribute change information to the second base station $BSL_1$ which is presently being presented with service, and tells the new allowable delay time. The second base station $BSL_1$ transmits the data attribute change information to the control apparatus 50. The control apparatus 50, when receiving the data attribute change information, compares the allowable delay time with the threshold, and when the allowable delay time is greater than the threshold, as shown in FIG. 18, the radio channel is changed over from the service by the second cell $CL_1$ to the service by the second cell $CS_2$. When the allowable delay time is smaller than the threshold, the radio channel is not changed over.

(iv) Request change during active call received by mobile station

During active call of mobile station (called terminal), when the allowable delay time is changed, the operation is as follows.

(iv-a) First, supposing the nearest first base station from the mobile station to be $BSS_2$ and the second base station to be $BSL_1$, when the allowable delay time of the mobile station is changed to a smaller value, at the calling terminal of the mobile station, while the mobile station is making communication through the first cell $CS_2$, an example of the operation of the mobile communication system is described below while referring to FIG. 19.

The terminal transmits the data attribute change information to the control apparatus 50, and tells the new allowable delay time. The control apparatus 50, when receiving the data attribute change information, compares the allowable delay time with the threshold, and when the allowable delay time is smaller than the threshold, as shown in FIG. 19, the radio channel is changed over from the service by the first cell $CS_2$ to the service by the second cell $CL_1$. When the allowable delay time is greater than the threshold, the radio channel is not changed over.

(iv-b) Next, supposing the nearest first base station from the mobile station to be $BSS_2$ and the second base station to be $BSL_1$, when the allowable delay time of the mobile station is changed to a greater value, at the calling terminal of the mobile station, while the mobile station is making communication through the second cell $CL_1$, an example of the operation of the mobile communication system is described below while referring to FIG. 20.

The terminal transmits the data attribute change information to the control apparatus 50, and tells the new allowable delay time. The control apparatus 50, when receiving the data attribute change information, compares the allowable delay time with the threshold, and when the allowable delay time is greater than the threshold, as shown in FIG. 20, the radio channel is changed over from the service by the second cell $CL_1$ to the service by the first cell CS2. When the allowable delay time is smaller than the threshold, the radio channel is not changed over.

Thus, according to the eleventh embodiment, as for the mobile station making communication of information of smaller allowable delay time, the second cell covering a geographically wider range than the first cell is assigned, and the number of times of hand-off by the move of mobile station is decreased from the case of being assigned with the first cell. As a result, the control quantity for hand-off decreases, and the number of times of delay at the time of hand-off decreases, and communication service of higher quality can be presented. As for the mobile station making communication of information with large allowable delay time, the first cell covering a geographically narrower range than the second cell is assigned. Thus, as for the mobile station allowing delay time at hand-off, by assigning a cell of a geographically covering range as narrow as possible, the radio frequency band can be utilized effectively. Therefore, by the mobile communication system of the embodiment, service corresponding to the required quality can be presented at the time of communication of the mobile station, and the radio frequency band can be utilized effectively.

In this embodiment, instead of the allowable delay time, the cell for assigning the mobile station can be selected by discretion of allowable delay time, and it can be realized by the same operation as the above operation. In this case, too, service corresponding to the required quality can be presented at the time of communication of the mobile station, and the radio frequency band can be utilized effectively.

(Twelfth Embodiment)

A basic constitution of mobile communication system of a twelfth embodiment is same as the block diagram showing the constitution of the mobile communication system of the ninth embodiment shown in FIG. 10.

This embodiment is characterized by selecting the cell for presenting service to the mobile station, on the basis of the allowable packet loss delay time which is the allowable packet loss rate relating to the information to be communicated by the mobile station.

(i) Upon Call Setup

When a mobile station sets up a call, supposing the first base station nearest from the mobile station to be $BSS_2$ and the second base station to be $BSL_1$, the operation of the mobile communication system is explained below by reference to FIG. 13.

The mobile station, by the data attribute response, transmits the allowable packet loss rate about the information to be communicated by the mobile station, to the control apparatus 50 through the first base station $BSS_2$. In the case the allowable packet loss rate declared by the mobile station by the data attribute response is smaller than a threshold, the control apparatus 50 transmits a radio channel assignment instruction for assigning a radio channel for communication of mobile station, to the second base station $BSL_1$. The second base station $BSL_1$, when receiving the radio channel assignment instruction, transmits a radio channel assignment response to the mobile station, and notices that the second cell $CL_1$ formed by the second base station $BSL_1$ has been assigned.

On the other hand, in the case the allowable packet loss rate declared by the mobile station by the data attribute response is greater than the threshold, as shown in FIG. 14, the control apparatus 50 transmits a radio channel assignment instruction for assigning a radio channel for communication of mobile station, to the first base station $BSS_2$. The first base station $BSS_2$, when receiving the radio channel assignment instruction, transmits a radio channel assignment response to the mobile station, and notices that the first cell $CS_2$ formed by the first base station $BSS_2$ has been assigned.

(ii) Upon Called

When a mobile station is called, supposing the nearest first base station from the calling terminal to be $BSS_2$ and the second base station to be $BSL_1$, an example of the operation of the mobile communication system is described below while referring to FIG. 15 and FIG. 16 relating to the tenth embodiment.

First, the calling terminal calling the mobile station declares the allowable packet loss rate relating to the information to be communicated to the control apparatus 50 when originating the call. The control apparatus 50 transmits a radio channel assignment instruction for assigning a radio channel for communication of mobile station, to the second base station $BSL_1$ in the case the allowable packet loss rate declared by the calling terminal is smaller than the threshold. The second base station $BSL_1$, when receiving the radio channel assignment instruction, transmits a radio channel assignment response to the mobile station, and notices that the second cell $CL_1$ formed by the second base station $BSL_1$ has been assigned.

On the other hand, in the case the allowable packet loss rate declared by the calling terminal is greater than the threshold, as shown in FIG. 16, the control apparatus 50 transmits the radio channel assignment instruction for assigning a radio channel for communication of mobile station, to the first base station $BSS_2$. The first base station $BSS_2$, when receiving the radio channel assignment instruction, transmits a radio channel assignment response to the mobile station, and notices that the first cell $CS_2$ formed by the first base station $BSS_2$ has been assigned.

(iii) Request Change During Active Call Originated by Mobile Station

While the mobile station (calling terminal) is communicating, when the allowable packet loss rate is changed, the operation is as follows.

(iii-a) First, supposing the nearest first base station from the mobile station to be $BSS_2$ and the second base station to be $BSL_1$, when the allowable packet loss rate of the mobile station is changed to a smaller value while the mobile station is making communication through the first cell $CS_2$, an example of the operation of the mobile communication system is described below while referring to FIG. 17.

The mobile station transmits the data attribute change information to the first base station $BSS_2$ which is presently being presented with service, and tells the new allowable packet loss rate. The first base station $BSS_2$ transmits the data attribute change information to the control apparatus 50. The control apparatus 50, when receiving the data attribute change information, compares the allowable packet loss rate with the threshold, and when the allowable packet loss rate is smaller than the threshold, as shown in FIG. 17, the radio channel is changed over from the service by the first cell $CS_2$ to the service by the second cell $CL_1$. When the allowable packet loss rate is greater than the threshold, the radio channel is not changed over.

(iii-b) Next, supposing the nearest first base station from the mobile station to be $BSS_2$ and the second base station to be $BSL_1$, when the allowable packet loss rate of the mobile station is changed to a larger value while the mobile station is making communication through the second cell $CL_1$, an example of the operation of the mobile communication system is described below while referring to FIG. 18.

The mobile station transmits the data attribute change information to the second base station $BSL_1$ which is presently being presented with service, and tells the new allowable packet loss rate. The second base station $BSL_1$ transmits the data attribute change information to the control apparatus 50. The control apparatus 50, when receiving the data attribute change information, compares the allowable packet loss rate with the threshold, and when the allowable packet loss rate is greater than the threshold, as shown in FIG. 18, the radio channel is changed over from the service by the second cell $CL_1$ to the service by the second cell $CS_2$. When the allowable packet loss rate is smaller than the threshold, the radio channel is not changed over.

(iv) Request Change During Active Call Received by Mobile Station

During active call of mobile station (called terminal), when the allowable packet loss rate is changed, the operation is as follows.

(iv-a) First, supposing the nearest first base station from the mobile station to be $BSS_2$ and the second base station to be $BSL_1$, when the allowable packet loss rate of the mobile station is changed to a smaller value, at the calling terminal of the mobile station, while the mobile station is making communication through the first cell $CS_2$, an example of the operation of the mobile communication system is described below while referring to FIG. 19.

The terminal transmits the data attribute change information to the control apparatus 50, and tells the new allowable packet loss rate. The control apparatus 50, when receiving the data attribute change information, compares the allowable packet loss rate with the threshold, and when the allowable packet loss rate is smaller than the threshold, as shown in FIG. 19, the radio channel is changed over from the service by the first cell $CS_2$ to the service by the second cell $CL_1$. When the allowable packet loss rate is greater than the threshold, the radio channel is not changed over.

(iv-b) Next, supposing the nearest first base station from the mobile station to be $BSS_2$ and the second base station to be $BSL_1$, when the allowable packet loss rate of the mobile station is changed to a greater value, at the calling terminal of the mobile station, while the mobile station is making communication through the second cell $CL_1$, an example of the operation of the mobile communication system is described below while referring to FIG. 20.

The terminal transmits the data attribute change information to the control apparatus 50, and tells the new allowable packet loss rate. The control apparatus 50, when receiving the data attribute change information, compares the allowable packet loss rate with the threshold, and when the allowable packet loss rate is greater than the threshold, as shown in FIG. 20, the radio channel is changed over from the service by the second cell $CL_1$ to the service by the first cell $CS_2$. When the allowable packet loss rate is smaller than the threshold, the radio channel is not changed over.

Thus, according to the twelfth embodiment, as for the mobile station making communication of information of smaller allowable packet loss rate, the second cell covering a geographically wider range than the first cell is assigned, and the number of times of hand-off by the move of mobile station is decreased from the case of being assigned with the first cell. As a result, the frequency of occurrence of packet loss due to hand-off decreases, and communication service of higher quality can be presented. As for the mobile station making communication of information with large allowable packet loss rate, the first cell covering a geographically narrower range than the second cell is assigned. Thus, as for the mobile station allowing packet loss at hand-off, by assigning a cell of a geographically covering range as narrow as possible, the radio frequency band can be utilized effectively. Therefore, by the mobile communication system of the embodiment, service corresponding to the required quality can be presented at the time of communication of the mobile station, and the radio frequency band can be utilized effectively.

(Thirteenth Embodiment)

A basic constitution of mobile communication system of a thirteenth embodiment is same as the block diagram showing the constitution of the mobile communication system of the ninth embodiment shown in FIG. 10.

This embodiment is characterized by selecting the cell for presenting service to the mobile station, on the basis of the total data amount to be communicated by the mobile station.

(i) Upon Call Setup

When a mobile station sets up a call, supposing the first base station nearest from the mobile station to be $BSS_2$ and the second base station to be $BSL_1$, the operation of the mobile communication system is explained below by reference to FIG. 21 and FIG. 22.

First, the mobile station transmits the call setup request to the nearest first base station $BSS_2$. The base station $BSS_2$ transmits the call setup request to the control apparatus 50. The control apparatus 50, when receiving the call setup request, transmits the data amount request to the first base station $BSS_2$ to declare to the mobile station the total data mount of the information to be communicated by the mobile station. The first base station $BSS_2$, when receiving the data amount request, transmits the data amount request to the mobile station. The mobile station, when receiving the data amount request, transmits the total data amount to be communicated to the first base station $BSS_2$ by the data amount response. The first base station $BSS_2$, when receiving the data amount response, transmits the data amount response to the control apparatus 50. In this communication procedure, meanwhile, instead of the first base station $BSS_2$, the second base station $BSL_1$ can also communicate between the mobile station and control apparatus.

Figure 21:
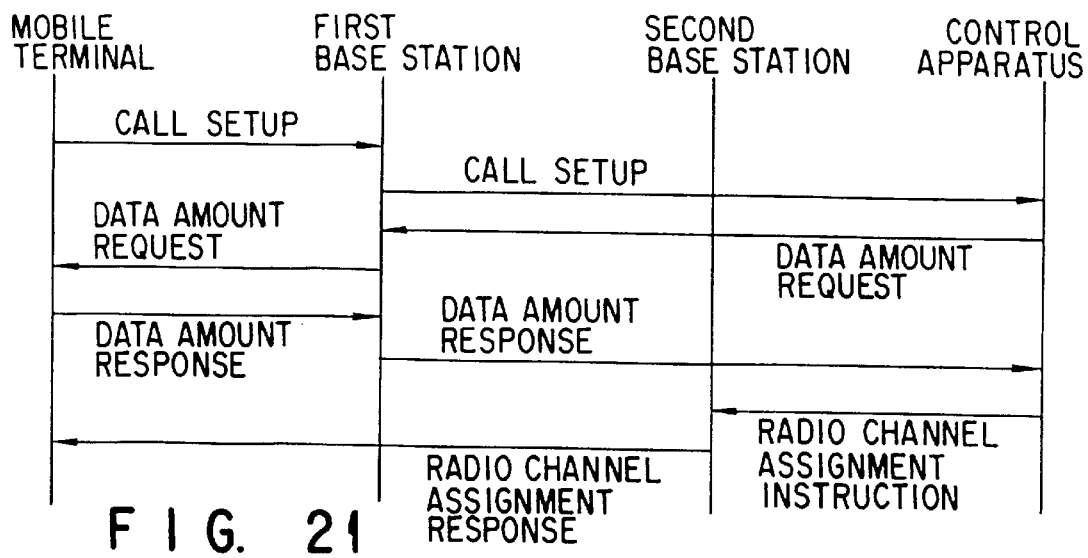
FIG. 21 is a diagram showing an example of operation when a mobile station sets up a call in a thirteenth embodiment of mobile communication system of the present invention.

When the total data amount declared by the mobile station by the data amount response is greater than the threshold, as shown in FIG. 21, the control apparatus 50 transmits the radio channel assignment instruction for assigning a radio channel for communication of the mobile station, to the second base station $BSL_1$. The second base station $BSL_1$, when receiving the radio channel assignment instruction, transmits the radio channel assignment response to the mobile station, and notices that the second cell $CL_1$ formed by the second base station $BSL_1$ has been assigned.

Figure 22:
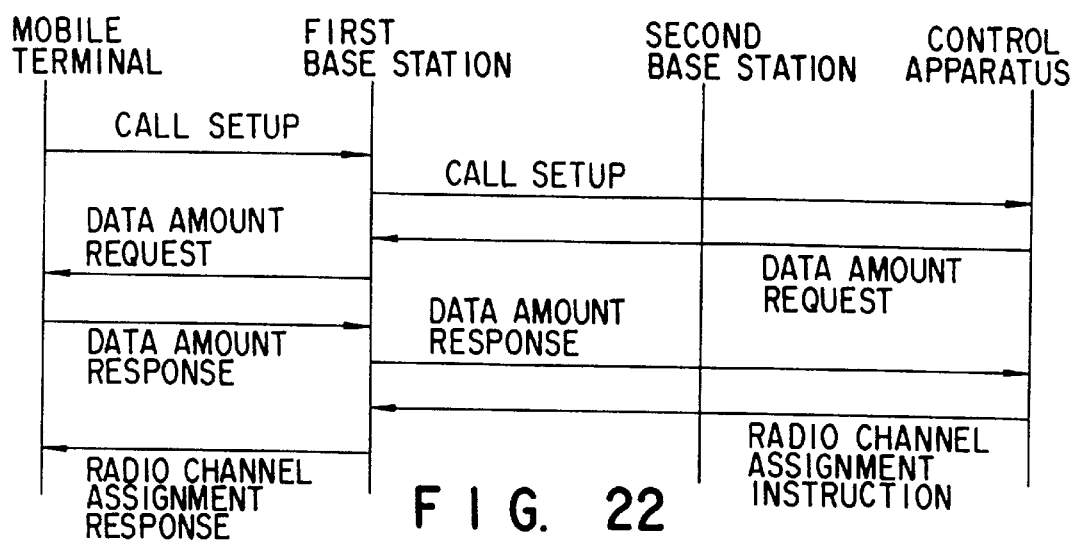
FIG. 22 is a diagram showing other example of operation when a mobile station sets up a call in the thirteenth embodiment.

When the total data amount declared by the mobile station by the data amount response is smaller than the threshold, as shown in FIG. 22, the control apparatus 50 transmits the radio channel assignment instruction to the first base station $BSS_2$, thereby instructing $BSS_2$ to assign a radio channel for communication of the mobile station. The first base station $BSS_2$, when receiving the radio channel assignment instruction, transmits the radio channel assignment response to the mobile station, and notices that the first cell $CS_2$ formed by the first base station $BSS_2$ has been assigned.

(ii) Upon Called

When a mobile station is called, supposing the nearest first base station from the calling terminal to be $BSS_2$ and the second base station to be $BSL_1$, the operation is described below while referring to FIG. 15 and FIG. 16 relating to the tenth embodiment.

First, the calling terminal calling the mobile station declares the total data amount of the information to be communicated to the control apparatus 50 when originating the call. The control apparatus 50 transmits the incoming call request to the mobile station to the first base station $BSS_2$, on the basis of the call setup request from the calling terminal. The first base station $BSS_2$, receiving the incoming call request, transmits the incoming call request to the mobile station. The mobile station, when receiving the incoming call request, transmits an incoming call response to the first base station $BSS_2$. The first base station $BSS_2$, when receiving the incoming call request, transmits the incoming call response to the control apparatus 50. Meanwhile, instead of the first base station $BSS_2$ during active call, the second base station $BSL_1$ can also communicate between the mobile station and control apparatus.

When the total data amount declared by the calling terminal is greater than the threshold, as shown in FIG. 15, the control apparatus 50 transmits the radio channel assignment instruction for assigning a radio channel for communication of mobile station, to the second base station $BSL_1$. The second base station $BSL_1$, when receiving the radio channel assignment instruction, transmits a radio channel assignment response to the mobile station, and notices that the second cell $CL_1$ formed by the second base station $BSL_1$ has been assigned.

When the total data amount declared by the calling terminal is smaller than the threshold, as shown in FIG. 16, the control apparatus 50 transmits the radio channel assignment instruction to the first base station $BSS_2$. The first base station $BSS_2$, when receiving the radio channel assignment instruction, transmits a radio channel assignment response to the mobile station, and notices that the first cell $CS_2$ formed by the first base station $BSS_2$ has been assigned.

Thus, according to the thirteenth embodiment, as for the mobile station greater in the total data amount of communication, the second cell covering a geographically wider range than the first cell is assigned, and as for the mobile station smaller in the total data amount of communication, the first cell covering a geographically narrower range than the second cell is assigned, and therefore on the whole of the mobile communication system, the number of times of hand-off by the move of the mobile station during active call decreases. Hence, the hand-off control quantity is decreased, and the communication service of higher quality can be presented.

(Fourteenth Embodiment)

A basic constitution of mobile communication system of a fourteenth embodiment is same as the block diagram showing the constitution of the mobile communication system of the ninth embodiment shown in FIG. 10.

This embodiment is characterized by selecting the cell for presenting service to the mobile station, on the basis of the communication time to be communicated by the mobile station.

(i) Upon Call Setup

When a mobile station sets up a call, supposing the first base station nearest from the mobile station to be $BSS_2$ and the second base station to be $BSL_1$, the operation of the mobile communication system is explained below by reference to FIG. 23 and FIG. 24.

First, the mobile station transmits the call setup request to the nearest first base station $BSS_2$. The base station $BSS_2$ transmits the call setup request to the control apparatus 50. The control apparatus 50, when receiving the call setup request, transmits a communication time request to the first base station $BSS_2$ to declare to the mobile station the communication time to be communicated by the mobile station. The first base station $BSS_2$, when receiving the communication time request, transmits the communication time request to the mobile station. The mobile station, when receiving the communication time request, transmits the communication time to be communicated to the first base station $BSS_2$ by the communication time response. The first base station $BSS_2$, when receiving the communication time response, transmits the communication time response to the control apparatus 50. In this communication procedure, meanwhile, instead of the first base station $BSS_2$, the second base station $BSL_1$ can also communicate between the mobile station and control apparatus.

Figure 23:
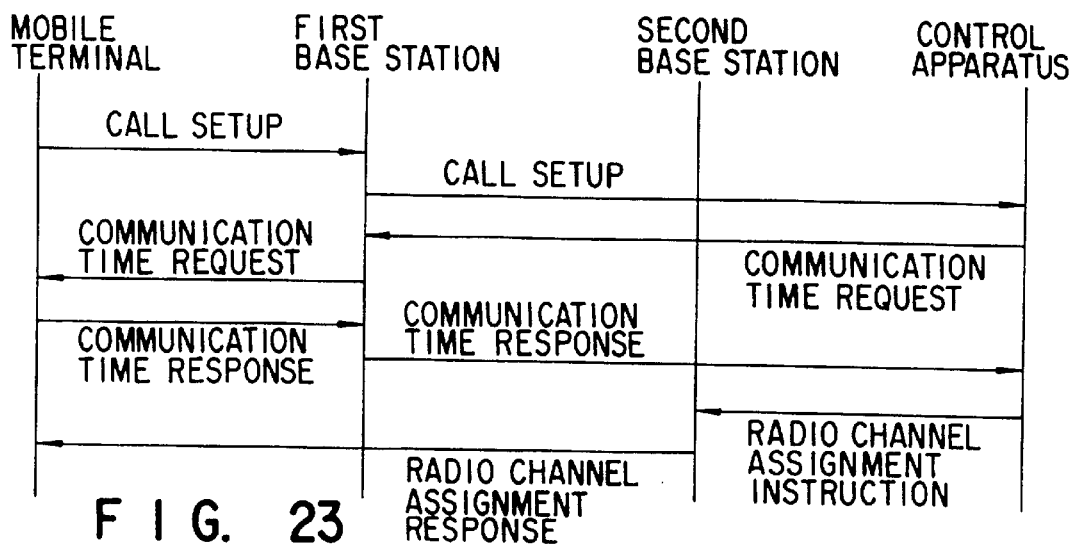
FIG. 23 is a diagram showing an example of operation when a mobile station sets up a call in a fourteenth embodiment of mobile communication system of the present invention.

When the communication time declared by the mobile station by the communication time response is greater than the threshold, as shown in FIG. 23, the control apparatus 50 transmits the radio channel assignment instruction for assigning a radio channel for communication of the mobile station, to the second base station $BSL_1$. The second base station $BSL_1$, when receiving the radio channel assignment instruction, transmits the radio channel assignment response to the mobile station, and notices that the second cell $CL_1$ formed by the second base station $BSL_1$ has been assigned.

Figure 24:
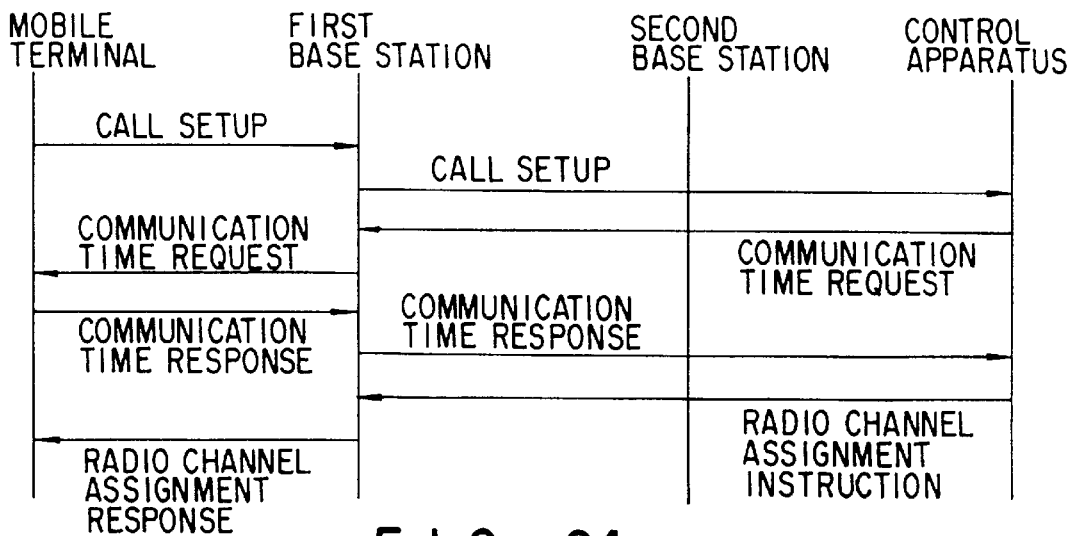
FIG. 24 is a diagram showing other example of operation when a mobile station sets up a call in the fourteenth embodiment.

When the communication time declared by the mobile station by the communication time response is smaller than the threshold, as shown in FIG. 24, the control apparatus 50 transmits the radio channel assignment instruction to the first base station $BSS_2$, thereby instructing $BSS_2$ to assign a radio channel for communication of the mobile station. The first base station $BSS_2$, when receiving the radio channel assignment instruction, transmits the radio channel assignment response to the mobile station, and notices that the first cell $CS_2$ formed by the first base station $BSS_2$ has been assigned.

(ii) Upon Called

When a mobile station is called, supposing the nearest first base station from the calling terminal to be $BSS_2$ and the second base station to be $BSL_1$, the operation is described below while referring to FIG. 15 and FIG. 16 relating to the tenth embodiment.

First, the calling terminal calling the mobile station declares the communication time to be communicated to the control apparatus 50 when originating the call. The control apparatus 50 transmits the incoming call request to the mobile station to the first base station $BSS_2$, on the basis of the call setup request from the calling terminal. The first base station $BSS_2$, receiving the incoming call request, transmits the incoming call request to the mobile station. The mobile station, when receiving the incoming call request, transmits an incoming call response to the first base station $BSS_2$. The first base station $BSS_2$, when receiving the incoming call request, transmits the incoming call response to the control apparatus 50. Meanwhile, instead of the first base station $BSS_2$ during active call, the second base station $BSL_1$ can also communicate between the mobile station and control apparatus.

When the communication time declared by the calling terminal is greater than the threshold, as shown in FIG. 15, the control apparatus 50 transmits the radio channel assignment instruction for assigning a radio channel for communication of mobile station, to the second base station $BSL_1$. The second base station $BSL_1$, when receiving the radio channel assignment instruction, transmits a radio channel assignment response to the mobile station, and notices that the second cell $CL_1$ formed by the second base station $BSL_1$ has been assigned.

When the communication time declared by the calling terminal is smaller than the threshold, as shown in FIG. 16, the control apparatus 50 transmits the radio channel assignment instruction to the first base station $BSS_2$. The first base station $BSS_2$, when receiving the radio channel assignment instruction, transmits a radio channel assignment response to the mobile station, and notices that the first cell $CS_2$ formed by the first base station $BSS_2$ has been assigned.

Thus, according to the operation of the mobile communication system, as for the mobile station longer in communication time, the second cell covering a geographically wider range than the first cell is assigned, and as for the mobile station shorter in communication time, the first cell covering a geographically narrower range than the second cell is assigned, and therefore on the whole of the mobile communication system, the number of times of hand-off by the move of the mobile station during active call decreases. Hence, the hand-off control quantity is decreased, the number of times of momentary interruption at hand-off is decreased, and the communication service of higher quality can be presented.

(Fifteenth Embodiment)

A basic constitution of mobile communication system of a fifteenth embodiment is basically same as the block diagram showing the constitution of the mobile communication system of the ninth embodiment shown in FIG. 10, except that the first cells $CS_1$ to $CS_n$ present faster communication service than the second cells $CL_1$ to $CS_n$, which is different from the ninth embodiment.

This embodiment is characterized by selecting the cell for presenting service to the mobile station, on the basis of the transmission speed (bit rate) necessary for the information to be communicated by the mobile station.

(i) Upon Call Setup

When a mobile station sets up a call, supposing the first base station nearest from the mobile station to be $BSS_2$ and the second base station to be $BSL_1$, the operation of the mobile communication system is explained below by reference to FIG. 25 and FIG. 26.

First, the mobile station transmits the call setup request to the nearest first base station $BSS_2$. The base station $BSS_2$ transmits the call setup request to the control apparatus 50. The control apparatus 50, when receiving the call setup request, transmits a transmission speed request to the first base station $BSS_2$ to declare to the mobile station the transmission speed necessary for the information to be communicated by the mobile station. The first base station $BSS_2$, when receiving the transmission speed request, transmits the transmission speed request to the mobile station. The mobile station, when receiving the transmission speed request, transmits the transmission speed necessary for the information to be communicated to the first base station $BSS_2$ by a transmission speed response. The first base station $BSS_2$, when receiving the transmission speed response, transmits the transmission speed response to the control apparatus 50. In this communication procedure, meanwhile, instead of the first base station $BSS_2$, the second base station $BSL_1$ can also communicate between the mobile station and control apparatus.

Figure 25:
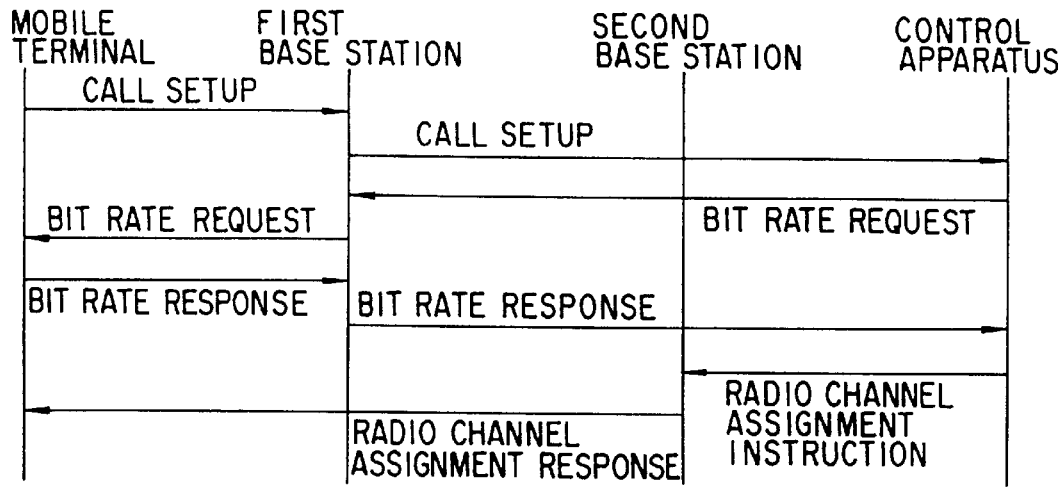
FIG. 25 is a diagram showing an example of operation when a mobile station sets up a call in a fifteenth embodiment of mobile communication system of the present invention.

When the transmission speed declared by the mobile station by the transmission speed response is lower than the threshold, as shown in FIG. 25, the control apparatus 50 transmits the radio channel assignment instruction for assigning a radio channel for communication of the mobile station, to the second base station $BSL_1$. The second base station $BSL_1$, when receiving the radio channel assignment instruction, transmits the radio channel assignment response to the mobile station, and notices that the second cell $CL_1$ formed by the second base station $BSL_1$ has been assigned.

Figure 26:
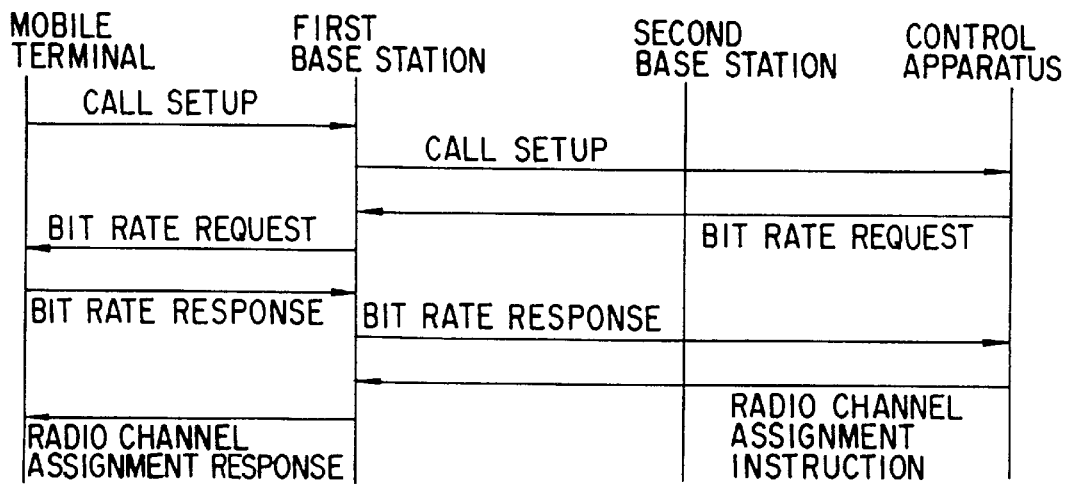
FIG. 26 is a diagram showing other example of operation when a mobile station sets up a call in the fifteenth embodiment.

When the transmission speed declared by the mobile station by the transmission speed response is higher than the threshold, as shown in FIG. 26, the control apparatus 50 transmits the radio channel assignment instruction to the first base station $BSS_2$, thereby instructing $BSS_2$ to assign a radio channel for communication of the mobile station. The first base station $BSS_2$, when receiving the radio channel assignment instruction, transmits the radio channel assignment response to the mobile station, and notices that the first cell $CS_2$ formed by the first base station $BSS_2$ has been assigned.

(ii) Upon Called

When a mobile station is called, supposing the nearest first base station from the calling terminal to be $BSS_2$ and the second base station to be $BSL_1$, the operation the mobile communication system is described below while referring to FIG. 15 and FIG. 16 relating to the tenth embodiment.

First, the calling terminal calling the mobile station declares the transmission speed to be communicated to the control apparatus 50 when originating the call. The control apparatus 50 transmits the incoming call request to the mobile station to the first base station $BSS_2$, on the basis of the call setup request from the calling terminal. The first base station $BSS_2$, receiving the incoming call request, transmits the incoming call request to the mobile station. The mobile station, when receiving the incoming call request, transmits an incoming call response to the first base station $BSS_2$. The first base station $BSS_2$, when receiving the incoming call request, transmits the incoming call response to the control apparatus 50. Meanwhile, instead of the first base station $BSS_2$ during active call, the second base station $BSL_1$ can also communicate between the mobile station and control apparatus.

When the transmission speed declared by the calling terminal is lower than the threshold, as shown in FIG. 15, the control apparatus 50 transmits the radio channel assignment instruction for assigning a radio channel for communication of mobile station, to the second base station $BSL_1$. The second base station $BSL_1$, when receiving the radio channel assignment instruction, transmits a radio channel assignment response to the mobile station, and notices that the second cell $CL_1$ formed by the second base station $BSL_1$ has been assigned.

When the transmission speed declared by the calling terminal is higher than the threshold, as shown in FIG. 16, the control apparatus 50 transmits the radio channel assignment instruction to the first base station $BSS_2$. The first base station $BSS_2$, when receiving the radio channel assignment instruction, transmits a radio channel assignment response to the mobile station, and notices that the first cell $CS_2$ formed by the first base station $BSS_2$ has been assigned.

(iii) Request Change During Active Call Originated by Mobile Station

While the mobile station (calling terminal) is communicating, when the transmission speed requested about the information to be communicated is changed, the operation is as follows.

Figure 27:
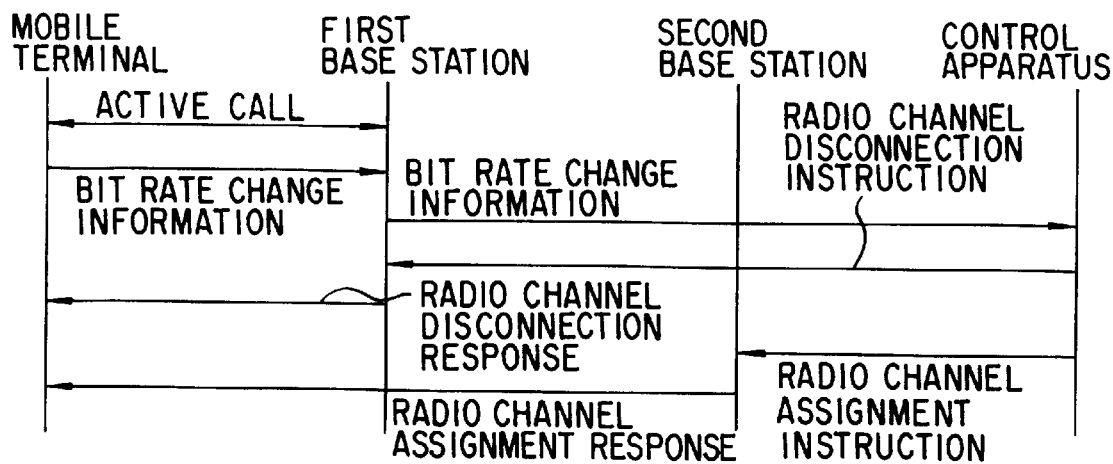
FIG. 27 is a diagram showing an example of operation when request to communication is changed in the fifteenth embodiment.

(iii-a) First, supposing the nearest first base station from the mobile station to be $BSS_2$ and the second base station to be $BSL_1$, when the request about transmission speed of mobile station is changed to a lower speed while the mobile station is making communication through the first cell $CS_2$, the operation of the mobile communication system is described below while referring to FIG. 27.

First, the calling mobile station transmits the transmission speed change information to the first base station $BSS_2$ which is presently being presented with service, and tells that the transmission speed is changed to a low speed. The first base station $BSS_2$ transmits the transmission speed change information to the control apparatus 50. The control apparatus 50, when receiving the transmission speed change information, first compares the transmission speed declared by the transmission speed change information with the threshold, and when the transmission speed is lower than the threshold, transmits radio channel disconnection instruction to cut off the radio channel for communication of mobile station, to the first base station $BSS_2$ active in service to the mobile station, and the first base station $BSS_2$ receiving the radio channel disconnection instruction transmits a radio channel disconnection response to the mobile station, and the radio channel by the first cell $CS_2$ is cut off. Meanwhile, the operation after transmission of radio channel disconnection instruction by the control apparatus 50 may be done at the time of hand-off of the mobile station.

Next, the control apparatus 50 transmits a radio channel assignment instruction for assigning a radio channel for communication of mobile station, to the second base station $BSL_1$ nearest from the mobile station. The second base station $BSL_1$, when receiving the radio channel assignment instruction, transmits a radio channel assignment response to the mobile station, and notices that the second cell $CL_1$ formed by the second base station $BSL_1$ has been assigned, thereby changing over the radio channel. In this embodiment, incidentally, after receiving the data attribute change information, the control apparatus 50 is operating in the sequence of radio channel disconnection and radio channel assignment, but it is also possible to operate in the sequence of radio channel assignment and radio channel disconnection.

If the transmission speed declared by the transmission speed change information is higher than threshold, the control apparatus 50 does not change over the radio channel.

Figure 28:
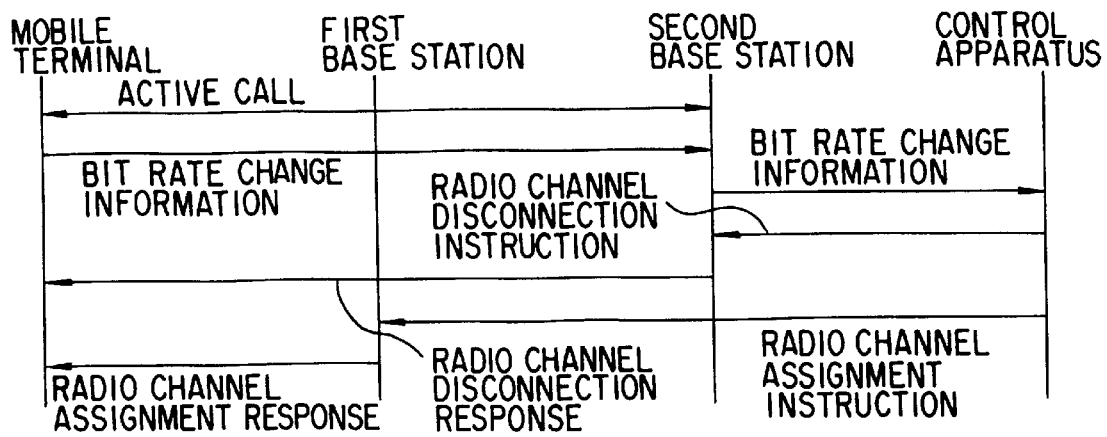
FIG. 28 is a diagram showing other example of operation when request to communication is changed in the fifteenth embodiment.

(iii-b) Next, supposing the nearest first base station from the mobile station to be $BSS_2$ and the second base station to be $BSL_1$, when the request about transmission speed of mobile station is changed to a higher speed while the mobile station is making communication through the first cell $CS_2$, the operation of the mobile communication system is described below while referring to FIG. 28.

First, the calling mobile station transmits the transmission speed change information to the second base station $BSL_1$ which is presently being presented with service, and tells that the transmission speed is changed to a high speed. The second base station $BSL_1$ transmits the transmission speed change information to the control apparatus 50. The control apparatus 50, when receiving the data attribute change information, first compares the transmission speed declared by the transmission speed change information with the threshold, and when the transmission speed is lower than the threshold, transmits radio channel disconnection instruction to cut off the radio channel for communication of mobile station, to the second base station $BSL_1$ active in service to the mobile station, and the second base station $BSL_1$ receiving the radio channel disconnection instruction transmits a radio channel disconnection response to the mobile station, and the radio channel by the second cell $CL_1$ is cut off. Meanwhile, the operation after transmission of radio channel disconnection instruction by the control apparatus 50 may be done at the time of hand-off of the mobile station.

Next, the control apparatus 50 transmits a radio channel assignment instruction for assigning a radio channel for communication of mobile station, to the first base station $BSS_2$ nearest from the mobile station. The first base station $BSS_2$, when receiving the radio channel assignment instruction, transmits a radio channel assignment response to the mobile station, and notices that the first cell $CS_2$ formed by the first base station $BSS_2$ has been assigned, thereby changing over the radio channel. In this embodiment, incidentally, after receiving the data attribute change information, the control apparatus 50 is operating in the sequence of radio channel disconnection and radio channel assignment, but it is also possible to operate in the sequence of radio channel assignment and radio channel disconnection. If the transmission speed declared by the transmission speed change information is lower than the threshold, the control apparatus 50 does not change over the radio channel.

(iv) Request Change During Active Call Received by Mobile Station

During active call of mobile station (called terminal), when the transmission speed requested to information to be communicated is changed, the operation is as follows.

(iv-a) First, supposing the nearest first base station from the mobile station to be $BSS_2$ and the second base station to be $BSL_1$, when the request about transmission speed is changed to a low speed, at the calling terminal of mobile station, while the mobile station is making communication through the first cell $CS_2$, an example of the operation of the mobile communication system is described below while referring to FIG. 16 relating to the tenth embodiment.

First, the terminal transmits the transmission speed change information to the control apparatus 50, and tells that the transmission speed is changed to a low speed. The control apparatus 50, when receiving the transmission speed change information, first compares the transmission speed declared by the transmission speed change information with the threshold, and when the transmission speed is lower than the threshold, transmits radio channel disconnection instruction to cut off the radio channel for communication of mobile station, to the first base station $BSS_2$ active in service to the mobile station, and the first base station $BSS_2$ receiving the radio channel disconnection instruction transmits a radio channel disconnection response to the mobile station, and the radio channel by the first cell $CS_2$ is cut off. Meanwhile, the operation after transmission of radio channel disconnection instruction by the control apparatus 50 may be done at the time of hand-off of the mobile station.

Next, the control apparatus 50 transmits a radio channel assignment instruction for assigning a radio channel for communication of mobile station, to the second base station $BSL_1$ nearest from the mobile station. The second base station $BSL_1$, when receiving the radio channel assignment instruction, transmits a radio channel assignment response to the mobile station, and notices that the second cell $CL_1$ formed by the second base station $BSL_1$ has been assigned, thereby changing over the radio channel. In this embodiment, incidentally, after receiving the data attribute change information, the control apparatus 50 is operating in the sequence of radio channel disconnection and radio channel assignment, but it is also possible to operate in the sequence of radio channel assignment and radio channel disconnection. If the transmission speed declared by the transmission speed change information is higher than the threshold, the control apparatus 50 does not change over the radio channel.

(iv-b) Next, supposing the nearest first base station from the mobile station to be $BSS_2$ and the second base station to be $BSL_1$, when the request of transmission speed is changed to a high speed, at the calling terminal of mobile station, while the mobile station is making communication through the second $CL_1$, the operation of the mobile communication system is described below while referring to FIG. 20 relating to the tenth embodiment.

First, the terminal transmits the transmission speed change information to the control apparatus 50, and tells that the transmission speed is changed to a high speed. The control apparatus 50, when receiving the transmission speed change information, first compares the transmission speed declared by the transmission speed change information with the threshold, and when the transmission speed is lower than the threshold, transmits radio channel disconnection instruction to cut off the radio channel for communication of mobile station, to the second base station $BSL_1$ active in service to the mobile station, and the second base station $BSL_1$ receiving the radio channel disconnection instruction transmits a radio channel disconnection response to the mobile station, and the radio channel by the second cell $CL_1$ is cut off. Meanwhile, the operation after transmission of radio channel disconnection instruction by the control apparatus 50 may be done at the time of hand-off of the mobile station.

Next, the control apparatus 50 transmits a radio channel assignment instruction for assigning a radio channel for communication of mobile station, to the first base station $BSS_2$ nearest from the mobile station. The first base station $BSS_2$, when receiving the radio channel assignment instruction, transmits a radio channel assignment response to the mobile station, and notices that the first cell $CS_2$ formed by the first base station $BSS_2$ has been assigned, thereby changing over the radio channel. In this embodiment, incidentally, after receiving the data attribute change information, the control apparatus 50 is operating in the sequence of radio channel disconnection and radio channel assignment, but it is also possible to operate in the sequence of radio channel assignment and radio channel disconnection. If the transmission speed declared by the transmission speed change information is lower than the threshold, the control apparatus 50 does not change over the radio channel.

Thus, according to the fifteenth embodiment, as for the mobile station low in the transmission speed necessary for the information to be transmitted, the second cell covering a geographically wider range than the first cell is assigned, and as for the mobile station high in the transmission speed necessary for the information to be communicated, the first cell covering a geographically narrower range than the second cell is assigned, so that the communication service suited to the required quality of the terminal for communication can be presented.

(Sixteenth Embodiment)

A basic constitution of mobile communication system of a sixteenth embodiment is same as the block diagram showing the constitution of the mobile communication system of the ninth embodiment shown in FIG. .10.

This embodiment is characterized by selecting the cell for presenting service to the mobile station, on the basis of the moving distance of the mobile station during active call.

(i) Upon Call Setup

When a mobile station sets up a call, supposing the first base station nearest from the mobile station to be $BSS_2$ and the second base station to be $BSL_1$, the operation of the mobile communication system is explained below by reference to FIG. 29 and FIG. 30.

First, the mobile station transmits the call setup request to the nearest first base station $BSS_2$. The base station $BSS_2$ transmits the call setup request to the control apparatus 50. The control apparatus 50, when receiving the call setup request, transmits a service requirement request to the first base station $BSS_2$ to declare the moving speed of the mobile station, and the total data amount or the communication time of the information to be communicated by the mobile station. The first base station $BSS_2$, when receiving the service requirement request, transmits the service requirement request to the mobile station. The mobile station, when receiving the service requirement request, transmits the above moving speed, and the total data amount or the communication time to the first base station $BSS_2$ by the service requirement response. The first base station $BSS_2$, when receiving the service requirement response, transmits the service requirement response to the control apparatus 50.

In this procedure, meanwhile, instead of the first base station $BSS_2$, the second base station $BSL_1$ can also communicate between the mobile station and control apparatus. Or, when the mobile station is going to communicate, the moving speed and total data amount or communication time may be provided corresponding to the call setup request, and since the above procedure is omitted in this case, the time required for call setting can be shorter. As for the moving speed, not limited to the method of detecting and declaring the speed by the mobile station itself, it is also possible to detect the speed of the mobile station by the first base station $BSS_n$, second base station $BSL_m$, or control apparatus. In this case, the mobile station does not require means for detecting the speed, so that it is effective for reducing the size and weight of the mobile station, or saving the power consumption.

Figure 29:
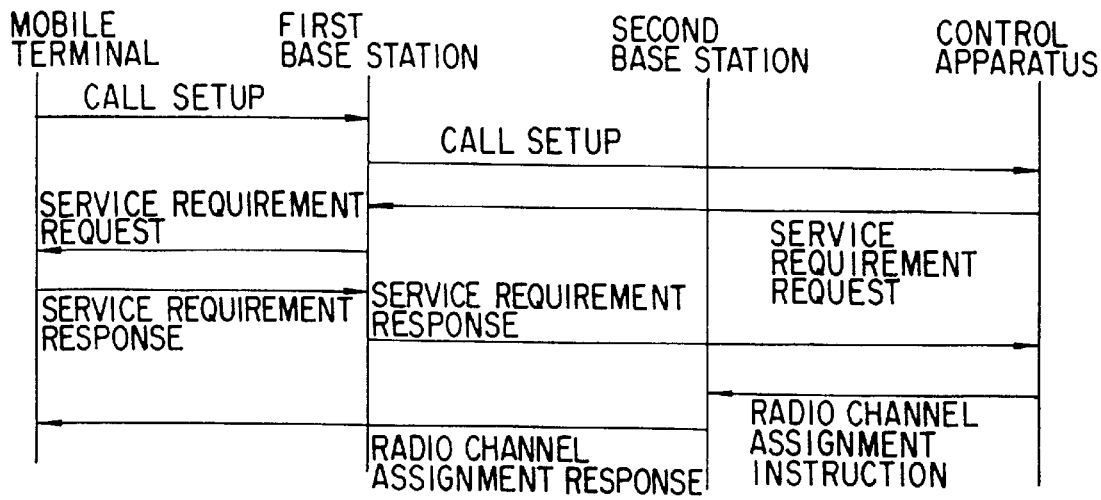
FIG. 29 is a diagram showing an example of operation when a mobile station sets up a call in a sixteenth embodiment of mobile communication system of the present invention.

Concerning the moving speed of the mobile station, and the total data amount or communication time declared by the service requirement response, when the product of the moving speed and the communication time or the product of the moving speed and the quotient of the total data amount and the moving speed (both products corresponding to the moving distance) is greater than a predetermined threshold, as shown in FIG. 29, the control apparatus 50 transmits the radio channel assignment instruction for assigning a radio channel for communication of the mobile station, to the second base station $BSL_1$. The second base station $BSL_1$, when receiving the radio channel assignment instruction, transmits the radio channel assignment response to the mobile station, and notices that the second cell $CL_1$ formed by the second base station $BSL_1$ has been assigned.

Figure 30:
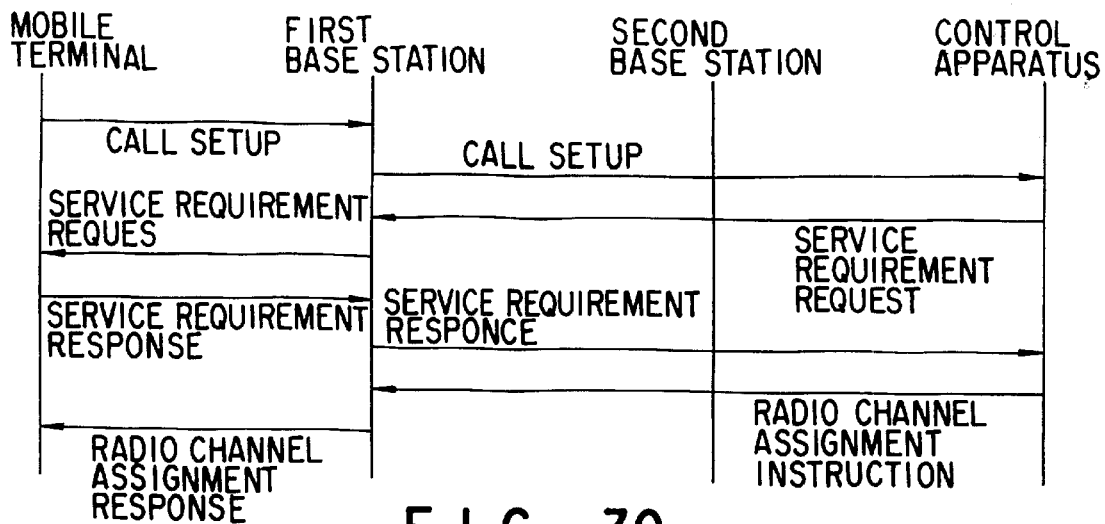
FIG. 30 is a diagram showing other example of operation when a mobile station sets up a call in the sixteenth embodiment.

Or, concerning the moving speed of the mobile station, and the total data amount or communication time declared by the service requirement response, when the product of the moving speed and the communication time or the product of the moving speed and the quotient of the total data amount and the moving speed (both products corresponding to the moving distance) is smaller than the threshold, as shown in FIG. 30, the control apparatus 50 transmits the radio channel assignment instruction to the first base station $BSS_2$, thereby instructing $BSS_2$ to assign a radio channel for communication of the mobile station. The first base station $BSS_2$, when receiving the radio channel assignment instruction, transmits the radio channel assignment response to the mobile station, and notices that the first cell $CS_2$ formed by the first base station $BSS_2$ has been assigned.

(ii) Upon Called

When a mobile station is called, supposing the nearest first base station from the calling terminal to be $BSS_2$ and the second base station to be $BSL_1$, the operation is described below while referring to FIG. 15 and FIG. 16 relating to the tenth embodiment.

First, the calling terminal calling the mobile station declares the total data amount or communication time of the information to be communicated to the control apparatus 50 when originating the call. The control apparatus 50 transmits the incoming call request to the mobile station to the first base station $BSS_2$, on the basis of the call setup request from the calling terminal. The first base station $BSS_2$, receiving the incoming call request, transmits the incoming call request to the mobile station. The mobile station, when receiving the incoming call request, transmits an incoming call response to the first base station $BSS_2$. The first base station $BSS_2$, when receiving the incoming call request, transmits the incoming call response to the control apparatus 50.

Meanwhile, in the above procedure, instead of the first base station $BSS_2$, the second base station $BSL_1$ can also communicate between the mobile station and control apparatus. At this time, if the first base station BSSN, second base station $BSL_m$, or the control apparatus does not have means for detecting the speed of the mobile station, the mobile station itself detects its own speed, and reports by adding an incoming call response thereto.

Concerning the moving speed of the mobile station, and the total data amount or communication time declared by the service requirement response, when the product of the moving speed and the communication time or the product of the moving speed and the quotient of the total data amount and the moving speed (both products corresponding to the moving distance) is greater than the predetermined threshold, as shown in FIG. 15, the control apparatus 50 transmits the radio channel assignment instruction for assigning a radio channel for communication of mobile station, to the second base station $BSL_1$. The second base station $BSL_1$, when receiving the radio channel assignment instruction, transmits a radio channel assignment response to the mobile station, and notices that the second cell $CL_1$ formed by the second base station $BSL_1$ has been assigned.

Or, concerning the moving speed of the mobile station, and the total data amount or communication time declared by the service requirement response, when the product of the moving speed and the communication time or the product of the moving speed and the quotient of the total data amount and the moving speed (both products corresponding to the moving distance) is smaller than the threshold, as shown in FIG. 16, the control apparatus 50 transmits the radio channel assignment instruction to the first base station $BSS_2$. The first base station $BSS_2$, when receiving the radio channel assignment instruction, transmits a radio channel assignment response to the mobile station, and notices that the first cell $CS_2$ formed by the first base station $BSS_2$ has been assigned.

Thus, according to the operation of the mobile communication system, as for the mobile station of which moving distance during continuation of communication is greater than the threshold, the second cell covering a geographically wider range than the first cell is assigned, and as for the mobile station of which moving distance during continuation of communication is smaller than the threshold, the first cell covering a geographically narrower range than the second cell is assigned, and therefore on the whole of the mobile communication system, the number of times of hand-off by the move of the mobile station during active call decreases. Hence, the hand-off control quantity is decreased, the number of times of momentary interruption at hand-off is decreased, and the communication service of higher quality can be presented.

(Seventeenth Embodiment)

A basic constitution of mobile communication system of a seventeenth embodiment is basically same as the block diagram showing the constitution of the mobile communication system of the ninth embodiment shown in FIG. 10, except that the first cells $CS_1$ to $CS_n$ present faster communication service than the second cells $CL_1$ to $CS_n$, which is different from the ninth embodiment.

The mobile communication system of this embodiment thus constituted is characterized by selecting the cell for presenting service to the mobile station, when the mobile station moves during active call and the mobile station existing cell is changed.

(i) First, supposing the first base station nearest from the mobile station to be $BSS_2$ and the second base station to be $BSL_1$, the operation of the mobile communication system is explained below by reference to FIG. 31 to FIG. 34, when the mobile station is moved to not any one of the first cells, within the second cell $CL_1$ formed by the second base station $BSL_1$, while the mobile station is communicating in the first cell $CS_2$ formed by the first base station.

Figure 31:
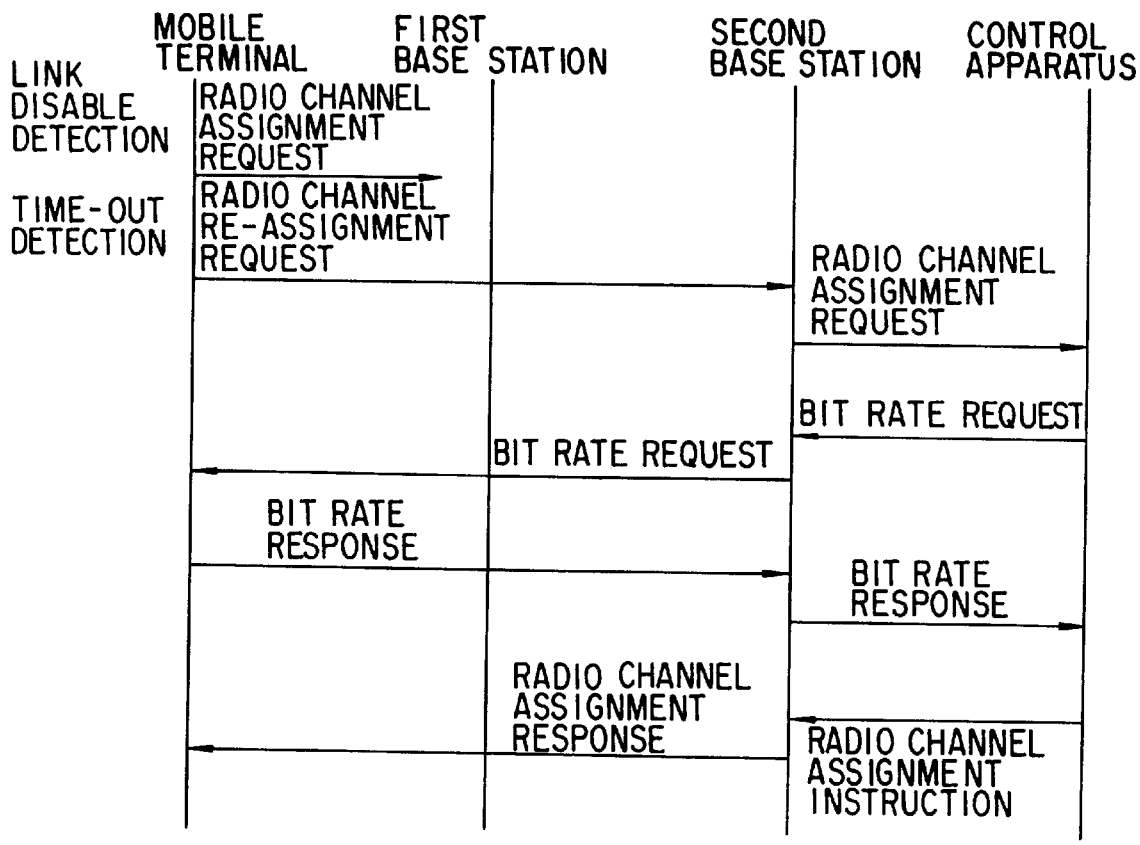
FIG. 31 is a diagram showing an example of operation of a seventeenth embodiment of mobile communication system of the present invention.

As shown in FIG. 31, the mobile station, when detecting it is not possible to communicate with the first base station $BSS_2$, requests radio channel assignment with other first base station. However, since the mobile station is not at any one of the first cells, it is known impossible to connect with any one of the first base stations, by, for example, expiration of response to the radio channel assignment request. At this time, a radio channel re-assignment request is transmitted to the second base station $BSL_1$ of the mobile station. The second base station $BSL_1$ transmits the radio channel re-assignment request to the control apparatus 50.

The control apparatus 50, when receiving the radio channel re-assignment request, transmits a transmission speed request to the second base station $BSL_1$ in order to declare the transmission speed necessary for the mobile station to transmit the information. The second base station $BSL_1$, when receiving the transmission speed request, transmits the transmission speed request to the mobile station. The mobile station, when receiving the transmission speed request, transmits the transmission speed necessary for the information to be communicated to the second base station $BSL_1$ by a transmission speed response. The second base station $BSL_1$, when receiving the transmission speed response, transmits the transmission speed response to the control apparatus 50. The transmission speed necessary for information to be communicated by the mobile station may be transmitted by adding to the radio channel re-assignment request. Or the control apparatus may transmit the transmission speed request to the calling terminal of the mobile station, and the transmission speed necessary for the information to be communicated by the terminal may be transmitted to the control apparatus 50 as transmission speed response.

When the transmission speed declared by the mobile station by the transmission speed response is lower than the threshold, as shown in FIG. 31, the control apparatus 50 transmits the radio channel assignment instruction for assigning a radio channel for communication of the mobile station, newly to the second base station $BSL_1$. The second base station $BSL_1$, when receiving the radio channel assignment instruction, transmits the radio channel assignment response to the mobile station, and notices that the second cell $CL_1$ formed by the second base station $BSL_1$ has been assigned.

Figure 32:
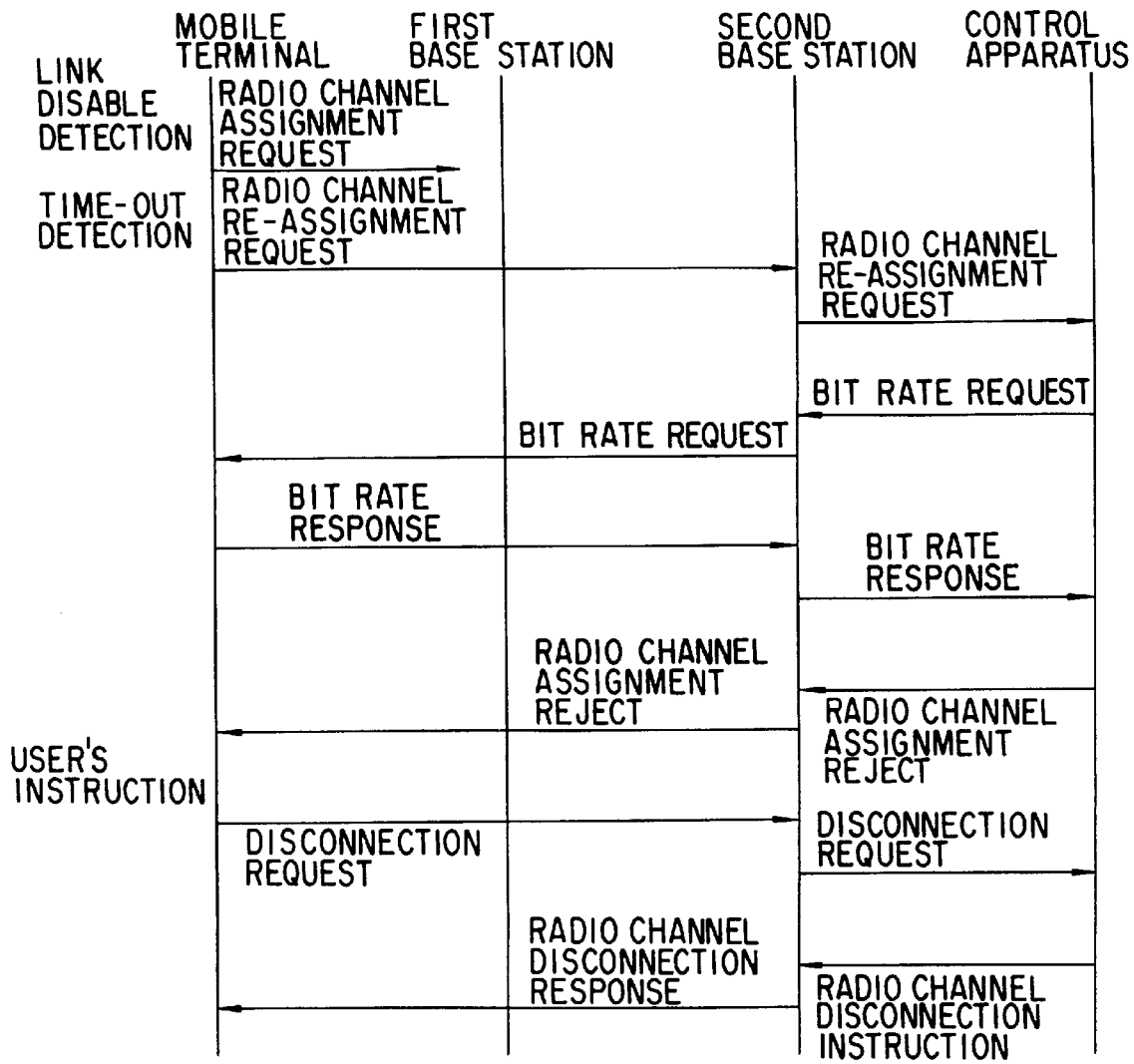
FIG. 32 is a diagram showing other example of operation of the seventeenth embodiment.

When the transmission speed declared by the mobile station by the transmission speed response is higher than the threshold, as shown in FIG. 32, the control apparatus 50 transmits a radio channel assignment reject to the second base station $BSL_1$ to tell the mobile station that the radio channel of that transmission speed cannot be assigned. The second base station $BSL_1$, when receiving the radio channel assignment reject, transmits it to the mobile station. The upper limit of the channel speed that can be assigned to the mobile station when the control apparatus transmits the radio channel assignment reject may be explicitly indicated.

The mobile station, when receiving the channel assignment reject, recognizes that it is impossible to communicate at the transmission speed declared by the transmission speed response, and it is noticed to the user of the mobile station or the program. The user of the mobile station or the program judges to communicate at low speed, reserve the communication until the transmission speed can be set to high transmission speed again, or terminate the present communication, and enters the result of judgment in the mobile station.

Alternatively, when the control apparatus transmits the radio channel assignment reject to the calling terminal of the mobile station, and the terminal receives the channel assignment reject, it is recognized that it is impossible to communicate at the transmission speed declared by the transmission speed response, and it is noticed to the user of the mobile station or the program. The user of the mobile station or the program judges to communicate at low speed, reserve the communication until the transmission speed can be set to high transmission speed again, or terminate the present communication, and enters the result of judgment in the terminal.

To terminate the present communication, the mobile station or the other party's terminal of the mobile station transmits a disconnection request to the control apparatus 50. For example, when transmitting from the mobile station, as shown in FIG. 32, the mobile station transmits the disconnection request to the second base station $BSL_1$. The second base station $BSL_1$ transmits the disconnection request to the control apparatus 50. When receiving the disconnection request, the control apparatus transmits a disconnection instruction for releasing the radio or wired communication resource having been assigned to the mobile station, and the second base station $BSL_1$ receiving the disconnection instruction transmits the disconnection response to the mobile station.

Figure 33:
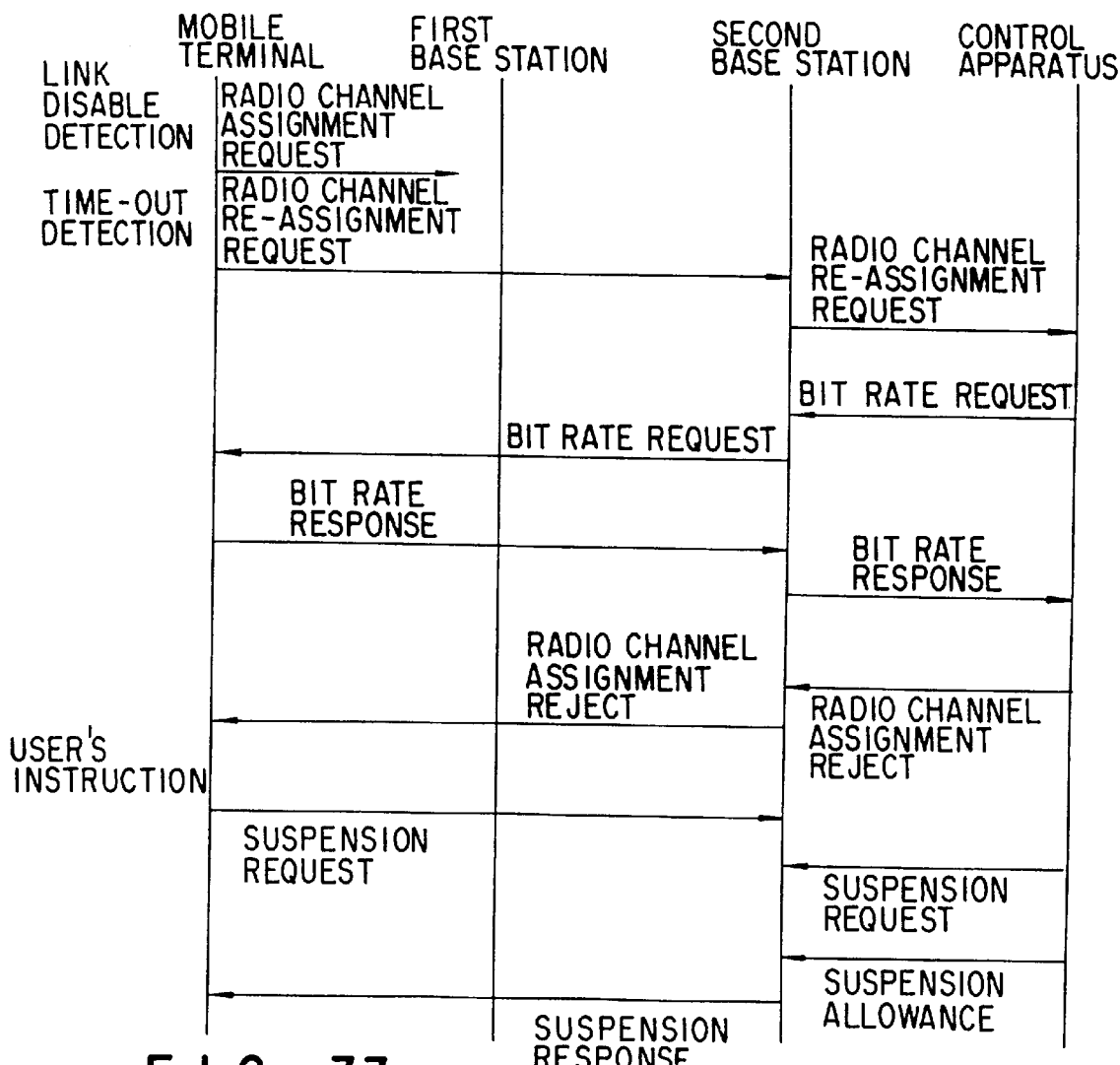
FIG. 33 is a diagram showing other example of operation of the seventeenth embodiment.

To suspend the present communication, the mobile station or other party's terminal of the mobile station transmits a channel suspension request to the control apparatus 50. For example, when transmitting from the mobile station, as shown in FIG. 33, the mobile station transmits the channel suspension request to the second base station $BSL_1$. The second base station $BSL_1$ transmits the channel suspension request to the control apparatus 50. The control apparatus, when receiving the channel suspension request, releases other radio or wired communication resources, while maintaining the information and communication resources relating to the circuit setting necessary when resuming high speed communication having being done by the mobile station, and transmits the channel suspension allowance to the second base station $BSL_1$. The second base station $BSL_1$ receiving the channel suspension allowance transmits the channel suspension response to the mobile station.

Figure 34:
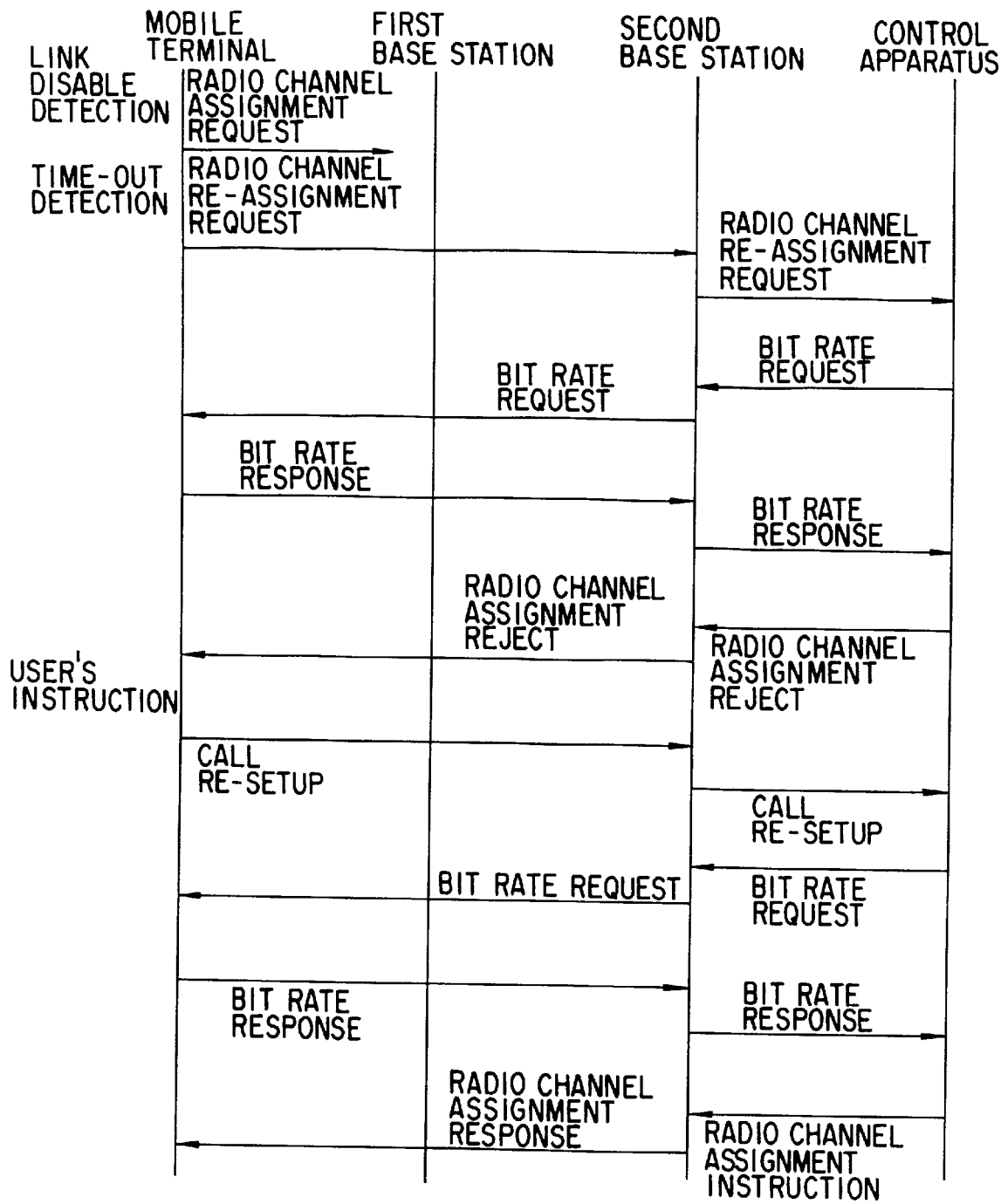
FIG. 34 is a diagram showing other example of operation of the seventeenth embodiment.

To communicate at low transmission speed, the mobile station or calling terminal of the mobile station transmits a call re-setup request to the control apparatus 50. For example, when transmitting from the mobile station, as shown in FIG. 34, the mobile station transmits the call re-setup request to the second base station $BSL_1$. The second base station $BSL_1$ transmits the call re-setup request to the control apparatus 50. The control apparatus 50, when receiving the call re-setup request, transmits a transmission speed request to the second base station $BSL_1$ in order to declare the transmission speed necessary for the information to be communicated by the mobile station to the mobile station. The second base station $BSL_1$, when receiving the transmission speed request, transmits a transmission speed necessary for information to be communicated to the second base station $BSL_1$ by a transmission speed response. The second base station $BSL_1$, when receiving the transmission speed response, transmits the transmission speed response to the control apparatus 50.

When the transmission speed declared by the mobile station by the transmission speed response is lower than the threshold, the control apparatus 50, as shown in Fig, 34, transmits a radio channel assignment instruction for assigning a radio channel for communication of mobile station, newly to the second base station $BSL_1$. The second base station $BSL_1$, when receiving the radio channel assignment instruction, transmits a radio channel assignment response to the mobile station, and notices that the second cell $CL_1$ formed by the second base station $BSL_1$ has been assigned.

When the transmission speed declared by the mobile station by the transmission speed response is higher than the threshold, the control apparatus 50 transmits a channel re-assignment reject to the mobile station through the second base station $BSL_1$.

The mobile station, when requesting a transmission speed, may be considered to understand the communication at the upper limit of the channel speed that can be assigned to the mobile station, for example, being added to the channel assignment reject information, or request the transmission speed within that speed. Or the request to the transmission speed from the mobile station may be transmitted by adding to the call re-setup request.

(ii) Next, not located in any one of the first cells $CS_1$ to $CS_n$ formed by the first base stations $BSS_1$ to $BSS_n$, supposing the second base station nearest from the mobile station to be $BSL_1$, the operation of the mobile communication system is explained below by reference to FIG. 35 and FIG. 36, when the mobile station is moved into the first cell $CS_2$ formed by the first base station $BSS_2$ by approaching to the first base station $BSS_2$ within the second cell $CL_1$, while the mobile station is communicating in the second cell $CL_1$ formed by the second base station $BSL_1$.

Figure 35:
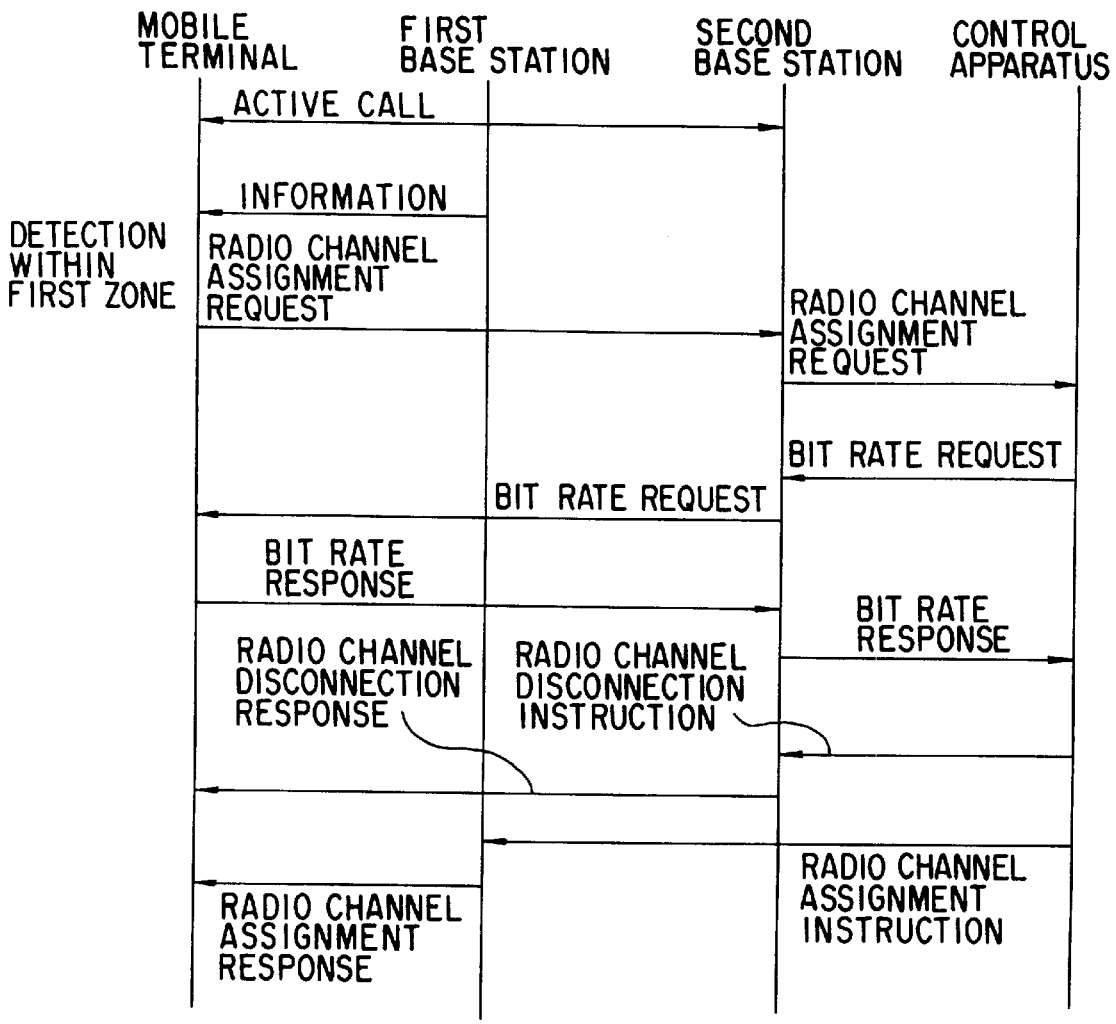
FIG. 35 is a diagram showing other example of operation of the seventeenth embodiment.

First, as shown in FIG. 35, the mobile station, requesting a fast communication through a first base station, attempts to receive a notice signal periodically from the first base stations $BSS_1$ to $BSS_n$ in the midst of communication through the second cell $CL_1$ formed by the second base station $BSL_1$. When the mobile station gets into the first cell $CS_2$, this notice signal can be received. As a result, it is known that the mobile station has entered the first cell $CS_2$.

At this time, the mobile station transmits a radio channel assignment request with the first base station $BSS_2$ to the second base station $BSL_1$. The second base station $BSL_1$ transmits the radio channel assignment request to the control apparatus 50. The control apparatus 50, when receiving the radio channel assignment request, transmits a transmission speed request to the second base station $BSL_1$ in order to cause the mobile station to declare the transmission speed necessary for the information to be communicated by the mobile station. The second base station $BSL_1$, when receiving the transmission speed request, transmits the transmission speed request to the mobile station. The mobile station, when receiving the transmission speed request, transmits the transmission speed necessary for information to be communicated to the second base station $BSL_1$ by a transmission speed response. The second base station $BSL_1$, when receiving the transmission speed response, transmits the transmission speed response to the control apparatus 50.

In this communication, meanwhile, instead of the second base station $BSL_1$, the first base station $BSS_2$ can also communicate between the mobile station and the control apparatus.

Alternatively, the control apparatus may transmit the transmission speed response to the calling terminal of the mobile station, and transmit the transmission speed necessary for information to be communicated by the terminal as transmission speed response to the control apparatus 50.

The control apparatus 50, when receiving the transmission speed response, first compares the transmission speed declared by the transmission speed response with the threshold, and when the transmission speed is higher than the threshold, transmits radio channel disconnection instruction to cut off the radio channel for communication of mobile station, to the second base station $BSL_1$ active in service to the mobile station, and the second base station $BSL_1$ receiving the radio channel disconnection instruction transmits a radio channel disconnection response to the mobile station, and the radio channel by the second cell $CL_1$ is cut off. Meanwhile, the operation after transmission of radio channel disconnection instruction by the control apparatus 50 may be done at the time of hand-off of the mobile station.

Next, the control apparatus 50 transmits a radio channel assignment instruction for assigning a radio channel for communication of mobile station, to the first base station $BSS_2$ nearest from the mobile station. The first base station $BSS_2$, when receiving the radio channel assignment instruction, transmits a radio channel assignment response to the mobile station, and notices that the first cell $CS_2$ formed by the first base station $BSS_2$ has been assigned, thereby changing over the radio channel.

In this embodiment, incidentally, after receiving the transmission speed response, the control apparatus 50 is operating in the sequence of radio channel disconnection and radio channel assignment, but it is also possible to operate in the sequence of radio channel assignment and radio channel disconnection.

If the transmission speed declared by the transmission speed response is lower than the threshold, the control apparatus 50 does not change over the radio channel.

In the case of the mobile station suspending a high speed communication, as shown in FIG. 36, it is attempted to receive periodically the notice signal from the first base stations $BSS_1$ to $BSS_n$. When the mobile station enters the first cell $CS_2$, its notice signal can be received, so that it is known that the mobile station has entered the first cell $CS_2$.

At this time, the mobile station cancels suspension of high speed communication, and requests re-opening of communication in the first cell $CS_2$ and transmits a suspension cancel request to the second base station $BSL_1$. The second base station $BSL_1$, receiving the suspension cancel request, transmits the suspension cancel request to the control apparatus 50. The control apparatus 50, when receiving the suspension cancel request, transmits a radio channel assignment instruction for assigning a radio channel for communication of mobile station, to the first base station $BSS_2$ nearest from the mobile station on the basis of the information of the transmission speed communicated by the mobile station. The first base station $BSS_2$, when receiving the radio channel assignment instruction, transmits the radio base assignment response to the mobile station, and notices that he first cell $CS_2$ formed by the first base station $BSS_2$ has been assigned.

In this communication, meanwhile, instead of the second base station $BSL_1$, the first base station $BSS_2$ can also communicate between the mobile station and the control apparatus.

(Eighteenth Embodiment)

A basic constitution of mobile communication system of an eighteenth embodiment is basically same as the block diagram showing the constitution of the mobile communication system of the ninth embodiment shown in FIG. 10, except that the first cells $CS_1$ to $CS_n$ present faster communication service than the second cells $CL_1$ to $CS_n$, which is different from the ninth embodiment.

The mobile communication system of this embodiment thus constituted operates as follows when separately selecting the cells for presenting down-link communication service for transmitting information toward the mobile station, and up-link communication service for transmitting information from the mobile station.

(i) First, when the mobile station sets up a call, supposing the first base station nearest from the mobile station to be $BSS_2$ and the second base station to be $BSL_1$, the operation of the mobile communication system is described below by reference to FIG. 37 and FIG. 38.

First, as shown in FIG. 37, the mobile station transmits a call setup request to the nearest second base station $BSL_1$. The second base station $BSL_1$ transfers the call setup request to t he control apparatus. The control apparatus 50, when receiving the call setup request, transmits a transmission speed request to the second base station $BSL_1$ in order to cause the mobile station to declare the up-link transmission speed and down-link transmission speed necessary for information to be communicated b the mobile station. The second base station $BSL_1$, when receiving the transmission speed request, transmits the transmission speed request to the mobile station. The mobile station, when receiving the transmission speed request, transmits the up-link transmission speed and down-link transmission speed necessary for the information to be communicated to the second base station $BSL_1$ by a transmission speed response. The second base station $BSL_1$, when receiving the transmission speed response, transmits the transmission speed response to the control apparatus 50.

In this communication, meanwhile, instead of the second base station $BSL_1$, the first base station $BSS_2$ can also communicate between the mobile station and the control apparatus.

When the up-link transmission speed declared by the mobile station by the transmission speed response is lower than the threshold, as shown in FIG. 37, the control apparatus 50 transmits an up-link channel assignment instruction or assigning an up-link channel for receiving information from the mobile station, to the second base station $BSL_1$. The second base station $BSL_1$, receiving the up-link channel assignment instruction, transmits an up-link channel assignment response to the mobile station, and notices that the second cell $CL_1$ formed by the second base station $BSL_1$ has been assigned.

At this time, the control apparatus may instruct transmission of the up-link channel assignment response to the first base station $BSS_2$.

On the other hand, when the up-link transmission speed declared by the mobile station by the transmission speed response is higher than the threshold, as shown in FIG. 38, the control apparatus 50 transmits an up-link channel assignment instruction for assigning an up-link channel for receiving information from the mobile station to the first base station $BSS_2$. The first base station $BSS_2$, when receiving the up-link channel assignment instruction, transmits an up-link channel assignment response to the mobile station, and notices that the first cell $CS_2$ formed by the first base station $BSS_2$ has been assigned.

At this time, the terminal may instruct transmission of up-link channel assignment response to the second base station $BSL_1$ that has initially transmitted a call setup request.

Or, when the up-link transmission speed declared by the mobile station by the transmission speed response is lower than the threshold, as shown in FIG. 37, the control apparatus 50 transmits a down-link channel assignment instruction for assigning a down-link channel for transmitting information to the mobile station to the second base station $BSL_1$. The second base station $BSL_1$, when receiving the down-link channel assignment instruction, transmits a down-link channel assignment response to the mobile station, and notices that the second cell $CL_1$ formed by the second base station $BSL_1$ has been assigned.

At this time, the control apparatus may instruct transmission of down-link channel assignment response to the first base station $BSS_2$.

On the other hand, when the down-link transmission speed declared by the mobile station by the transmission speed response is higher than the threshold, as shown in FIG. 38, the control apparatus 50 transmits a down-link channel assignment instruction for assigning a down-link channel for receiving information from the mobile station to the first base station $BSS_2$. The first base station $BSS_2$, when receiving the down-link channel assignment instruction, transmits a down-link channel assignment response to the mobile station, and notices that the first cell $CS_2$ formed by the first base station $BSS_2$ has been assigned.

At this time, the terminal may instruct transmission of down-link channel assignment response to the second base station $BSL_1$ that has initially transmitted a call setup request.

(ii) Next, when the mobile station is called, supposing the first base station nearest from the mobile station to be $BSS_2$ and the second base station to be $BSL_1$, the operation of the mobile communication system is described below by reference to FIG. 39 and FIG. 40.

First, the caller's terminal calling the mobile station declares the up-link transmission speed and down-link transmission speed necessary for the information to be communicated, to the control apparatus 50. Then, as shown in FIG. 39, the control apparatus 50 transmits an incoming call request to the mobile station on the basis of the call setup request from the caller's terminal to the first base station $BSS_2$. The first base station $BSS_2$, when receiving the incoming call request, transmits an incoming call response to the mobile station. The mobile station, when receiving the incoming call request, transmits an incoming call response to the first base station $BSS_2$. The first base station $BSS_2$, when receiving the incoming call response, transmits an incoming call request to the control apparatus 50. In this communication, meanwhile, instead of the first base station $BSS_2$, the second base station $BSL_1$ can also communicate between the mobile station and the control apparatus.

When the up-link transmission speed declared by the caller's terminal is lower than the threshold, as shown in FIG. 39, the control apparatus 50 transmits a down-link channel assignment instruction or assigning a down-link channel for transmitting information to the mobile station, to the second base station $BSL_1$. The second base station $BSL_1$, receiving the down-link channel assignment instruction, transmits a down-link channel assignment response to the mobile station, and notices that the second cell $CL_1$ formed by the second base station $BSL_1$ has been assigned.

At this time, the control apparatus may instruct transmission of the down-link channel assignment response to the first base station $BSS_2$.

On the other hand, when the up-link transmission speed declared by the caller's terminal is higher than the threshold, as shown in FIG. 40, the control apparatus 50 transmits a down-link channel assignment instruction for assigning a down-link channel for transmitting information to the mobile station to the first base station $BSS_2$. The first base station $BSS_2$, when receiving the down-link channel assignment instruction, transmits a down-link channel assignment response to the mobile station, and notices that the first cell $CS_2$ formed by the first base station $BSS_2$ has been assigned.

At this time, the control apparatus may instruct transmission of down-link channel assignment response to the second base station $BSL_1$.

Or, when the down-link transmission speed declared by the caller's terminal is lower than the threshold, as shown in FIG. 40, the control apparatus 50 transmits an up-link channel assignment instruction for assigning an up-link channel for receiving information from the mobile station to the second base station $BSL_1$. The second base station $BSL_1$, when receiving the up-link channel assignment instruction, transmits an up-link channel assignment response to the mobile station, and notices that the second cell $CL_1$ formed by the second base station $BSL_1$ has been assigned.

At this time, the control apparatus may instruct transmission of up-link channel assignment response to the first base station $BSS_2$.

On the other hand, when the down-link transmission speed declared by the caller's terminal is higher than the threshold, as shown in FIG. 39, the control apparatus 50 transmits an up-link channel assignment instruction for assigning an up-link channel for receiving information from the mobile station to the first base station $BSS_2$. The first base station $BSS_2$, when receiving the up-link channel assignment instruction, transmits an up-link channel assignment response to the mobile station, and notices that the first cell $CS_2$ formed by the first base station $BSS_2$ has been assigned.

At this time, the control apparatus may instruct transmission of up-link channel assignment response to the second base station $BSL_1$.

In the embodiment shown in FIG. 37 to FIG. 40, the up-link channel and down-link channel are explained as separate base stations, but depending on the transmission speed declared by the terminal, it may be also designed to communicate information by using the up-link channel and down-link channel in a same base station.

As the mobile communication system composed and operating as described herein, if the information the mobile station attempts to communicate is different between the transmission speed necessary for information to be transmitted from the terminal side and the transmission speed necessary for the information to be received by the terminal, the cells can be assigned depending on the transmission speed necessary for each information. Accordingly, in the case of information communication of low up-link transmission speed and high down-link transmission speed, the radio communication resource is assigned in the first cell which is capable of transmitting at high transmission speed in both up- and down-link communication, so that wasteful assignment of radio communication resources can be eliminated.

As described herein, according to the mobile communication system of the present invention, it is possible to page depending on the type of communication. For example, it is possible to curtail the paging traffic while satisfying the demand of the user about call setup delay. Hence, it brings about great merits in both aspects of control efficiency and service quality, in the mobile communication system for presenting multimedia communication service. It is therefore possible to accommodate more mobile stations in the mobile communication system, and the communication service suited to the user's request can be presented.

According to the mobile communication system of the present invention, moreover, it is effective to reduce the control quantity in the network of the mobile communication system which tends to increase in the personal trend of communication, and present communication service of higher quality.

Also in the mobile communication system of the present invention, the radio frequency band can be utilized efficiently, and it is effective to realize communication of information requiring wider frequency band for communication of moving picture and others, increasing in demand in the multimedia trend of communication. At the same time, it is also effective to accommodate more users by the mobile communication system.

Moreover, communication services of various qualities can be presented, and it is effective to cope flexibly with the diversification of communication services and variation of user demands, in the personal trend and multimedia trend of communication.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, the foregoing embodiments have been explained individually, but plural embodiments may also combined appropriately.

What is claimed is:

1. A mobile communication system having plural cells disposed in each location registration area, comprising:

means for setting an allowable delay time of call connection for a call to a mobile station; and means for paging a mobile station by selectively using plural cells depending on said allowable delay time, the paging means paging a mobile station simultaneously by using all cells in the location registration area when the allowable delay time is shorter than a predetermined delay time, and paging plural times a mobile station by sequentially using given cells in the location registration area when the allowable delay time is not shorter than the predetermined delay time.

2. A mobile communication system according to claim 1, in which said paging means pages the mobile station by using all unused remaining cells in a final paging when the allowable delay time is long.

3. A mobile communication system according to claim 1, in which said paging means pages the mobile station by sequentially using cells in order of higher possibility of existence of mobile station when the allowable delay time is long.

4. A mobile communication system according to claim 3, in which said paging means makes a first paging by using a cell in which the mobile station is present at the time of termination of a last call of the mobile station when the allowable delay time is long.

5. A mobile communication system according to claim 1, in which said setting means is provided at a caller's terminal.

6. A mobile communication system according to claim 1, in which said setting means is provided at a callee's terminal.

7. A mobile communication system according to claim 1, which further comprises:

means for presenting plural types of communication service to mobile stations; and means for setting an upper limit of an allowable delay time by each type of communication service of call, and in which said paging means pages the mobile station by using all unused remaining cells if not responded from the mobile station after the upper limit expires when the allowable delay time is long.

8. A mobile communication system according to claim 1, which further comprises memory means for storing communication information, and in which said paging means pages the mobile station after storing the communication information in said memory means when the allowable delay time is long.

9. A mobile communication system according to claim 1, which further comprises:

first memory means for storing information of a first cell in which the mobile station is present at the time of termination of a last call of the mobile station;

second memory means for storing information of a second cell when the mobile station has moved from the first cell to the second cell; and third memory means for storing whether the mobile terminal has moved from the first cell to the second cell or not, and in which said paging means pages the mobile station by using the first cell stored in said first memory means when the allowable delay time is short and said third memory means shows the mobile station has not moved, pages the mobile station simultaneously by using all cells in the location registration area when the allowable delay time is short and said third memory means shows the mobile station has moved, and pages the mobile station by using the second cell stored in said second memory means when the allowable delay time is long and said third memory means shows the mobile station has moved.

10. A mobile communication system according to claim 9, in which said paging means pages the mobile station simultaneously by using all cells in the location registration area when the cell information is not stored in said first and second memory means.

11. A mobile communication system having plural first cells for presenting a first communication service in each location registration area, and plural second cells for presenting a second communication service, the second cell being geographically wider than the first cell and geographically overlapping with the first cell, comprising:

means for setting an allowable delay time of call connection for a call to a mobile station; and means for paging a mobile station by selectively using plural cells depending on said allowable delay time, the paging means paging a mobile station simultaneously by using all cells in the location registration area when the allowable delay time is shorter than a predetermined delay time, and paging plural times a mobile station by sequentially using given cells in the location registration area when the allowable delay time is not shorter than the predetermined delay time.

12. A mobile communication system according to claim 11, in which said paging means pages the mobile station by using all unused remaining cells in a final paging when the allowable delay time is long.

13. A mobile communication system according to claim 11, in which said paging means pages the mobile station by sequentially using cells in order of higher possibility of existence of mobile station when the allowable delay time is long.

14. A mobile communication system according to claim 13, in which said paging means makes a first paging by using a cell in which the mobile station is present at the time of termination of a last call of the mobile station when the allowable delay time is long.

15. A mobile communication system according to claim 11, in which said setting means is provided at a caller's terminal.

16. A mobile communication system according to claim 11, in which said setting means is provided at a callee's terminal.

17. A mobile communication system according to claim 11, which further comprises:

means for presenting plural types of communication service to mobile stations; and means for setting an upper limit of an allowable delay time by each type of communication service of call, and in which said paging means pages the mobile station by using all unused remaining cells if not responded from the mobile station after the upper limit expires when the allowable delay time is long.

18. A mobile communication system according to claim 11, which further comprises memory means for storing communication information, and in which said paging means pages the mobile station after storing the communication information in said memory means when the allowable delay time is long.

19. A mobile communication system according to claim 11, which further comprises:

first memory means for storing information of a first cell in which the mobile station is present at the time of termination of a last call of the mobile station;

second memory means for storing information of a second cell when the mobile station has moved from the first cell to the second cell; and third memory means for storing whether the mobile terminal has moved from the first cell to the second cell or not, and in which said paging means pages the mobile station by using the first cell stored in said first memory means when the allowable delay time is short and said third memory means shows the mobile station has not moved, pages the mobile station simultaneously by using all cells in the location registration area when the allowable delay time is short and said third memory means shows the mobile station has moved, and pages the mobile station by using the second cell stored in said second memory means when the allowable delay time is long and said third memory means shows the mobile station has moved.

20. A mobile communication system according to claim 19, in which said paging means pages the mobile station simultaneously by using all cells in the location registration area when the cell information is not stored in said first and second memory means.

21. A mobile communication system according to claim 11, wherein the type of communication is an allowable error rate of information to be communicated with the mobile station, and said paging means selects the second cell when the error rate is small, and selects the first cell when the error rate is large.

22. A mobile communication system according to claim 11, wherein the type of communication is the quantity of information to be communicated with the mobile station, and said paging means selects the second cell when the quantity of information is large, and selects the first cell when the quantity of information is small.

23. A mobile communication system according to claim 11, wherein the type of communication is the transmission speed, and said paging means selects the second cell when the transmission speed is low, and selects the first cell when the transmission speed is high.

24. A mobile communication system according to claim 11, wherein said paging means selects either the first cell or second cell as for communication of down-link channel for transmitting information to the mobile station, and selects the other one of the first cell and the second cell as for communication of up-link channel for transmitting information from the mobile station.

25. A mobile communication system according to claim 11, wherein the type of communication is whether the communication with the mobile station is connection-oriented communication or connection-less communication, and said paging means selects the second cell in the case of connection-oriented communications, and selects the first cell in the case of connection-less communications.

26. A mobile communication system according to claim 11, wherein the type of communication is an allowable delay time of information to be communicated with the mobile station, and said paging means selects the second cell when the allowable delay time is short, and selects the first cell when the allowable delay time is long.

27. A mobile communication system according to claim 11, wherein the type of communication is a variance of an allowable delay time of information to be communicated with the mobile station, and said paging means selects the second cell when the variance of the allowable delay time is small, and selects the first cell when the variance of the allowable delay time is large.

28. A mobile communication system according to claim 11, wherein the type of communication is the communication time, and said paging means selects the second cell when the communication time is long, and selects the first cell when the communication time is short.

29. A mobile communication system according to claim 11, wherein the type of communication is an expected moving distance of the mobile station during active call with the mobile station, and said paging means selects the second cell when the distance is long, and selects the first cell when the distance is short.

30. A mobile communication system according to claim 29, wherein the distance is determined by a product of a moving speed of the mobile station and a communication time or a product of the moving speed and a quotient of the quantity of information to be communicated with the mobile station and a transmission speed.

31. A mobile communication system having plural first cells for presenting a first communication service, and plural second cells for presenting a second communication service, the second cell being geographically wider than the first cell and geographically overlapping with the first cell, comprising:

means for selecting at least either the first cell or the second cell, depending on a type of communication with the mobile station; and means for communicating with the mobile station by using a cell selected by said selecting means, wherein the type of communication is an allowable error rate of information to be communicated with the mobile station, and said selecting means selects the second cell when the error rate is small, and selects the first cell when the error rate is large.

32. A mobile communication system having plural first cells for presenting a first communication service, and plural second cells for presenting a second communication service, the second cell being geographically wider than the first cell and geographically overlapping with the first cell, comprising:

means for selecting at least either the first cell or the second cell, depending on a type of communication with the mobile station; and means for communicating with the mobile station by using a cell selected by said selecting means, wherein the type of communication is the quantity of information to be communicated with the mobile station, and said selecting means selects the second cell when the quantity of information is large, and selects the first cell when the quantity of information is small.

33. A mobile communication system having plural first cells for presenting a first communication service, and plural second cells for presenting a second communication service, the second cell being geographically wider than the first cell and geographically overlapping with the first cell, comprising:

means for selecting at least either the first cell or the second cell, depending on a type of communication with the mobile station; and means for communicating with the mobile station by using a cell selected by said selecting means, wherein the type of communication is the transmission speed between the mobile station and the base station, and said selecting means selects the second cell when the transmission speed is low, and selects the first cell when the transmission speed is high.

34. A mobile communication system having plural first cells for presenting a first communication service, and plural second cells for presenting a second communication service, the second cell being geographically wider than the first cell and geographically overlapping with the first cell, comprising:

means for selecting at least either the first cell or the second cell, depending on a type of communication with the mobile station; and means for communicating with the mobile station by using a cell selected by said selecting means, wherein said selecting means selects either the first cell or second cell as for communication of downlink channel for transmitting information to the mobile station, and selects the other one of the first cell and the second cell as for communication of up-link channel for transmitting information from the mobile station.

35. A mobile communication system having plural first cells for presenting a first communication service, and plural second cells for presenting a second communication service, the second cell being geographically wider than the first cell and geographically overlapping with the first cell, comprising:

means for selecting at least either the first cell or the second cell, depending on a type of communication with the mobile station; and means for communicating with the mobile station by using a cell selected by said selecting means, wherein the type of communication is whether the communication with the mobile station is connection-oriented communication or connection-less communication, and said selecting means selects the second cell in the case of connection-oriented communications, and selects the first cell in the case of connection-less communications.

36. A mobile communication system having plural first cells for presenting a first communication service, and plural second cells for presenting a second communication service, the second cell being geographically wider than the first cell and geographically overlapping with the first cell, comprising:

means for selecting at least either the first cell or the second cell, depending on a type of communication with the mobile station; and means for communicating with the mobile station by using a cell selected by said selecting means, wherein the type of communication is an allowable delay time of information to be communicated with the mobile station, and said selecting means selects the second cell when the allowable delay time is short, and selects the first cell when the allowable delay time is long.

37. A mobile communication system having plural first cells for presenting a first communication service, and plural second cells for presenting a second communication service, the second cell being geographically wider than the first cell and geographically overlapping with the first cell, comprising:

means for selecting at least either the first cell or the second cell, depending on a type of communication with the mobile station; and means for communicating with the mobile station by using a cell selected by said selecting means, wherein the type of communication is a variance of an allowable delay time of information to be communicated with the mobile station, and said selecting means selects the second cell when the variance of the allowable delay time is small, and selects the first cell when the variance of the allowable delay time is large.

38. A mobile communication system having plural first cells for presenting a first communication service, and plural second cells for presenting a second communication service, the second cell being geographically wider than the first cell and geographically overlapping with the first cell, comprising:

means for selecting at least either the first cell or the second cell, depending on a type of communication with the mobile station; and means for communicating with the mobile station by using a cell selected by said selecting means, wherein the type of communication is the communication time, and said selecting means selects the second cell when the communication time is long, and selects the first cell when the communication time is short.

39. A mobile communication system having plural first cells for presenting a first communication service, and plural second cells for presenting a second communication service, the second cell being geographically wider than the first cell and geographically overlapping with the first cell, comprising:

means for selecting at least either the first cell or the second cell, depending on a type of communication with the mobile station; and means for communicating with the mobile station by using a cell selected by said selecting means, wherein the type of communication is an expected moving distance of the mobile station during active call with the mobile station, and said selecting means selects the second cell when the distance is long, and selects the first cell when the distance is short.

40. A mobile communication system according to claim 39, wherein the distance is determined by a product of a moving speed of the mobile station and a communication time or a product of the moving speed and a quotient of the quantity of information to be communicated with the mobile station and a transmission speed between the mobile station and the base station.

41. A mobile communication method for a communication system having plural cells disposed in each location registration area, the method comprising the following steps of:

paging a mobile station by selectively using plural cells depending on an allowable delay time of call connection for a call to a mobile station such that a mobile station is simultaneously paged by using all cells in the location registration area when the allowable delay time is shorter than a predetermined delay time, and a mobile station is paged plural times by sequentially using given cells in the location registration area when the allowable delay time is not shorter than the predetermined delay time; and connecting a radio channel between the mobile station and a base station.

42. A mobile communication method for a communication system having plural first cells for presenting a first communication service in each location registration area, and plural second cells for presenting a second communication service, the second cell being geographically wider than the first cell and geographically overlapping with the first cell, the method comprising the following steps:

paging a mobile station by selectively using plural cells depending on said allowable delay time of call connection for a call to a mobile station such that a mobile station is simultaneously paged by using all cells in the location registration area when the allowable delay time is shorter than a predetermined delay time, and a mobile station is paged plural times by sequentially using given cells in the location registration area when the allowable delay time is not shorter than a predetermined delay time; and connecting a radio channel between the mobile station and a base station.

* * * * *